United States Patent [19]

Wells et al.

[11] Patent Number: 5,301,337

[45] Date of Patent: Apr. 5, 1994

[54] DISTRIBUTED RESOURCE MANAGEMENT SYSTEM USING HASHING OPERATION TO DIRECT RESOURCE REQUEST FROM DIFFERENT PROCESSORS TO THE PROCESSOR CONTROLLING THE REQUESTED RESOURCE

[75] Inventors: Robert E. Wells, Arlington; Kenneth A. Sedgwick, Acton, both of Mass.

[73] Assignee: Bolt Beranek and Newman Inc., Cambridge, Mass.

[21] Appl. No.: 505,779

[22] Filed: Apr. 6, 1990

[51] Int. Cl.$^5$ .................... G06F 13/368; G06F 15/76
[52] U.S. Cl. ................... 395/800; 395/425; 395/650; 364/281.6; 364/260.9; 364/230.5; 364/DIG. 1
[58] Field of Search ............... 395/600, 650, 425, 800

[56] References Cited

U.S. PATENT DOCUMENTS

| | | | |
|---|---|---|---|
| 4,399,504 | 8/1983 | Obermarck et al. | 364/200 |
| 4,480,304 | 10/1984 | Carr et al. | 364/200 |
| 4,941,084 | 7/1990 | Terada et al. | 395/650 |
| 5,057,996 | 10/1991 | Cutler et al. | 364/200 |
| 5,109,511 | 4/1992 | Nitta et al. | 395/650 |
| 5,129,074 | 7/1992 | Kikuchi et al. | 395/425 |
| 5,182,808 | 1/1993 | Bagnoli et al. | 395/725 |

OTHER PUBLICATIONS

Su, Stanley Y. W., *Database Computers*, 1988, pp. 345-346.

*Primary Examiner*—Thomas C. Lee
*Attorney, Agent, or Firm*—Henry D. Pahl, Jr.

[57] ABSTRACT

A resource managing method operates in a computer system in which a variety of processes run essentially simultaneously on a group of processors, each processor being provided with a respective section of memory which is also accessible by the other processors in the group though typically not as quickly as by the respective processor. Resource data objects corresponding to particular resources are located by means of a hash table which is divided into portions which are distributed over respective sections of the overall system memory. A resource manager program, which is essentially replicated for each processor, implements a hashing algorithm which directs requests for access to designated resources to the corresponding portion of the hash table irrespective of which processor originated the request. Each section of the hash table includes a series of entries which provide pointers to respective lists of resource data objects which hash to that entry. The resource data objects, as well as various other data objects, are distributed over the different memory sections and include data elements which implement basic protection latches using a read-modify-write instruction.

5 Claims, 8 Drawing Sheets

| NAMED MEMORY OBJECT ||
|---|---|
| I_SIM | PRIMITIVE SYNCHRONIZATION LATCH |
| I_NUMNODES | NUMBER OF NODE OBJECTS |
| I_NODESIZE | SIZE OF NODE OBJECTS |
| I_CREATED | TRUE AFTER FIELDS ARE INITIALIZED |
| I_NAME | PATHNAME OF NAMED SHARED MEMORY FILE |
| I_NPP[] | ARRAY OF POINTERS TO NODE OBJECTS |

FIG. 4

| NODE OBJECT ||
|---|---|
| I_SIM | PRIMITIVE SYNCHRONIZATION LATCH |
| I_CID | CLUSTER IDENTIFICATION NUMBER |
| I_NID | NODE IDENTIFICATION NUMBER WITHIN CLUSTER |
| I_NUMNODES | NUMBER OF NODES IN CLUSTER |
| I_VALUELEN | LENGTH OF RESOURCE VALUE IN BYTES |
| I_NODEPP[] | ARRAY OF POINTERS TO NODE OBJECTS |
| I_PROCS | QUEUE OF ATTACHED PROCESS ON THIS NODE |
| I_LOCKPOOL | LIST OF UNALLLOCATED LOCK OBJECTS |
| I_RESPOOL | LIST OF UNALLOCATED RESOURCE OBJECTS |
| I_PROCPOOL | LIST OF UNALLOCATED PROCESS OBJECTS |
| I_HASH | SEGMENT OF RESOURCE HASH TABLE |

FIG. 5

| HASH SEGMENT ||
|---|---|
| I_HASHSIZE | NUMBER OF BUCKETS IN AGGREGATE HASH TABLE |
| I_NODESIZE | NUMBER OF ALLOCATED BUCKETS PER SEGMENT |
| I_THISSIZE | NUMBER OF BUCKETS IN USE IN THIS SEGMENT |
| I_HASHP[0] | QUEUE OF RESOURCES HASHING TO BUCKET 0 |
| I_HASHP[1] | QUEUE OF RESOURCES HASHING TO BUCKET 1 |
| I_HASHP[2] | QUEUE OF RESOURCES HASHING TO BUCKET 2 |
| ... | ... |
| I_HASHP[N] | QUEUE OF RESOURCES HASHING TO BUCKET N |

FIG. 6

| PROCESS OBJECT ||
|---|---|
| I_SIM | PRIMITIVE SYNCHRONIZATION LATCH |
| I_PID | PROCESS IDENTIFICATION NUMBER |
| I_CHECK | TRUE IF PROCESS HAS PENDING CALLBACKS |
| I_LOCKS | QUEUE OF OPEN LOCKS |
| I_CALLS | QUEUE OF LOCKS WITH PENDING CALLBACKS |
| I_NODEQ | ENTRY IN NODE'S PROCESS QUEUE |

FIG. 7

| RESOURCE OBJECT | |
|---|---|
| I_SIM | PRIMITIVE SYNCHRONIZATION LATCH |
| I_NAME | NAME OF RESOURCE |
| I_NAMELEN | LENGTH OF NAME |
| I_LOCKCNT | NUMBER OF OPEN LOCKS (GRANTED + REQUESTED) |
| I_GRANTED | QUEUE OF GRANTED LOCKS |
| I_REQUESTED | QUEUE OF REQUESTED LOCKS |
| I_NOTIFYHEAD | QUEUE OF LOCKS WITH NOTIFY FUNCTIONS |
| I_LEVMASK | BIT MASK OF GRANTED LEVELS |
| I_REQMASK | BIT MASK OF REQUESTED LEVELS |
| I_GOTCNTS[6] | NUMBER OF GRANTED LOCKS AT EACH LEVEL |
| I_REQCNTS[6] | NUMBER OF REQUESTS FOR EACH LEVEL |
| I_HASHQ | ENTRY IN NODE'S HASH QUEUE |
| I_VALSTAT | STATUS OF VALUE |
| I_VALUE[] | ARBITRARY USER SPECIFIED VALUE |

FIG.8

| LOCK OBJECT | |
|---|---|
| I_LEVEL | LEVEL THIS LOCK HAS BEEN GRANTED |
| I_REQ_LEVEL | LEVEL THIS LOCK HAS REQUESTED |
| I_REQ_STAT | STATUS OF CURRENT REQUEST IF ANY |
| I_END_STAT | COMPLETION STATUS FOR CALLBACK |
| I_NOTIFY | HIGHEST LEVEL BLOCKED BY GRANTED LEVEL |
| I_REQ_OPTS | CONVERSION OPTIONS FOR CURRENT REQUEST |
| I_REQ_ENDP | REQUESTED COMPLETION CALLBACK FUNCTION |
| I_REQ_NOTP | REQUESTED NOTIFY CALLBACK FUNCTION |
| I_REQ_COOK | REQUESTED CALLBACK COOKIE |
| I_CUR_NOTP | CURRENT NOTIFY CALLBACK FUNCTION |
| I_CUR_COOK | CURRENT CALLBACK COOKIE |
| I_END_VALP | POINTER TO USER VALUE BUFFER FOR REQUEST |
| I_PROCP | POINTER TO OWNING PROCESS OBJECT |
| I_RESP | POINTER TO RESOURCE OBJECT |
| I_RESQ | ENTRY IN RESOURCE'S GRNTD OR RQSTD QUEUE |
| I_NOTIFYQ | ENTRY IN RESOURCE'S NOTIFY QUEUE |
| I_PROCQ | ENTRY IN PROCESS' LOCK QUEUE |
| I_CALLQ | ENTRY IN PROCESS' CALLBACK QUEUE |
| I_VALUE[] | COPY OF RESOURCE VALUE FOR REQUEST |

FIG. 9

DISTRIBUTED RESOURCE MANAGEMENT SYSTEM USING HASHING OPERATION TO DIRECT RESOURCE REQUEST FROM DIFFERENT PROCESSORS TO THE PROCESSOR CONTROLLING THE REQUESTED RESOURCE

BACKGROUND OF THE INVENTION

The present invention relates to parallel processing systems and more particularly to a method for cooperatively managing resources on a system employing a group of processors, each of which is provided with a respective section of memory which is also accessible by other processors in the group.

When a variety of processes may be running simultaneously e.g., in a multi-tasking or time-sharing environment, it is known that some method or technique must be provided for preventing interference between different processes seeking access to the same resource. Resources may, for example, be files, portions of a data base, or physical entities such as a printer or display screen.

As is understood by those skilled in the art, the extent of access which one process requires with respect to a given resource, may change very frequently. This is done so that high level or exclusive levels of access are existent only for as short a time as possible, since high levels of access effectively exclude other processors. On the other hand, multiple processes can typically have simultaneous access at low levels, such as read only in the case of files.

In the prior art, various systems have been developed, such as file and record locking schemes, for implementing appropriate protections on single-processor systems. Certain locking schemes have also been extended to systems comprising small numbers of processors. For example, Digital Equipment Corporation of Maynard, Mass. provides a VMS lock manager system for protecting resources in its VAX line of computers when such computers are operated in clusters. Typically, however, the data managed by the lock manager system runs is tied to the memory of that one of the computers which first identified a given resource and processes running on other processors must access that data by means of a message passing scheme in order to effect any claim for access rights to the resource.

As will be perceived by those skilled in the art, a lock manager system which depends heavily on a single or master processor, will be very inefficient when the number of processors becomes large since the lock manager itself, together with its data, will be a hot spot or source of contention amongst various processes running on many different processors. Stated another way, such schemes do not permit linear growth or graceful scaling of performance in relation to the number of processors.

As is also understood, there is increasing interest in massively parallel processors, i.e. computer systems in which very large numbers of processors are employed, since it is increasingly difficult to improve the power or capability of single-processors due to physical limits.

Among the several objects of the present invention may be noted the provision of a novel method for managing resource in a multi-processor computer system, the provision of such a method which scales gracefully; the provision of such a method which operates effectively with relatively large numbers o processors; the provision of such a method in which resource management data is distributed over the system memory; the provision of such a method which automatically provides updated request status information to processors seeking a resource; the provision of such a method which is highly reliable, which operates effectively and which is of relatively simple and inexpensive implementation. Other objects and features will be in part apparent and in part pointed out hereinafter.

SUMMARY OF THE INVENTION

The computer method of the present invention cooperatively manages resources which may be needed by a variety of processes running essentially simultaneously on a group of processors each of which is provided with a respective section of memory which is also accessible by other processors in the group. A resource manager program is essentially replicated for each processor in its respective memory section. A hash table, used by the manager program, is divided into portions which are distributed over respective sections of the memory. The manager program implements a hashing algorithm which directs requests for access to designated resources to the same section of memory, irrespective of which processor originated the request.

Preferably, there is associated with each portion of the hash table, a plurality of resource data objects which can be assigned to named resources and which can record information regarding the processors which have access or have requested access to the respective resource and each section of the hash table includes a series of entries which provide pointers to respective linked lists of resource objects whose names hash to that entry.

BRIEF DESCRIPTION OF THE DRAWINGS

FIGS. 4-9 are illustrations of data objects which implement the resource management functions of the present invention.

Corresponding reference characters indicate corresponding parts throughout the several views of the drawings.

DESCRIPTION OF THE PREFERRED EMBODIMENT

As indicated previously, the resource manager of the present invention is intended for use in connection with parallel processing systems employing large numbers of processors and particularly for use with such systems in which each processor is provided with a respective section of memory which is also accessible by other processors in the group. The particular embodiment of the invention disclosed herein is particularly adapted for operation on the TC2000 line of computers manufactured and sold by Bolt Beranek and Newman, Inc. of Cambridge, Mass., the assignee of the present application. These machines utilize the Motorola 88K line of microprocessors and the design of these machines is intended to permit up to 512 processors to be operated simultaneously. The operating system software provided with the computers allows processors to be assigned in groups or clusters to a given user application or group of applications To a substantial extent, each cluster may be treated as a separate computer with its own operating system. The operating system also provides for file handling and for mapping files into memory.

As do certain other multi processor systems, the TC2000 computers provide a read-modify-write memory operation which is performed as an atomic or uninterruptable operation. As is understood by those skilled in the art, such an operation allows a process to claim a data structure for excusive use while simultaneously checking to see that no other process has already claimed the data structure. For example, by setting a bit in a stored data word to a "1" (indicating claimed), the process will not distrub the setting if the bit was already a "1" but, at the same time, the requesting process can determine that the data structure was not claimed if the bit previously was a "0". This then can constitute a very basic latch or lock preventing interference between simultaneously running program segments. This basic latch type is used repeatedly in the more elaborate resource management method of the present invention. In the data structures described in greater detail hereinafter, the data providing this basic latch function is identified as a "SIMLATCH".

Figure 1:
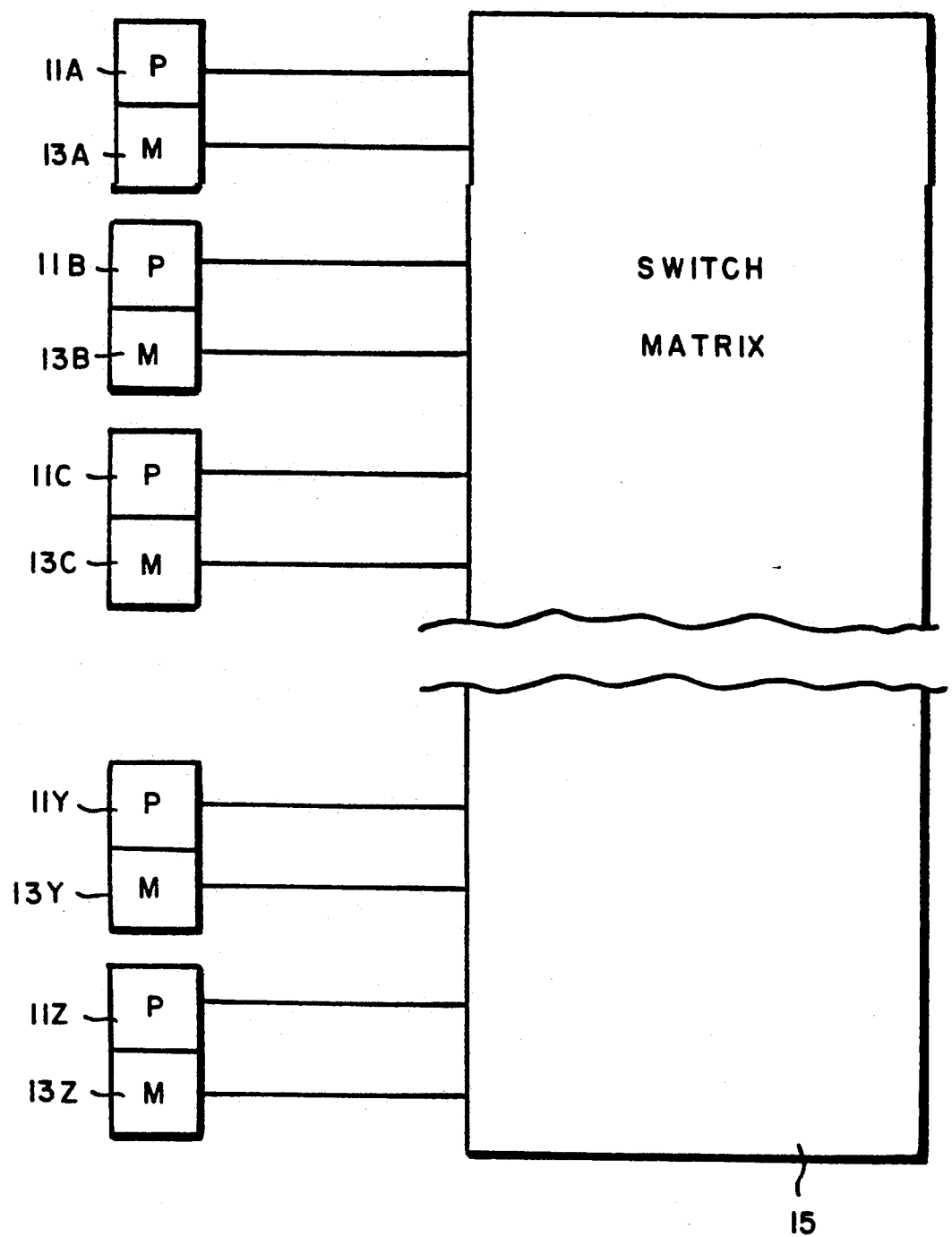
FIG. 1 is a diagramatic illustration of a multi-processor computer architecture with which the resource management process of the present invention is useful.

In FIG. 1, a group of processors are designated by reference characters 11A-11Z. Associated with each processor is a respective memory section, these memory sections being designated by reference characters 13A-13C. It has become conventional to refer to each processor and its respective memory section as a node. The processors and the respective memory sections are inter-connected through a switch matrix designated generally by reference character 15. The arrangement of the particular switch matrix employed in the TC2000 line of computers may be diagrammed in a manner which resembles a possible diagramming of the Fourier butterfly transform and this resemblance has given rise to the designation Butterfly for a predecessor line of computers employing a similar architecture.

The switch matrix 15 allows each processor to address, essentially directly, not only its respective memory section, but also all other memory sections, though addressing remote memory sections is somewhat slower than addressing local memory. Addressing of remote memory sections is essentially direct in that it does not require message passing or interruption of the processors corresponding to the remote memory. This computer architecture falls generally within the class of architectures which are described as NUMA, (non-uniform memory architectures). To provide graceful scaling of the resource management facilities provided by the method of the present invention, the data structures which are utilized by the management process, are distributed over the entire group of processors and their respective memory sections thereby minimizing, as completely as possible, unbalanced dependence on any given processor and its associated memory section.

At the outset, it should be understood that the resource managing method of the present invention is essentially consensual, that is, it does not enforce locks or deny access to resources. Rather, the method provides a set of tools or procedures which can be utilized by appropriately designed application programs to obtain shared access to resources without undue interference or contention.

The basic resource manager program is linked as a library to each application program which uses the resource manager and is loaded into the respective memory section for each processor. Application programs utilize the resource manager and the resources controlled thereby by making library function calls to the resource manager. The resource manager itself utilizes various types of data structures, these data structures being illustrated in FIGS. 4 through 9. At the outset, it is useful to describe these data objects in general terms and to indicate where they reside within the overall system. In FIGS. 4 through 9, the data elements in each object are given the same name as used in the source code appended to this specification and each name is followed with a brief description of the function provided by that data element.

NAMED MEMORY OBJECT

The Named Memory Object illustrated in FIG. 4 is a data object which is present only on Node 0 and as only a single instance. This object represents the very small amount of data which can be accessed by all of the copies of the memory management program, so as to determine that the various data structures have in fact been created and to determine the number of nodes which are participating in the cluster and like information.

NODE OBJECT

Each of the processors in the group will contain, in its respective memory section, an instance of a node object (FIG. 5) which stores data identifying the node and the cluster or group within which it resides, as well as data identifying the various processes which may be operating on the node.

HASH SEGMENT

Also present within the memory section for each node will be a respective segment or portion of a hash table which is distributed over the various nodes within the cluster or group. The hash table segment is illustrated in FIG. 6. As may be seen, the hash segment data object includes some small amount of data respecting the characteristics of the overall hash table together with a succession of entries (commonly called "buckets") which contain pointers to linked lists of resource data objects. Each list of resource data objects identifies those resources whose names hash to that entry. As indicated previously, neither the actual resources associated with each entry in the hash segment, nor the processors which may be needing those resources, need be directly associated with the node which stores the respective hash segment data object.

PROCESS OBJECT

A substantial number of process objects (FIG. 7) are allocated or assigned to each node so as to be available to processes running on the respective processor. The number of process objects on each node is a configuration parameter, preferably chosen larger than the number of processes which are likely to be simultaneously active on a given node and seeking managed resources. At this point, it should be noted that a single process may request access to multiple resources and thus, the process data object includes pointers to a queue of open locks and a queue of locks with pending call-backs as described hereinafter

RESOURCE OBJECT

The memory associated with each processor or node also contains or has allocated a plurality of resource data objects (FIG. 8). Again, the number of resource objects provided for is a configuration parameter, which is established taking into consideration the likely needs and demands of the user application programs which are to be running within the cluster. Each resource object, when utilized, is associated with an entry in the hash segment on the same node. A resource object is utilized when a process seeks to obtain access to a named resource and the name of the resource hashes to an entry in the hash segment data object on the node. An available resource object is assigned that name and is entered into the queue of resource object hashing to the hash segment entry as indicated previously. While the resource names should be unique, multiple names may hash to a single hash table entry. Access to a particular resource may be sought by a plurality of processes and, under certain circumstances, multiple accesses may be granted simultaneously. Accordingly, the data structure of the resource object contains data defining the level of granted access and the levels of requested accesses, as well as a list of queues of granted and requested accesses or locks.

LOCK OBJECT

Figure 10:
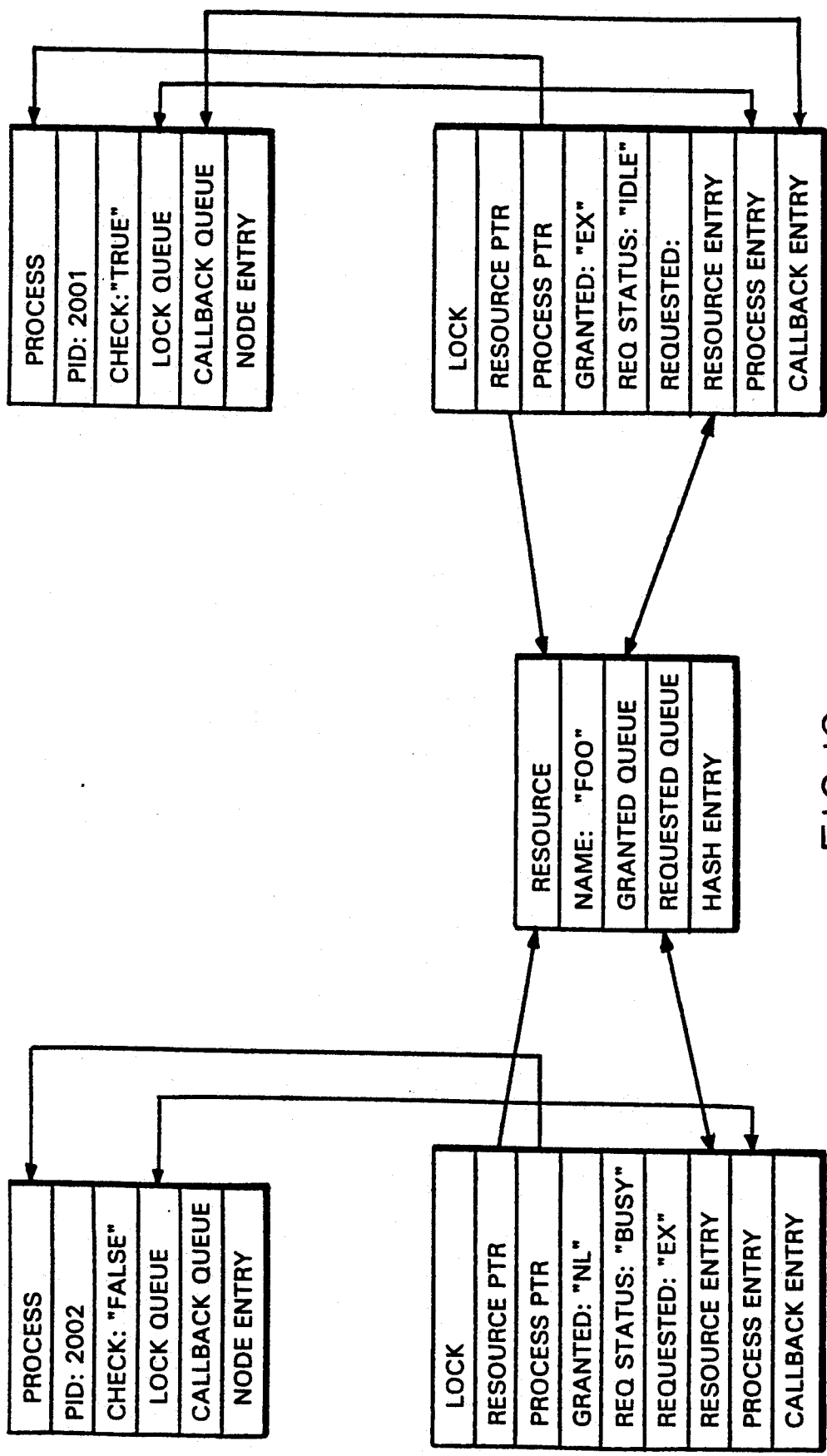
FIG. 10 illustrates linkages between the elements of different types of data objects.

A lock object links a single process object to a single resource object. Although, as stated previously, process objects can link to multiple resource objects and resource objects may be linked to multiple process objects, each link utilizes a separate lock object such as is illustrated in FIG. 9. Accordingly, the lock object data structure includes pointers to the owning process and to the resource to which the access relates, as well as various other values or parameters which are utilized by the resource manager program. Many of these other parameters are utilized in manipulating other lock objects when the level pertaining to a given lock object changes. During much of the functioning of the resource manager of the present invention, a particular process and a particular resource are linked essentially only through the lock object. In various of the data elements, the term "cookie" is used to designate identifying data, i.e. data which identified a requesting program object for callback or a resource object which is sought. FIG. 10 illustrates in somewhat simplified form, the nature of the links which may exist between data elements in a set of process, resource and lock data objects. FIG. 10 employs names for the various data elements which are somewhat more descriptive than the names used in the actual program source code and the following is a table for translating those names.

| NODE | → | lmi_node |
| CID | → | i_cid |
| NID | → | i_nid |
| NODE COUNT | → | i_numnodes |
| PROCESS QUEUE | → | i_procs |
| NODE DIRECTORY | → | i_nodepp |
| HASH SIZES | → | i_hash.i_hashsize, i_hash.i_nodesize, i_hash.i_thissize |
| HASH PTR | → | i_hash.i_hashp |
| PROCESS | → | lmi_proc |
| PID | → | i_pid |
| CHECK | → | i_check |
| LOCK QUEUE | → | i_locks |
| CALLBACK QUEUE | → | i_calls |
| NODE ENTRY | → | i_nodeq |
| RESOURCE | → | lmi_res |
| NAME | → | i_name |
| GRANTED QUEUE | → | i_granted |
| REQUESTED QUEUE | → | i_requested |
| HASH ENTRY | → | i_hashq |
| LOCK | → | lmi_lock |
| RESOURCE PTR | → | i_resp |
| PROCESS PTR | → | i_procp |
| GRANTED | → | i_level |
| REQ STATUS | → | i_req_stat |
| REQUESTED | → | i_req_level |
| RESOURCE ENTRY | → | i_resq |
| PROCESS ENTRY | → | i_procq |
| CALLBACK ENTRY | → | i_callq |

As indicated previously, the resource manager of the present invention provides functionality substantially beyond simple record or file locking. In particular, the resource manager of the present invention provides a mechanism for shared consensual access to resources at various levels, some of which may coexist. While the different levels might accurately be described as levels of "access", they are conventionally referred to, for historical reasons, as levels of "lock". Accordingly, for purposes of present description, levels of lock should be understood as being essentially synonymous with levels of access.

The particular embodiment of the invention described herein provides for six levels of lock. These levels of lock may be described as follows:

LM_NL—The null level serves as an indicator of interest and a place holder for future lock conversions, with no read or write access granted. Locks are opened at the null level.

LM_CR—The concurrent read level provides shared read access to the resource, and allows sharing with other readers and concurrent writers. It is generally used for "unprotected" reads which allow simultaneous writes It can also be used in a hierarchical name locking scheme to mark the names on the rooted path to a name being locked for protected read; this keeps the ancestral names from being locked for protected write, while allowing "cousin names to still be locked for protected read or write. In this sort of hierarchical locking scheme, a protected read lock on an ancestral name allows all of its descendants to be read with protection without individually locking each descendant.

LM_CW—The concurrent write level provides write access to the resource, and allows sharing with other concurrent readers and writers. It is generally used for "unprotected" writes which allow concurrent readers and writers, but no protected readers or writers. It can also be used in a hierarchical name locking scheme to mark the names on the rooted path to a name being locked for protected write; this keeps the ancestral names from being locked for protected read or write, while allowing "cousin" names to still be locked for protected read or write. In this sort of hierarchical locking scheme, a protected write lock on an ancestral name allows all of its descendants to be written with protection without individually locking each descendant.

LM_PR—The protected read level provides a traditional shared read lock, allowing other readers but no writers.

LM_PW—The protected write level provides a traditional write update lock, allowing concurrent readers, but no protected readers and no other writers.

LM_EX—The exclusive level provides a traditional exclusive lock with write access, allowing no other readers or writers.

A lock is initially opened by lm_open at LM_NL, and the level can be changed using the lm_convert function. In general, a resource can be locked at several levels at once. The following table summarizes the compatibility of the various lock levels. When a resource is already locked by some process at the "held" level, an attempt to get at the "get" level does the following:

| held | get → | LM_NL | LM_CR | LM_CW | LM_PR | LM_PW | LM_EX |
|---|---|---|---|---|---|---|---|
| LM_NL | | succeeds | succeeds | succeeds | succeeds | succeeds | succeeds |
| LM_CR | | succeeds | succeeds | succeeds | succeeds | succeeds | blocks |
| LM_CW | | succeeds | succeeds | succeeds | blocks | blocks | blocks |
| LM_PR | | succeeds | succeeds | blocks | succeeds | blocks | blocks |
| LM_PW | | succeeds | succeeds | blocks | blocks | blocks | blocks |
| LM_EX | | succeeds | blocks | blocks | blocks | blocks | blocks |

While the source code for the preferred embodiment of the computer resource managing method of the present invention, written in the C++ programming language, is appended to this specification, the following description of the general mode of operation of the program will convey its essential nature.

Figure 2:
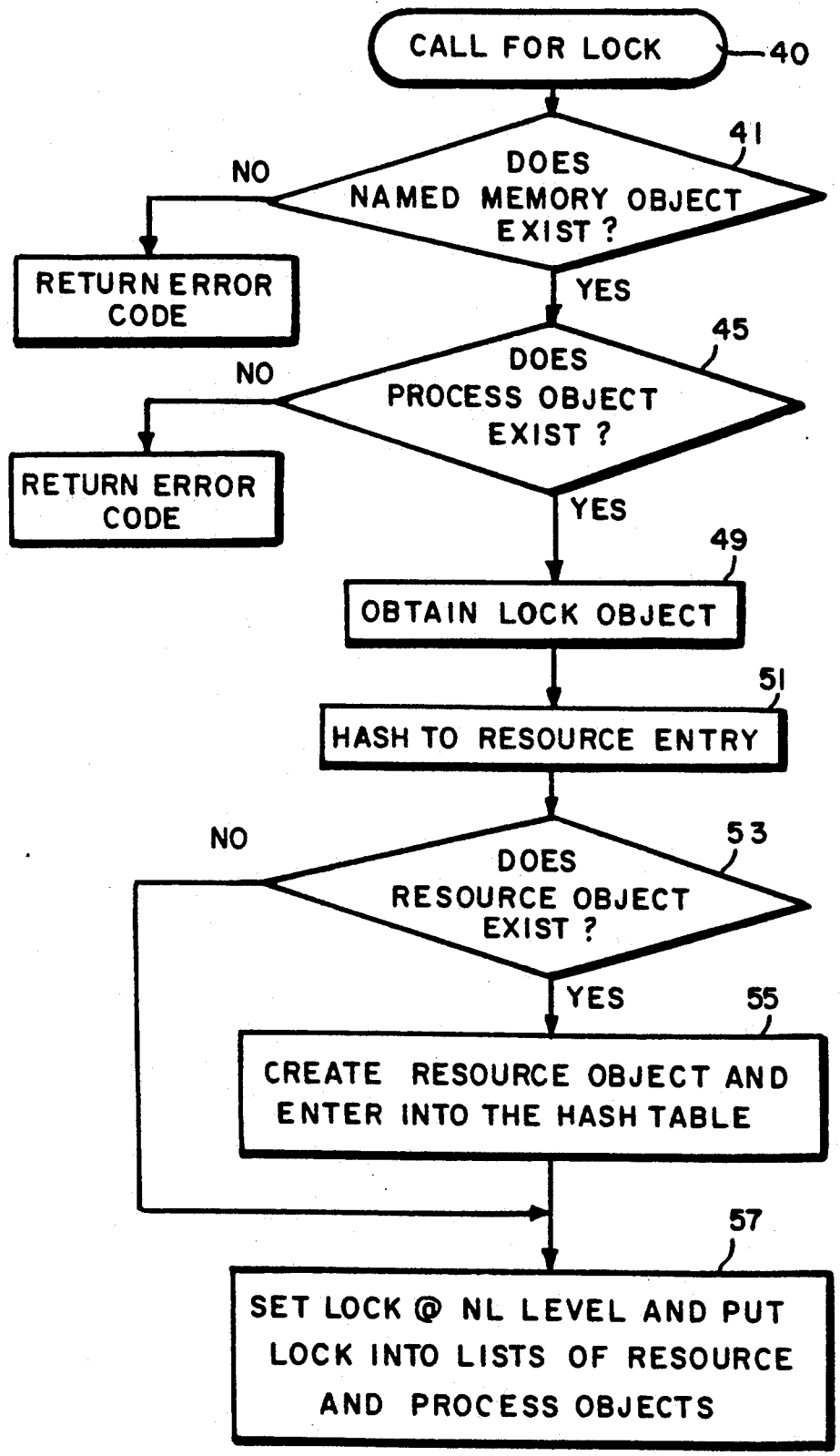
FIG. 2 is a flow chart illustrating an initialization procedure which is implemented by the method of the present invention when a process requests a resource which operates under the management process.

An application program or constituent process thereof desiring to use a resource under the lock manager initially calls for the opening of a lock by issuing a lm_open function call as referenced at 40 in FIG. 2. The resource manager program, upon receiving an lm_open call, checks to see that the named memory object exists, as indicated at reference character 41. If the named memory object does not exist, an error code is returned as indicated at step 42. The program also checks to determine if a process object corresponding to the corresponding process already exists at step 45. As noted previously, a process can have locks open on many objects so the needed process object may already exist even though the application program is calling for the opening of a new lock. If the process object does not exist, an error code is returned as indicated at 47. Once the appropriate process object is determined to exist, the manager obtains a lock object from the pool of available lock objects as indicated at step 49.

As indicated previously, resources are named and the name of the sought resource is hashed to determine the appropriate entry into the hash table. This step is indicated at reference character 51. As noted previously, each copy of the resource manager program utilizes the same hashing algorithm so that a particular resource name will direct the program to the same portion of the hash table in the same section of memory, irrespective of which node initiated the inquiry.

As described previously, each entry in the hash table contains a pointer to a linked list of resource objects whose names hash to that entry. While the number of resource objects corresponding to each entry is preferably small, it will be understood by those skilled in the art that the nature of the hashing process necessarily allows that more than one resource object can exist for any hash table entry. The resources corresponding to each entry are stored as a doubly linked list. The resource manager program scans this list to determine if a resource object corresponding to the unique resource name and request already exists (step 53) and, if it does not, the resource object is created as indicated at step 55. The lock object is initially set at null level (NL) as indicated at step 57.

As indicated previously, cooperative application programs establish or set up locks relatively infrequently, e.g. typically only at the start and close respectively of a given process or program thread, but change level of lock frequently so as to minimize the time when a given resource is blocked for access by other processes which may be running essentially simultaneously on either the same or other nodes.

Figure 3:
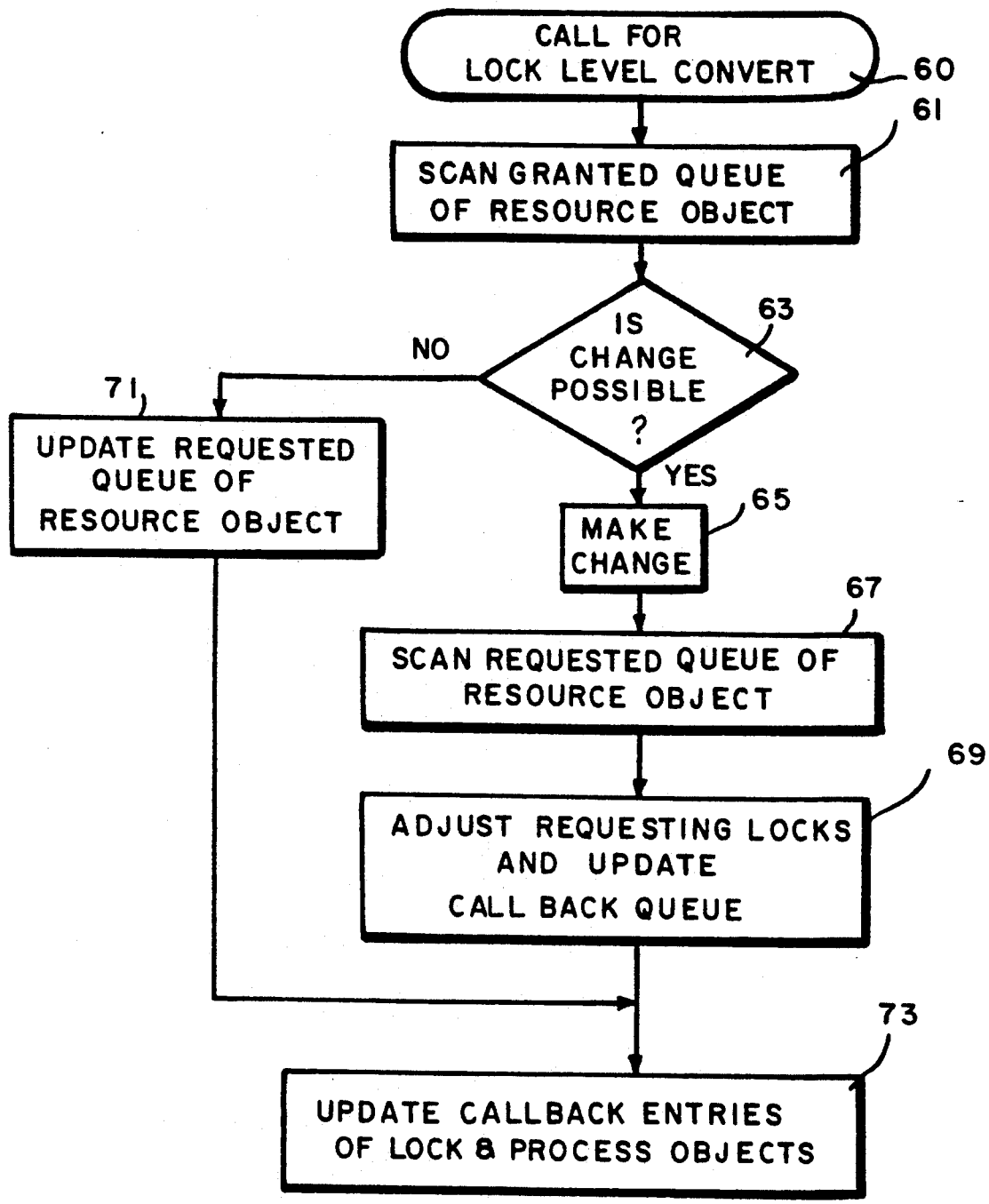
FIG. 3 is a flow chart illustrating a procedure implemented when a process indicates that it wishes to convert its level of access to a resource.

With reference to FIG. 3, the procedure for changing lock level is essentially as follows. Initially, the program must scan the queue of granted locks or accesses of the particular resource object to determine the state of accesses or locks already granted. From this information, the program determines whether the change or conversion sought is possible in accordance with table of permitted conversions given previously. If the change is possible, it is made as indicated at step 65.

Particularly if the change in level is to a lower level, the possibility of granting pending requests may be changed by the change in level implemented by the current call. Accordingly, the program scans the queue of requested converts corresponding to the particular resource object as indicated at step 67. If any of the requesting locks can be adjusted in status, these changes are made and the callback queue is similarly updated, this being indicated by reference character 69. The callback queue is available to be checked by processes which may have been previously blocked. Such processes may, for example, have been "put to sleep" under the control of their respective application programs but such processes are typically awakened periodically by the operating system so that they can check the status of the condition which caused the blocking. As will be understood by those skilled in the art, processes in multiprocessor environments may be blocked or put to sleep for various reasons, e.g. synchronization in addition to non-availability of resources such as are managed by the method of the present invention.

If the desired change in lock level is not possible, the requesting process is entered into the requested queue corresponding to the resource object. As indicated previously, the state of the entry in the requested queue may subsequently be altered by a change in the state of granted locks, e.g. an exclusive level lock may be lowered, and at such time the callback queue will also be changed so that the blocked process continue. If a given change is not possible, a program also updates the call back entries of the corresponding lock and process objects so that the blocked processes are notified of the fact.

As described previously, changes in level occur much more frequently than the opening and closing of locks.

It is an important aspect of the present invention that the procedure for converting levels as described with reference to FIG. 3 does not require accessing of its corresponding portion of the hash table or obtaining any related data objects. Accordingly, changes in level are performed with relatively little machine time overhead as compared with the opening and closing operations.

The process for closing locks is essentially complementary to the process for opening locks and operates to restore the status of the involved data objects.

As indicated previously, the source code for one particular embodiment of the resource manager is appended to this specification. The program is written in multiple sections and subroutines and a brief description of each of these is as follows.

lockman.h—Contains definitions for public interface functions and interface structure definitions used by code outside the lock manager. This includes definitions of interface functions and their arguments, flags and option structures that can be passed to interface functions status and error code definitions, and status reporting functions and structures.

lm_face.cxx—Contains the public interface functions called by code outside the lock manager. These interface functions generally do some argument validation and conversion, and then call C++methods on the underlying data objects to do the real work.

lmi.hxx—Contains internal definitions of the lock manager data structures and functions. The definitions of all the major internal data structures and methods that operate on them are here.

lmi_mapmem.cxx—Contains C++methods for the named shared memory object. These are the methods used to attach and detach from a given named shared memory segment.

lmi_node.cxx—Contains C++methods for the node object. There is a node object for each distinct processor/memory node on which the lock manager is being used. lmi_hash.cxx Contains C++methods for the hash table object. There is a hash object in each node, to handle that node's share of the resource name hash table.

lmi_proc.cxx—Contains C++methods for the process object. Storage for new process objects is kept in free lists on each node, and a new process object is allocated when a process attaches to the lock manager, and freed when it detaches All code that modifies a field of the process object is here.

lmi_res.cxx—Contains C++methods for the resource object. Allocation and freeing of resources, conversions, and so forth are handled here. This code is also allowed to access fields in the lock object to expedite making changes to other locks when a lock level is changed.

lmi_lock.cxx Contains C++methods for the lock object. Allocations and freeing of resources and interfaces to other lock operations are handled here. The resource methods are also allowed to work on lock objects, so much of the actual work is done in the resource methods.

lmi_pool.cxx—Contains C++methods for storage pool and free list management. The node object contains free list pools of storage for new processes, resources, and locks.

lmi_queue.cxx—Contains C++methods implementing queues as doubly linked lists. Many of the methods provide specialized services for particular queues and entries in queues.

lmi_sim.cxx—Contains C++methods implementing the simple latches used to protect and synchronize parallel access to data structures.

lmi_simwait.cxx—Contains functions that help to tune the spin loops used to implement simple latches.

realtime.hxx—Contains definitions for 64 bit realtime clock system service that returns current time in microseconds.

unsigned64.hxx—Contains C++definitions for unsigned 64 bit data class.

lmi_unsigned64.c—Contains methods that implement unsigned 64 data class, for unsigned 64 bit arithmetic. This is used in implementing simple latches to measure the passage of real time using a system service that returns a 64 bit time in microseconds.

lmi_md.c—Contains machine dependent helper functions for the lock manager library. These encapsulate the interface to the operating system services used.

lm_msg.cxx—Contains functions and declarations related to lock manager status codes and error messages.

lm_print.cxx—Contains debugging print functions for lock manager status structures.

lm_prcookie.cxx—Contains the default print function for debugging printout of "cookies".

lm_prendfun.cxx—Contains the default print function for debugging printout of completion function pointers.

lm_prnotfun.cxx—Contains the default print function for debugging printout of blocking notify function pointers.

lm_prvalp.cxx—Contains the default print function for debugging printout of user value buffer pointers.

lm_rvalue.cxx—Contains the default print function for debugging printout of resource and lock value buffers.

lm_checkp.cxx—Contains just the initialized global declaration for lm_checkp.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

APPENDIX

Mar 15 20:29 1990  lockman.h Page 1

```
#ifndef _LOCKMAN_H
#define _LOCKMAN_H
/*******************************************************************
File:     lockman.h
Contents: Public definitions for clients of the lock manager library (liblm).
System:   BBNACI Programming Environments.
Created:  10-Aug-1988
Author:   rwells Remarks: This header file should be usable with C, ANSI C, or C++.  It
provides function prototypes for ANSI C and C++ under conditional
compilation.  It assumes that __STDC__ will be defined under ANSI C,
and assumes that c_plusplus will be defined under C++.  The draft ANSI
C standard requires that __STDC__ be defined, and the OASIS ccxx
translater defines c_plusplus.

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*******************************************************************/

/* $Header: /nfs/oak/ul/ksedgwic/src/liblm/RCS/lockman.h,v 1.22 90/03/15 20:30:29 rwells Exp $ */

/* ----- environmental variables --------------------------------- */ define ENV_SIM_TIMEOUT_VAR    "LM_SIM_TIMEOUT"

/* ----- conditional compilation flags --------------------------- */

/* LM_SYSDEF_ATOMIOR32  --> use atomior32 instead of atommem as atomic op */
/* LM_SYSDEF_ATOMDUMMY  --> define dummy atommem for debugging */
/* LM_SYSDEF_CLUSTER    --> use cluster_stat and vm_allocate_and_bind */
/* LM_SYSDEF_GETRTC     --> use getrtc function for real time clock */
/* LM_SYSDEF_KERN_RETURN --> <sys/kern_return.h> exists for compilation. */
/* LM_SYSDEF_PROTOTYPES --> function prototypes are supported. */
/* LM_SYSDEF_VOIDPTR    --> pointers to void are legal as generic pointers. */
/* LM_SYSDEF_UNIFORM    --> uniform system library can be used for testing. */
/* LM_SYSDEF_USER_SLEEP --> use user_sleep_and_unlock and user_wakeup */ define LM_SYSDEF_KERN_RETURN 1 /* -I/usr/BFMACH/usr/include on BBNACI Suns */ ifdef __STDC__
define LM_SYSDEF_PROTOTYPES  1 /* __STDC__ */
#define LM_SYSDEF_VOIDPTR     1 /* __STDC__ */
endif ifdef c_plusplus
define LM_SYSDEF_PROTOTYPES  1 /* c_plusplus */
#define LM_SYSDEF_VOIDPTR     1 /* c_plusplus */
endif /* BELMONT: Lint is not pleased with void pointers.  We'll turn them
   off when lint is running.  Also, prototypes are not required because
   lint libraries take care of the same thing. -ksedgwic 21-Feb-89 */
#ifdef lint
#undef LM_SYSDEF_PROTOTYPES    /* lint */
#undef LM_SYSDEF_VOIDPTR       /* lint */
#endif /* lint */
```

```c
#if ! defined(__STDC__) && ! defined(c_plusplus) && ! defined(lint)
#undef  LM_SYSDEF_PROTOTYPES    /* ! __STDC__ && ! c_plusplus */
#define LM_SYSDEF_VOIDPTR    1 /* Sun C compiler */
endif ifdef butterfly
define LM_SYSDEF_ATOMIOR32  1 /* butterfly (GP1000) */
#undef  LM_SYSDEF_ATOMDUMMY    /* butterfly (GP1000) */
#define LM_SYSDEF_CLUSTER    1 /* butterfly (GP1000) */
#define LM_SYSDEF_GETRTC     1 /* butterfly (GP1000) */
#define LM_SYSDEF_UNIFORM    1 /* butterfly (GP1000) */
#define LM_SYSDEF_USER_SLEEP 1 /* butterfly (GP1000) */
#else
#undef  LM_SYSDEF_ATOMIOR32    /* ! butterfly (GP1000) */
#define LM_SYSDEF_ATOMDUMMY  1 /* ! butterfly (GP1000) */
#undef  LM_SYSDEF_CLUSTER      /* ! butterfly (GP1000) */
#undef  LM_SYSDEF_GETRTC       /* ! butterfly (GP1000) */
#undef  LM_SYSDEF_UNIFORM      /* ! butterfly (GP1000) */
#undef  LM_SYSDEF_USER_SLEEP   /* ! butterfly (GP1000) */
endif /* ----- supporting include files ---------------------------------- */ include <sys/types.h>        /* For size_t, u_short */

/* ----- status codes ---------------------------------------------- */ typedef enum
{
    LM_STAT_FIRST,          /* Status code base */
    LM_STAT_BADARG,         /* bad argument value */
    LM_STAT_BADCLUSTER,     /* Bad cluster id */
    LM_STAT_BADCREATE,      /* Can't call lm_create again */
    LM_STAT_BADLEVEL,       /* bad lock level arg */
    LM_STAT_BADNAME,        /* bad name length */
    LM_STAT_BADNID,         /* node number out of range */
    LM_STAT_BADOBJECT,      /* Bad object type */
    LM_STAT_BADOPTION,      /* bad option mask */
    LM_STAT_BADPID,         /* no such process */
    LM_STAT_BADSIZE,        /* bad struct size */
    LM_STAT_BADVERSION,     /* library version incompatibility */
    LM_STAT_BUSY,           /* with prev request */
    LM_STAT_CANCELLED,      /* Convert cancelled */
    LM_STAT_DEADLOCK,       /* Deadlock victim */
    LM_STAT_DETACHED,       /* Detached process */
    LM_STAT_DONE,           /* Function worked. */
    LM_STAT_DUBVALUE,       /* Got dubious value */
    LM_STAT_FREE,           /* Object not in use */
    LM_STAT_GOTVALUE,       /* Worked, got value */
    LM_STAT_IDLE,           /* Nothing to cancel */
    LM_STAT_MAXBYTES,       /* Needs too much memory */
    LM_STAT_MAXLOCKS,       /* Too many locks */
    LM_STAT_MAXOLOCKS,      /* Too many open locks */
    LM_STAT_MAXPROC,        /* Too many procs */
    LM_STAT_MAXRES,         /* Too many resources */
    LM_STAT_NIY,            /* Not implemented yet */
    LM_STAT_NOCREATE,       /* lm_create needed */
    LM_STAT_NOSPACE,        /* No lockman space left */
    LM_STAT_NOTOWNER,       /* Must be lock owner */
    LM_STAT_NOTQUEUED,      /* blocked NOQUEUE */
    LM_STAT_NOVALUE,        /* Got no value */
    LM_STAT_NULLPTR,        /* Null ptr argument */
    LM_STAT_POSTED,         /* Wakeup by lm_post */
    LM_STAT_QEMPTY,         /* Empty internal queue */
    LM_STAT_QFAIL,          /* Failed internal queue */
    LM_STAT_QUEUED,         /* blocked NOWAIT */
    LM_STAT_SIGNAL,         /* Signal ended wait */
    LM_STAT_SIMLOCK,        /* Failed internal lock */
```

```
        LM_STAT_SIMUNLOCK,          /* Failed internal unlock */
        LM_STAT_TIMEOUT,            /* Got timeout */
        LM_STAT_U64VALUE,           /* Done, got u64 counter value */
        LM_STAT_U64MAX,             /* Maximum value for u64 counter */
        LM_STAT_LAST,               /* Status code limit */
        LM_STAT_ERRNO_FIRST=1000,   /* errno code base */
        LM_STAT_ERRNO_LAST=1999,    /* errno code limit */
        LM_STAT_KERNEL_FIRST=2000,  /* kernel retrn base */
        LM_STAT_KERNEL_LAST=2999,   /* kernel retrn limit */
} lm_stat;

/* ----- Creating the instance ----------------------------------- */ ifdef LM_SYSDEF_VOIDPTR
typedef void *lm_voidp;
#else
typedef char *lm_voidp;
endif ifdef LM_SYSDEF_PROTOTYPES
lm_stat lm_create(char *name, int maxprocs, int maxlocks, int maxres,
                  int hashsize, size_t valuelen, lm_voidp address,
                  size_t maxbytes);
#else
lm_stat lm_create();
endif /* ----- Enabling event logging ---------------------------------- */ ifdef LM_SYSDEF_PROTOTYPES
void lm_elog(int optionmask);
#else LM_SYSDEF_PROTOTYPES
void lm_elog();
endif LM_SYSDEF_PROTOTYPES /* ----- Attaching processes ------------------------------------- */ typedef struct lm_con *lm_conp; /* Defines context object handle */ ifdef LM_SYSDEF_PROTOTYPES
lm_stat lm_attach(char *name, /*OUT*/ lm_conp *lmcpp);
lm_stat lm_attachforstat(char *name, /*OUT*/ lm_conp *lmcpp);
lm_stat lm_detach(lm_conp lmcp);
lm_stat lm_detach_pid(int pid);
#else
lm_stat lm_attach();
lm_stat lm_attachforstat();
lm_stat lm_detach();
lm_stat lm_detach_pid();
endif /* ----- Opening and converting locks ---------------------------- */ define LM_MAXNAMELEN (31)
define LM_MAX_LOCKS_PER_RESOURCE (65535)
define LM_NUM_LEVELS  6        /* Number of levels */ typedef struct lm_lock *lm_lockp; /* Defines lock handle */
/* The explicit values in the lm_level enum should not be altered
   because installed code uses them as index values (casts them
   as int's) -ksedgwic 21-Feb-89 */
typedef enum                    /* Defines lock levels */
{
    LM_NL = 0,                  /* Starting level */
    LM_CR = 1,                  /* Concurrent read */
    LM_CW = 2,                  /* Concurrent write */
    LM_PR = 3,                  /* Protected read */
    LM_PW = 4,                  /* Protected write */
```

```
    LM_EX = 5,                    /* Exclusive level */
} lm_level;

#ifdef LM_SYSDEF_PROTOTYPES
typedef int (*lm_endfunp)(lm_voidp cookie, lm_stat endstat);
typedef int (*lm_notfunp)(lm_voidp cookie, lm_level toplevel);
typedef void (*lm_user_printfunp)(char* ...);
#else
typedef int (*lm_endfunp)();
typedef int (*lm_notfunp)();
typedef void (*lm_user_printfunp)();
endif typedef struct                    /* Defines option structure */
{
    int       timeout;            /* LM_TIMEOUT value */
    lm_endfunp nowait_fp;         /* LM_NOWAIT callback */
    lm_notfunp notify_fp;         /* LM_NOTIFY callbk */
    lm_voidp   cookie;            /* client lock handle */
    lm_voidp   lockvalp;          /* lock val buf ptr */
} lm_option, *lm_optionp;

/* Option mask flags for convert */
#define LM_TIMEOUT     (0x001)  /* Wait timeout */
#define LM_INTERRUPT   (0x002)  /* Interruptable wait */
#define LM_NOQUEUE     (0x004)  /* Don't queue req */
#define LM_EXPRESS     (0x008)  /* Express priority */
#define LM_NOWAIT      (0x010)  /* Async request */
#define LM_NOTIFY      (0x020)  /* Blocking notify */
#define LM_GETVALUE    (0x040)  /* Get lock value */
#define LM_PUTVALUE    (0x080)  /* Put lock value */
#define LM_NOVALUE     (0x100)  /* Mark value nil */
define LM_DUBVALUE    (0x200)  /* Mark value dubious */ ifdef LM_SYSDEF_PROTOTYPES
lm_stat lm_open(lm_conp lmcp, lm_lockp parentp, char *lockname,
                size_t locknamelen, /*OUT*/ lm_lockp *lmlpp);

lm_stat lm_convert(lm_lockp lmlp, lm_level locklevel, int optionmask,
                lm_optionp lmop);

lm_stat lm_open_convert(lm_conp lmcp, lm_lockp parentp, char *lockname,
                size_t locknamelen, lm_level locklevel,
                int optionmask, lm_optionp lmop,
                /*OUT*/ lm_lockp *lmlpp);
#else
lm_stat lm_open();
lm_stat lm_convert();
lm_stat lm_open_convert();
endif /* ----- Other lock operations ------------------------------------------ */ ifdef LM_SYSDEF_PROTOTYPES
lm_stat lm_cancel(lm_lockp lmlp);
lm_stat lm_close(lm_lockp lmlp);
#else
lm_stat lm_cancel();
lm_stat lm_close();
endif /* ----- lm_check ------------------------------------------------------- */ extern int *lm_checkp;             /* Hidden global used by lm_check macro. */ ifdef LM_SYSDEF_PROTOTYPES
lm_stat lm_checkfun(void);         /* Hidden function used by lm_check macro. */
#else
```

```
lm_stat lm_checkfun();            /* Hidden function used by lm_check macro. */
endif define lm_check() ((*lm_checkp) ? lm_checkfun() : LM_STAT_DONE)

/* ----- Overall lock management ------------------------------------------ */ typedef struct lm_proc *lm_procp; /* Defines process context handle */ ifdef LM_SYSDEF_PROTOTYPES
lm_stat lm_wait(int timeout);
lm_stat lm_post(int pid, /*INOUT*/ lm_procp *lmppp);
lm_stat lm_check_deadlock(lm_lockp lmlp);
#else
lm_stat lm_wait();
lm_stat lm_post();
lm_stat lm_check_deadlock();
endif /* ----- Status codes: lm_stat_msg ---------------------------------------- */ ifdef LM_SYSDEF_PROTOTYPES
char *lm_stat_msg(lm_stat status);
#else
char *lm_stat_msg();
endif /* ----- Status inquiries: lm_stat_lock ----------------------------------- */ typedef struct lm_res *lm_resp;   /* Defines internal resource handle */ typedef struct                    /* Defines lock status structure */
{
    int         nid;              /* Node number for containing pool */
    int         dex;              /* Index number within containing pool */
    int         *valp;            /* INOUT: ptr to val buf */
    int         valmaxlen;        /* IN: length of val buf */
    int         vallen;           /* actual length of value */
    lm_level    notify;           /* Notify callback needed; top level blocked */
    lm_resp     resp;             /* resource handle */
    lm_procp    procp;            /* owning process handle */
    lm_level    level;            /* granted lock level */
    lm_stat     req_stat;         /* request state */
    lm_level    req_level;        /* request level */
    int         req_opts;         /* request options */
    lm_endfunp  req_endp;         /* callback end function */
    lm_notfunp  req_notp;         /* request notify fctn */
    lm_voidp    req_cock;         /* request cookie */
    lm_stat     end_stat;         /* callback end status */
    int         *end_valp;        /* callback user buf ptr */
    lm_notfunp  cur_notp;         /* current notify fctn */
    lm_voidp    cur_cock;         /* current cookie */
} lm_stlock, *lm_stlockp;
#ifdef LM_SYSDEF_PROTOTYPES
lm_stat lm_stat_lock(lm_lockp lmlp, size_t structsize,
                     /*INOUT*/ lm_stlockp lslp);
void    lm_user_print_lock(lm_user_printfunp pfun, char *label,
                     lm_stlockp lslp);
void    lm_print_lock(char *label, lm_stlockp lslp);
#else
lm_stat lm_stat_lock();
void    lm_user_print_lock();
void    lm_print_lock();
endif /* ----- Special lightweight lock queries --------------------------------- */
```

```c
#ifdef LM_SYSDEF_PROTOTYPES
char *lm_lock_name(lm_lockp lmlp, /*OUT*/ int *namelen);
lm_level lm_lock_level(lm_lockp lmlp);
lm_voidp lm_lock_req_cookie(lm_lockp lmlp);
#else
char *lm_lock_name();
lm_level lm_lock_level();
lm_voidp lm_lock_req_cookie();
endif /* ----- Status inquiries: lm_stat_res ------------------------------------ */ typedef struct                  /* Defines resource status structure */
{
    int         nid;            /* Node number for containing pool */
    int         dex;            /* Index number within containing pool */
    char        *name;          /* INOUT: ptr to name buf */
    int         namemaxlen;     /* IN: length of name buf */
    int         namelen;        /* actual length of name */
    lm_lockp    *gotlpp;        /* INOUT: ptr to got buf */
    int         gotmaxcnt;      /* IN: length of got buf */
    int         gotcnt;         /* actual cnt of got buf */
    lm_lockp    *reqlpp;        /* INOUT: ptr to req buf */
    int         reqmaxcnt;      /* IN: length of req buf */
    int         reqcnt;         /* actual cnt of req buf */
    lm_lockp    *notlpp;        /* INOUT: ptr to notify buf */
    int         notmaxcnt;      /* IN: length of notify buf */
    int         notcnt;         /* actual cnt of notify buf */
    int         *valp;          /* INOUT: ptr to val buf */
    int         valmaxlen;      /* IN: length of val buf */
    int         vallen;         /* actual length of value */
    lm_stat     valstat;        /* value status */
    lm_resp     parentp;        /* parent resource, if any */
    int         childcnt;       /* child resource count */
    int         lockcnt;        /* open lock count */
    u_short     gotcnts[LM_NUM_LEVELS]; /* Granted */
    u_short     reqcnts[LM_NUM_LEVELS]; /* Requested */
    int         levmask;        /* 1<<(lev-1) for lev>=1 */
    int         reqmask;        /* 1<<(lev-1) for lev>=1 */
} lm_stres, *lm_stresp;

#ifdef LM_SYSDEF_PROTOTYPES
lm_stat lm_stat_res(lm_resp lmrp, size_t structsize,
                    /*INOUT*/ lm_stresp lsrp);
void    lm_user_print_res(lm_user_printfunp pfun, char *label,
                          lm_stresp lsrp);
void    lm_print_res(char *label, lm_stresp lsrp);
#else
lm_stat lm_stat_res();
void    lm_user_print_res();
void    lm_print_res();
#endif
/* ----- Status inquiries: lm_stat_proc ----------------------------------- */ typedef struct                  /* Defines process status structure */
{
    int         nid;            /* Node number for containing pool */
    int         dex;            /* Index number within containing pool */
    lm_lockp    *lockpp;        /* INOUT: ptr to lock buf */
    int         lockmaxcnt;     /* IN: cnt of lock buf */
    int         lockcnt;        /* actual cnt of lock buf */
    int         pid;            /* process id */
    int         check;          /* call check needed */
    int         waiting;        /* process is waiting */
    int         posted;         /* process has been posted */
} lm_stproc, *lm_stprocp;

#ifdef LM_SYSDEF_PROTOTYPES
lm_stat lm_stat_proc(lm_procp lmpp, size_t structsize,
                     /*INOUT*/ lm_stprocp lspp);
```

```
void    lm_user_print_proc(lm_user_printfunp pfun, char *label,
                           lm_stprocp lspp);
void    lm_print_proc(char *label, lm_stprocp lspp);
#else
lm_stat lm_stat_proc();
void    lm_user_print_proc();
void    lm_print_proc();
endif /* ----- Status inquiries: lm_stat_node ---------------------------------- */ typedef struct lm_node *lm_nodep; /* Defines internal node handle */ typedef struct                  /* Defines pool status structure */
{
    int     totcnt;             /* total chunk count */
    int     usecnt;             /* in use chunk count */
    int     freecnt;            /* free chunk count */
    int     rawcnt;             /* raw chunk count */
    int     size;               /* sizeof(chunk) */
    char    **basep;            /* base ptr (careful!) */
} lm_stpool, *lm_stpoolp;

typedef struct                  /* Defines node status structure */
{
    lm_nodep   *nodepp;         /* INOUT: ptr to node buf */
    int        nodemaxcnt;      /* IN: cnt of node buf */
    int        nodecnt;         /* actual cnt of node buf */
    lm_procp   *procpp;         /* INOUT: ptr to proc buf */
    int        procmaxcnt;      /* IN: cnt of proc buf */
    int        proccnt;         /* actual cnt of proc buf */
    int        cid;             /* cluster id */
    int        nid;             /* node id */
    int        numnodes;        /* total number of nodes */
    size_t     valuelen;        /* value length */
    size_t     nodebytes;       /* allocated node bytes */
    lm_stpool  lockpool;        /* lock pool stats */
    lm_stpool  procpool;        /* proc pool stats */
    lm_stpool  respool;         /* resource pool stats */
} lm_stnode, *lm_stnodep;

#ifdef LM_SYSDEF_PROTOTYPES
lm_stat lm_stat_node(int nid, size_t structsize,
                     /*INOUT*/ lm_stnodep lsnp);
void    lm_user_print_node(lm_user_printfunp pfun, char *label,
                           lm_stnodep lsnp);
void    lm_print_node(char *label, lm_stnodep lsnp);
void    lm_user_print_pool(lm_user_printfunp pfun, char *label,
                           lm_stpoolp lspp);
void    lm_print_pool(char *label, lm_stpoolp lspp);
#else
lm_stat lm_stat_node();
void    lm_user_print_node();
void    lm_print_node();
void    lm_user_print_pool();
void    lm_print_pool();
endif /* ----- Status inquiries: lm_stat_hash ---------------------------------- */ typedef struct                  /* Defines hash status structure */
{
    int     *buckp;             /* INOUT: ptr to buck buf */
    int     buckmaxcnt;         /* IN: cnt of buck buf */
    int     buckcnt;            /* actual cnt of buck buf */
    int     hashsize;           /* total hash table size */
    int     nodesize;           /* Nominal node hash table size */
} lm_sthash, *lm_sthashp;
```

```c
#ifdef LM_SYSDEF_PROTOTYPES
lm_stat  lm_stat_hash(int nid, size_t structsize,
                       /*INOUT*/ lm_sthashp lshp);
void     lm_user_print_hash(lm_user_printfunp pfun, char *label,
                       lm_sthashp lshp);
void     lm_print_hash(char *label, lm_sthashp lshp);
#else
lm_stat  lm_stat_hash();
void     lm_user_print_hash();
void     lm_print_hash();
endif /* ----- Client customization of print formats ---------------------------- */

/* Clients can provide their own versions of these functions to override */
/* the default print functions in the library for application specific */
/* data. */ ifdef LM_SYSDEF_PROTOTYPES
void     lm_user_print_cookie(lm_user_printfunp pfun, lm_voidp cookie);
void     lm_print_cookie(lm_voidp cookie);
void     lm_user_print_endfun(lm_user_printfunp pfun, lm_endfunp endfunp);
void     lm_print_endfun(lm_endfunp endfunp);
void     lm_user_print_notfun(lm_user_printfunp pfun, lm_notfunp notfunp);
void     lm_print_notfun(lm_notfunp notfunp);
void     lm_user_print_valp(lm_user_printfunp pfun, lm_voidp valuep);
void     lm_print_valp(lm_voidp valuep);
void     lm_user_print_value(lm_user_printfunp pfun, lm_voidp valuep,
                       size_t len);
void     lm_print_value(lm_voidp valuep, size_t len);
#else
void     lm_user_print_cookie();
void     lm_print_cookie();
void     lm_user_print_endfun();
void     lm_print_endfun();
void     lm_user_print_notfun();
void     lm_print_notfun();
void     lm_user_print_valp();
void     lm_print_valp();
void     lm_user_print_value();
void     lm_print_value();
endif /* ----- Event logging defines -------------------------------------------- */
/* Define the kernel event level for the lock manager */
#ifdef EVENT_POINTS
#include <klog.h>
endif EVENT_POINTS define LM_KLOG_FACE_LEVEL T2
define LM_KLOG_SIM_LEVEL  T3

/* The following flags make up the optionmask for the lm_elog call. */
#define LM_ELOG_FACE    (0x1)   /* We should log interface routines */
#define LM_ELOG_SIM     (0x2)   /* We should log simple locking */

/* ----- Version information for library ---------------------------------- */ ifdef LM_SYSDEF_PROTOTYPES
char    *lm_version_library(void);
char    *lm_version_include(void);
char    *lm_version_release(void);
#else
char    *lm_version_library();
char    *lm_version_include();
char    *lm_version_release();
endif /* ----- No preemption variable disclosure -------------------------------- */
```

```
#ifdef LM_SYSDEF_PROTOTYPES
lm_stat lm_nopreempt(int**, int**);
#else
lm_stat lm_nopreempt();
endif /* ----- Lightweight unsigned 64 bit counter support ---------------------- */ typedef struct                  /* Defines unsigned 64 bit counter structure */
{
    unsigned int hi;
    unsigned int lo;
} lm_u64, *lm_u64p;

#ifdef LM_SYSDEF_PROTOTYPES
lm_stat lm_u64_set(lm_lockp lmlp, lm_u64p u64p);
lm_stat lm_u64_get(lm_lockp lmlp, /*OUT*/ lm_u64p u64p);
lm_stat lm_u64_incget(lm_lockp lmlp, /*OUT*/ lm_u64p u64p);
#else
lm_stat lm_u64_set();
lm_stat lm_u64_get();
lm_stat lm_u64_incget();
endif /* ----- end of file marker ---------------------------------------------- */
endif _LOCKMAN_H
#ifndef _LMI_HXX
#define _LMI_HXX
/*****************************************************************************
File:      lmi.hxx
Contents:  Internal definitions for the lock manager library.
System:    BBNACI Programming Environments.
Created:   11-Aug-1988
Author:    rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*****************************************************************************/

/* $Header: /nfs/oak/ul/ksedgwic/src/liblm/RCS/lmi.hxx,v 1.30 90/03/15 20:30:19 rwells Exp $ */

/*------ include files needed to compile this one ----------------------*/ include <lockman.h>
include <realtime.hxx>
#include <elog.h>
include <klog.h> ifdef TRACE
include <stdio.h>
#include <ctype.h>
extern void fprintf(FILE*, char* ...);
extern int getusecclock();
extern void fflush(FILE*);
endif TRACE /* ----- Defines ------------------------------------------------------*/
```

```
#define PAGESIZE        8192

/* ----- Definitions for handy event log entries ----------------------------*/ define LM_ELOG_BASE    40

/* ELOG_FACE Interface elog definitions */
#define LMbeginOpen       LM_ELOG_BASE+1
#define LMendOpen         LM_ELOG_BASE+2
#define LMbeginClose      LM_ELOG_BASE+3
#define LMendClose        LM_ELOG_BASE+4
#define LMbeginConvert    LM_ELOG_BASE+5
#define LMendConvert      LM_ELOG_BASE+6
#define LMbeginCancel     LM_ELOG_BASE+7
#define LMendCancel       LM_ELOG_BASE+8
#define LMbeginCheck      LM_ELOG_BASE+9
#define LMendCheck        LM_ELOG_BASE+10
#define LMbeginWait       LM_ELOG_BASE+11
#define LMendWait         LM_ELOG_BASE+12
#define LMbeginPost       LM_ELOG_BASE+13
#define LMendPost         LM_ELOG_BASE+14
#define LMbeginU64Set     LM_ELOG_BASE+15
#define LMendU64Set       LM_ELOG_BASE+16
#define LMbeginU64Get     LM_ELOG_BASE+17
#define LMendU64Get       LM_ELOG_BASE+18
#define LMbeginU64IncGet  LM_ELOG_BASE+40
#define LMendU64IncGet    LM_ELOG_BASE+41

/* ELOG_SIMLOCK Simple lock elog definitions */
#define LMbeginSimLock    LM_ELOG_BASE+20
#define LMendSimLock      LM_ELOG_BASE+21
#define LMbeginSimLocked  LM_ELOG_BASE+22
#define LMendSimLocked    LM_ELOG_BASE+23
#define LMsimLockOneTry   LM_ELOG_BASE+24
#define LMsimLockRetry    LM_ELOG_BASE+25
#define LMsimLockFinally  LM_ELOG_BASE+26
#define LMsimLockNidPid   LM_ELOG_BASE+27
#define LMsimLockTimeout  LM_ELOG_BASE+28
#define LMsimLockNowait   LM_ELOG_BASE+29
#define LMsimLockSleepU   LM_ELOG_BASE+30
#define LMsimLockNoidle   LM_ELOG_BASE+31
#define LMsimLockSame     LM_ELOG_BASE+32
#define LMsimLockDiff     LM_ELOG_BASE+33

/* ----- helpful stylistic definitions --------------------------------------*/ ifndef NULL
define NULL (0)
endif ifndef TRUE
define TRUE  (1)
#define FALSE (0)
#endif

/* ----- forward typedefs ---------------------------------------------------*/ typedef class lmi_sim    *lmi_simp;
typedef class lmi_pool   *lmi_poolp;
typedef class lmi_queue  *lmi_queuep;
typedef class lmi_node   *lmi_nodep;
typedef class lmi_hash   *lmi_hashp;
typedef class lmi_proc   *lmi_procp;
typedef class lmi_res    *lmi_resp;
typedef class lmi_lock   *lmi_lockp;
typedef class lmi_mapmem *lmi_mapmemp;
```

```
/****************************************************************
lmi_sim: simple lock class definition.
Extra baggage for putitive performance analysis removed on 11-Dec-88; it
looks like event logs will prove more useful in all respects.  I have kept
the i_nid_pid field because it helps to detect usage inconsistencies.
****************************************************************/

/* Times out after 10 seconds; RTC is 62.5 microseconds per tick. */
#define LMI_SIM_TIMEOUT_SECS (60)
#define LMI_SIM_TIMEOUT_TICKS (LMI_SIM_TIMEOUT_SECS * TICKS_PER_SECOND)
#define LMI_SIM_MINWAIT 0x1
#define LMI_SIM_MAXWAIT 0x1000
define LMI_SIM_NPTIMEOUT 4000000   /* 4 seconds in uSecs */ extern void lmi_sim_wait(int count);
extern void lmi_sim_wait_tune(int count);
ifdef LM_SYSDEF_ATOMIOR32 ifdef BFLY1
extern int     atomior32(int *ip, int v);
#define atomxmem(ap, v)         (atomior32((ap),(v)))
endif BFLY1 ifdef BFLY2
extern int     xmemi(int *ip, int v);
#define atomxmem(ap, v)         (xmemi((ap),(v)))
#endif BFLY2
#else  LM_SYSDEF_ATOMIOR32
extern int     atomxmem(int *ip, int v);
#endif LM_SYSDEF_ATOMIOR32

/* The following compile time variables control the simple lock
   debugging scaffolding.
        LMI_SIM_DEBUG_DATA   If set to one then the debugging fields
                             in the simple lock object will be present.
        LMI_SIM_DEBUG        If set to one then simple lock debugging
                             will take place.

*/

/* LMI_SIM_DEBUG implies LMI_SIM_DEBUG_DATA. */
#if defined(LMI_SIM_DEBUG) && LMI_SIM_DEBUG > 0
#define LMI_SIM_DEBUG_DATA 1
endif LMI_SIM_DEBUG class lmi_sim
{
private:
    int      i_interlock;       /* Word used for atomic latch */
    int      i_nid_pid;         /* Convolved nid and pid */
#if defined(LMI_SIM_DEBUG_DATA) && LMI_SIM_DEBUG_DATA > 0
    int      i_caller1;         /* Debugging three level traceback of */
    int      i_caller2;         /*   calling functions. */
    int      i_caller3;
#endif                          /* end LMI_SIM_DEBUG_DATA is defined and set */
public:
    /* No implicit constructor for lmi_sim; it blew up when appearing */
    /* as a member class in lmi_node, which needs a constructor for the */
    /* application, and handles its own allocation.  The lmi_sim constructor */
    /* got called too early, during the lmi_sim prelude, even though the */
    /* lmi_node this was a NULL pointer at the time.  init() just sets */
    /* everything to zero, so if the storage starts out zero, further */
    /* initialization isn't really needed. -Robert Wells, 17-Aug-88. */ void     init();            /* Initialize (construct) lmi_sim */
    lm_stat  lock();            /* Lock operation */
    lm_stat  lock_nowait();     /* Lock operation that gives up quick */
    int      ismine();          /* Inquiry - do I have the lock locked? */
```

```
    lm_stat   unlock();              /* Unlock operation */
    lm_stat   sleep_and_unlock(unsigned pid, int timeout);
    int       getinterlock()         { return (i_interlock); }
    int       getnidpid()            { return (i_nid_pid); }
};

/****************************************************************************
lmi_queue: queue class.

The operations of the queue class do not themselves guard against
multiprogramming hazards; the object holding the queue head should be
interlocked if multiple processes could be doing queue operations
simultaneously.
****************************************************************************/
class lmi_queue
{
 private:
    lmi_queue *i_prev;        /* Link to previous queue object. */
    lmi_queue *i_next;        /* Link to next queue object. */ public:
    /* No implicit constructor for lmi_queue; it blew up when appearing */
    /* as a member class in lmi_node, which needs a constructor for the */
    /* application, and handles its own allocation. The lmi_queue */
    /* constructor got called too early, during the lmi_sim prelude, */
    /* even though the lmi_node this was a NULL pointer at the time. */
    /* Not that init() sets to non-zero values, so it is important to */
    /* get it called before using other queue operations. */
    /* -Robert Wells, 17-Aug-88. */ void      init();            /* Initialize (construct) lmi_queue */
    lm_stat   append(lmi_queue *lmqp);
    lm_stat   prepend(lmi_queue *lmqp);
    lm_stat   getnext(/*OUT*/ lmi_queue **lmqpp);
    lm_stat   remove();
    lm_stat   check();
    lm_stat   stat(int maxcnt, /*OUT*/ lmi_queue **lmqpp, /*OUT*/ int *cntp);
    lm_stat   stat_res_locks(int maxcnt, /*OUT*/ lmi_lockp *lmlpp, /*OUT*/ int *cntp);
    lm_stat   stat_res_notifies(int maxcnt, /*OUT*/ lmi_lockp *lmlpp,
                                /*OUT*/ int *cntp);
    lm_stat   stat_proc_locks(int maxcnt, /*OUT*/ lmi_lockp *lmlpp,
                              /*OUT*/ int *cntp);
    lm_stat   stat_proc_calls(int maxcnt, /*OUT*/ lmi_lockp *lmlpp,
                              /*OUT*/ int *cntp);
    lm_stat   stat_node_procs(int maxcnt, /*OUT*/ lmi_procp *lmppp,
                              /*OUT*/ int *cntp);
    lmi_lockp res_lock();
    lmi_lockp res_notify();
    lmi_lockp proc_lock();
    lmi_lockp proc_call();
    lmi_resp  hash_res();
    lmi_procp node_proc();
    lmi_lockp node_lock();

int       isnull()           { return i_prev == NULL; }
    int       isempty()          { return i_prev == this; }
    lmi_queuep prev()            { return i_prev; }
    lmi_queuep next()            { return i_next; }
};

/****************************************************************************
lmi_object: generic object class - has type identifier.
****************************************************************************/

/* The type codes here are being explicitly set to 100+ to detect
   older lock manager versions. Incompatible lock manager libraries
   will generate LM_STAT_BADOBJECT pretty quickly.
   -ksedgwic 20-july-89 */
```

```
typedef enum
{
    LMI_FREE=100,              /* Raw or free object */
    LMI_LOCK=101,              /* Allocated lock object */
    LMI_PROC=102,              /* Allocated process object */
    LMI_RES=103,               /* Allocated resource object */
} lmi_type;

class lmi_object
{
 private:
    int          i_dex;        /* Index within pool for this object */
    u_short      i_tid;        /* Self identifying type field */
    u_short      i_nid;        /* Node to which this object is local */
    lmi_object   *i_nextfreep; /* Next link used in lmi_pool free list */ friend class lmi_lock;
    friend class lmi_proc;
    friend class lmi_res;
    friend class lmi_pool;

public:
    u_short      gettid()      ( return (i_tid); )
};

/**********************************************************************
lmi_pool: storage pool class.
**********************************************************************/ class lmi_pool
{
 private:
    lmi_sim      i_sim;        /* Free list simple lock */
    lmi_object   *i_listp;     /* Ptr to free list */
    char         *i_basep;     /* Ptr to region base */
    char         *i_nextrawp;  /* Ptr to next raw chunk */
    char         *i_endp;      /* Ptr past region end */
    size_t       i_size;       /* sizeof(chunk) */
    u_short      i_tid;        /* Type identification for pool chunks */
    u_short      i_nid;        /* Node number for pool chunks */
 public:
    /* No simple init or constructor for lmi_pool. */
    lm_stat      init(char *addr, size_t len, size_t size, lmi_type tid, int nid);
    lm_stat      alloc(/*OUT*/ char **outpp);
    lm_stat      free(char *inp);
    lm_stat      stat(/*OUT*/ lm_stpoolp lspp);
    lmi_sim*     getsimlock()  ( return (&i_sim); )
    char*        getbase()     ( return (i_basep); )
    char*        getend()      ( return (i_endp); )
    size_t       getsize()     ( return (i_size); )
    void         touch();
};

/**********************************************************************
lmi_res: resource class.

The resource class is derived from the basic object class, so it can have a
type id field in common with other major objects.

IMPORTANT: the i_name field must follow the declaration of a 32 bit aligned
object or larger. This is so comparisons can take advantage of word
alignment. -ksedgwic 6-June-1989
**********************************************************************/
```

```
class lmi_res : lmi_object
{
  private:
    lmi_sim    i_sim;         /* Simple latch for resource block */
    char       i_name[LM_MAXNAMELEN]; /* Name buffer */
    u_char     i_namelen;     /* Actual length of name */
    lm_stat    i_vaistat;     /* Value status */
    int        i_childcnt;    /* Child resource count */ u_short    i_lockcnt;     /* Total number of open locks */
    u_char     i_levmask;     /* Level summary 1<<(lev-1) for lev>LM_NL */
    u_char     i_reqmask;     /* Level summary for requests. */
    u_short    i_gotcnts[LM_NUM_LEVELS]; /* Granted */
    u_short    i_reqcnts[LM_NUM_LEVELS]; /* Requested */ lmi_res    *i_parentp;    /* Parent resource, ifany */
    lmi_queue  i_granted;     /* Queue head for granted locks */
    lmi_queue  i_requested;   /* Queue head for requested locks */
    lmi_queue  i_notifyhead;  /* Queue head for locks to be notified */
    lmi_queue  i_hashq;       /* Queue entry for hash chain. */
    int        i_value[1];    /* Beginning of value buffer */
                              /* i_value must be last - it is extended */ lm_stat    enqueue(lmi_lockp lmlp, lm_level locklevel,
                       int optionmask, lm_optionp lmop);
    lm_stat    grant_requests();
    lm_stat    notify_all(lmi_lockp reqlp, lm_level reqlevel);

public:
    /* No simple init or constructor for lmi_res. */
               lmi_res(lmi_resp parentp, char *name, int len, lmi_nodep lmnp,
                       int index, /*OUT*/ lmi_resp *lock_respp,
                       /*INOUT*/ lmi_queue *lock_resqp,
                       /*OUT*/ lm_stat *statp); /* Constructor of lmi_res */ lm_stat    convert(lmi_lockp lmlp, lm_level locklevel,
                       int optionmask, lm_optionp lmop);
    lm_stat    cancel(lmi_lockp lmlp);
    lm_stat    check();
    lm_stat    stat(size_t structsize, /*OUT*/ lm_stres *lsrp);
    int        lookup(lmi_resp parentp, char *name, int len);
    lm_stat    addlock(/*OUT*/ lmi_resp *lock_respp,
                       /*INOUT*/ lmi_queue *lock_resqp);
    lm_stat    dellock(lmi_nodep lmnp, int index, /*INOUT*/ lmi_resp *lock_respp,
                       /*INOUT*/ lmi_queue *lock_resqp,
                       /*OUT*/ lmi_resp *parentpp);
    lm_stat    addchild();
    lm_stat    delchild(lmi_nodep lmnp, int index, /*OUT*/ lmi_resp *parentpp);
    lm_stat    valoption(int option, lm_voidp uservalp);
    lm_stat    u64_set(lm_u64 *u64p);
    lm_stat    u64_get(/*OUT*/ lm_u64 *u64p);
    lm_stat    u64_incget(/*OUT*/ lm_u64 *u64p);

int        nid()          { return i_nid; }
    int        dex()          { return i_dex; }
    lmi_resp   parent()       { return i_parentp; }
    char       *name()        { return i_name; }
    int        namelen()      { return i_namelen; }
    size_t hash_offset() {return (size_t)(((char *)&((lmi_res *) 0)->i_hashq) -
                                          ((char *) 0)); }
    lmi_sim* getsimlock()     { return (&i_sim); }
};

/* Round up to a multiple of the int size - 68000 only needs short align, */
/* and the pool abstraction requires word alignment. */
/* We add valuelen and subtract sizeof(int) to allocate just room enough */
/* for the value - the structure allows room for one int. */ inline size_t lmi_res_size(size_t valuelen)
{ return (sizeof(lmi_res)+valuelen-sizeof(int)+sizeof(int)-1)&~(sizeof(int)-1); }
```

```
inline int LMI_LEVBIT(lm_level lev)
{ return ((lev <= LM_NL) ? 0 : (1 << (lev - 1))); }

/* In these blockage masks, (1<<(level-1)) is set if it blocks request */ define LMI_NL_BLOCKAGE    (0)      /* NL blocked by nothing */
define LMI_CR_BLOCKAGE    (0x10)   /* CR blocked by EX */
#define LMI_CW_BLOCKAGE    (0x1c)   /* CW blocked by EX,PW,PR */
#define LMI_PR_BLOCKAGE    (0x1a)   /* PR blocked by EX,PW,CW */
#define LMI_PW_BLOCKAGE    (0x1e)   /* PW blocked by EX,PW,PR,CW */
#define LMI_EX_BLOCKAGE    (0x1f)   /* EX blocked by EX,PW,PR,CW,CR */
#define LMI_ALL_BLOCKAGE   (0x1f)   /* block bits for all blocking levels */
#define LMI_SIZE_TOPLEVEL  (32)     /* Number of possible blockage bit patterns */

/******************************************************************
lmi_lock: open lock class.

The open lock class is derived from the basic object class, so it can have a
type id field in common with other major objects.
The fields used by callbacks are special in that callbacks are simlocked on
the owning process object rather than the lock's resource; there is a
producer-consumer relationship between resource methods that queue callbacks
and process methods that execute callbacks, with no single lock dominating
the callback information.  The resource methods have to simlock the
process object before modifying these fields or queueing the callback.  The
request state is the only exception - in the case of completion callbacks it
is set to LM_STAT_DONE with both objects simlocked, and the completion
callback will set it to LM_STAT_IDLE when the callback is done, with only the
process object simlocked, if that much.  But it is a single word update, and
thus should be safe.
******************************************************************/ class lmi_lock : lmi_object
{
private:
    lm_stat      i_req_stat;     /* request state - used by callbacks */
    lm_stat      i_end_stat;     /* end status - used by callbacks */
    lm_level     i_notify;       /* Top blocked level; LM_NL if not pending*/
    u_short      i_level;        /* granted lock level (really lm_level) */
    u_short      i_req_level;    /* request level (really lm_level) */
    int          i_req_opts;     /* request options */
    lm_endfunp   i_req_endp;     /* callback end function */
    lm_notfunp   i_req_notp;     /* request notify fctn */
    lm_voidp     i_req_cook;     /* request cookie */
    int         *i_end_valp;     /* callback user buf ptr */
    lm_notfunp   i_cur_notp;     /* current notify fctn */
    lm_voidp     i_cur_cook;     /* current cookie */
    lmi_procp    i_procp;        /* owning process handle */
    lmi_resp     i_resp;         /* resource handle */
    lmi_queue    i_resq;         /* Queue entry for resource queue */
    lmi_queue    i_notifyq;      /* Queue entry for notify queue of resource */
    lmi_queue    i_procq;        /* Queue entry for process queue */
    lmi_queue    i_callq;        /* Queue entry for process callback queue */
    int          i_value[1];     /* Begin of value buf - used by callbacks */
                                 /* i_value must be last - it is extended */ friend class lmi_res;        /* Opens fields to resource methods. */ public:
    /* No simple init or constructor for lmi_lock. */
            lmi_lock(lmi_lockp parentp, char *lockname,
                    size_t locknamelen, /*OUT*/ lm_stat *statp);

lm_stat  convert(lm_level locklevel, int optionmask, lm_optionp lmop);
    lm_stat  grant(lmi_queuep granted_qp, int blocklevel,
                    lmi_queuep notify_qp, lmi_queuep callback_qp);
    lm_stat  notify(lmi_queuep callback_qp, lm_level reqlevel);
    lm_stat  cancel();
    lm_stat  nocallback();
```

```
lm_stat     close();
lm_stat     check();
lm_stat     stat(size_t structsize, /*OUT*/ lm_stlock *lsrp);
lm_stat     u64_set(lm_u64 *u64p);
lm_stat     u64_get(/*OUT*/ lm_u64 *u64p);
lm_stat     u64_incget(/*OUT*/ lm_u64 *u64p);
char        *lock_name(/*OUT*/ int *namelen);
lm_endfunp  callend(, *OUT*/ lm_voidp *cookiep, /*OUT*/ lm_stat *endstatp);
lm_notfunp  callnot(/*OUT*/ lm_voidp *cookiep, /*OUT*/ lm_level *topleveip);
    int         nid()           { return i_nid; }
    int         dex()           { return i_dex; }
    lm_level    lock_level()    { return (lm_level) i_level; }
    lm_level    lock_req_cookie() { return i_req_cook; } size_t res_offset()  {return (size_t)(((char *)&((lmi_lock *)0)->i_resq) -
                                          ((char *) 0)); };
    size_t notify_offset() {return (size_t)(((char *)&((lmi_lock *)0)->i_notifyq) -
                                          ((char *) 0)); };
    size_t proc_offset() {return (size_t)(((char *)&((lmi_lock *)0)->i_procq) -
                                          ((char *) 0)); };
    size_t call_offset() {return (size_t)(((char *)&((lmi_lock *)0)->i_callq) -
                                          ((char *) 0)); };
};

/* Round up to a multiple of the int size - 68000 only needs short align, */
/* and the pool abstraction requires word alignment. */
/* We add valuelen and subtract sizeof(int) to allocate just room enough */
/* for the value - the structure allows room for one int. */ inline size_t lmi_lock_size(size_t valuelen)
{ return (sizeof(lmi_lock)+valuelen-sizeof(int)+sizeof(int)-1)&~(sizeof(int)-1); }

/****************************************************************************
lmi_proc: process context class.

The process context class is derived from the basic object class, so
it can have a type id field in common with other major objects.
****************************************************************************/ class lmi_proc : lmi_object
{
 private:
    lmi_sim     i_sim;          /* Simple latch on procedure block */
    u_short     i_pid;          /* Process id */
    u_short     i_posted;       /* Process has been posted */
    int         i_waiting;      /* Process is waiting - needs atomic clear */
    int         i_check;        /* Call check needed if TRUE */
    lmi_queue   i_locks;        /* Queue head for process's locks */
    lmi_queue   i_calls;        /* Queue head for process's calls */
    lmi_queue   i_nodeq;        /* Queue entry for node's procs */ lm_stat     init(int pid, /*OUT*/ int **checkpp);
    lm_stat     wakeup();

public:
    /* No simple init or constructor for lmi_proc. */
    /* Constructor with arguments for lmi_proc */
            lmi_proc(int pid, /*OUT*/ int **checkpp, /*OUT*/ lm_stat *statp);
    lm_stat     destroy(/*OUT*/ lmi_procp *lmppp, /*OUT*/ int **checkpp);

lm_stat     check();
    lm_stat     stat(size_t structsize, /*OUT*/ lm_stproc *lsrp);

lm_stat     addlock(lmi_queuep lmqp);
    lm_stat     dellock(lmi_queuep lmqp);
    lm_stat     grant_lock(lmi_lockp lmlp, lmi_queuep granted_qp,
                           int blocklevel, lmi_queuep notify_qp);
    lm_stat     nocallback_lock(lmi_lockp lmlp);
```

```
lm_stat    notify_lock(lmi_lockp lmlp, lm_level reqlevel);
lm_stat    callbacks();      /* Real guts of lm_check */
lm_stat    wait(int timeout);
lm_stat    post(int pid);
lm_stat    check_pid(int pid);

size_t node_offset() {return (size_t)(((char *)&((lmi_proc *)0)->i_nodeq) -
                                        ((char *) 0)); };

int       pid()           { return i_pid; }
    int       nid()           { return i_nid; }
    int       dex()           { return i_dex; }
    lmi_sim*  getsimlock()    { return (&i_sim); }
};

/* Round up to a multiple of the int size - 68000 only needs short align, */
/* and the pool abstraction requires word alignment. */ inline size_t lmi_proc_size()
{ return (sizeof(lmi_proc)+sizeof(int)-1)&~(sizeof(int)-1); }

/******************************************************************************
lmi_hash: hash table segment class.
******************************************************************************/ class lmi_hash
{
 private:
    u_short     i_hashsize;    /* Total hash table size */
    u_short     i_nodesize;    /* Typical size per node */
    u_short     i_thissize;    /* Size for this node */
    u_short     x_padding;     /* To keep structure word aligned */
    lmi_queuep *i_hashp;       /* Hash arena per node - ptrs to queue entries */
    /* XOR and rotate algorithm for hashing */
    int xorblk(char* name, unsigned len, unsigned parent);

public:
    /* No simple init or constructor for lmi_hash. */
    lm_stat    init(int hashsize, int nodesize, int thissize, lm_voidp addr);
    lm_stat    stat(size_t structsize, /*OUT*/ lm_sthash *lshp);
    lm_stat    hash(lmi_resp parent, char *name, int len,
                   /*OUT*/ int *nidp, /*OUT*/ int *indexp);
    lm_stat    lookup(lmi_resp parent, char *name, int len, int index,
                   /*OUT*/ lmi_resp *lmrpp);
    lm_stat    install(lmi_queuep lmqp, int index);
    lm_stat    remove(lmi_queuep lmqp, int index);
    void       touch();
};

/******************************************************************************
lmi_node: node table segment class.
******************************************************************************/ define MAX_VERSION_LENGTH 256 class lmi_node
{
 private:
    lmi_sim   i_sim;         /* Simple latch for this node */
    lmi_pool  i_lockpool;    /* Storage pool for lock objects */
    lmi_pool  i_procpool;    /* Storage pool for process objects */
    lmi_pool  i_respool;     /* Storage pool for resource objects */
    int       i_cid;         /* Our cluster id */
    u_short   i_nid;         /* Our node id */
    u_short   i_numnodes;    /* Total number of nodes */
    u_short   i_lastnid;     /* Last nid used by newres method */
    size_t    i_valuelen;    /* Value length in bytes from create */
```

```
size_t      i_nodebytes;        /* Allocated node bytes */
lmi_nodep   *i_nodepp;          /* Nodep list, indexed by nid */
lmi_hash    i_hash;             /* Hash table segment for node */
lmi_queue   i_procs;            /* Queue of active process objects */
char        i_version_library[MAX_VERSION_LENGTH]; /* version string */
public:
    /* No simple init or constructor for lmi_node. */
                                /* Constructor of lmi_node */
            lmi_node(char *name, int maxprocs, int maxlocks, int maxres,
                    int hashsize, size_t valuelen, lm_voidp address,
                    size_t maxbytes, /*OUT*/ lm_stat *statp);

/* init is only really called as part of construction */
    lm_stat     init(lmi_nodep *lmnpp, int cid, int inode, int numnodes,
                    int nodeprocs, int nodelocks, int noderes, int nodehash,
                    int hashsize, size_t valuelen, size_t usedsize,
                    size_t nodesize);

lm_stat     openlock(lmi_resp parresp, char *lockname, size_t locknamelen,
                    /*OUT*/ lmi_resp *lock_respp,
                    /*INOUT*/ lmi_queue *lock_resqp);

lm_stat     closelock(/*INOUT*/ lmi_resp *lock_respp,
                    /*INOUT*/ lmi_queue *lock_resqp);

lm_stat     stat(size_t structsize, /*OUT*/ lm_stnode *lsrp);

lm_stat     stat_hash(size_t structsize, /*OUT*/ lm_sthash *lshp);

lm_stat     getnp(int nid, /*OUT*/ lmi_nodep *lmnpp);

lm_stat     newres(int nid, /*OUT*/ lmi_resp *lmrpp);
    lm_stat     freeres(lmi_resp lmrp);
    lm_stat     delchild(lmi_resp lmrp, /*OUT*/ lmi_resp *parentpp);

lm_stat     addproc(lmi_queuep lmqp);
    lm_stat     delproc(lmi_queuep lmqp);

lm_stat     post(int pid, /*OUT*/ lmi_procp *lmippp);

lm_stat     proc_lookup(int pid, /*OUT*/ lmi_procp *lmippp);

lm_stat     proc_lookup_one(int pid, /*OUT*/ lmi_procp *lmippp);

void        touch_pools();

lm_stat newproc(/*OUT*/ lmi_procp *lmppp)
                { return i_procpool.alloc((char **) lmppp); }
    lm_stat freeproc(lmi_procp lmpp)
                { return i_procpool.free((char *) lmpp); } lm_stat newlock(/*OUT*/ lmi_lockp *lmlpp)
                { return i_lockpool.alloc((char **) lmlpp); }
    lm_stat freelock(lmi_lockp lmlp)
                { return i_lockpool.free((char *) lmlp); } lm_stat hashinstall(lmi_queuep lmqp, int index)
                { return i_hash.install(lmqp, index); }
    lm_stat hashremove(lmi_queuep lmqp, int index)
                { return i_hash.remove(lmqp, index); } lm_stat check_version()
                { return (strcmp(i_version_library, lm_version_library())) ?
                    LM_STAT_BADVERSION : LM_STAT_DONE; } int         valuelen()      { return i_valuelen; }
    int         cid()           { return i_cid; }
    int         nid()           { return i_nid; }
```

```
    int         numnodes()          { return i_numnodes; }
    lmi_sim*    getsimlock()        { return (&i_sim); }
    lmi_pool*   getlockpool()       { return (&i_lockpool); } lmi_pool*   getprocpool()       { return (&i_procpool); }
    lmi_pool*   getrespool()        { return (&i_respool); }
    lmi_hash*   gethash()           { return (&i_hash); }
    lmi_queue*  getprocqueue()      { return (&i_procs); }
};
```

/* Round up to a multiple of the int size - 68000 only needs short align, */
/* but the pool abstraction requires word alignment. */

```
inline size_t lmi_node_size()
    { return (sizeof(lmi_node)+sizeof(int)-1)&~(sizeof(int)-1); }
```

/*****************************************************************************
lmi_mapmem: named shared memory vm_mapmem description object.
This object is layed on top of a small virtual region at the beginning of
a named file that can be mapped in and examined/initialized to describe a
set of shared memory regions bound to various nodes. Since this object and
the node objects it describes all have pointers stored in their fields, the
objects have to be mapped at the same virtual address in all processes.
Thus the initial mapping of this object may be deallocated and remapped at
the correct self-identified address by a process attaching to a created region.
The simple lock and i_created flag are used to safely deal with attaches
that happen before or during creation.
*****************************************************************************/ extern int strcmp(char *cp1, char *cp2); /* Used in inline method 'match' */ define NORMAL_ATTACH 0
define STAT_ATTACH 1

```
class lmi_mapmem
{
 private:
    lmi_sim     i_sim;          /* Simple latch for this object */
    lmi_mapmemp i_this;         /* Virtual starting address for this object. */
    size_t      i_mapsize;      /* vm_mapmem length of this object in bytes. */
    int         i_numnodes;     /* Number of node objects */
    size_t      i_nodesize;     /* vm_mapmem length of each node object. */
    lmi_nodep   *i_npp;         /* Ptr to virtual addrs for each node object */
    char        *i_name;        /* Pointer to name for this shared memory */
    int         i_created;      /* TRUE if mapmem has been fully lm_create'd */
    int         i_elog_sets;    /* Contains bit fields for each enabled set */ lm_stat     attach(char*, off_t, int, int = NORMAL_ATTACH);
    lm_stat     create(char *name, int numnodes, size_t nodesize, lm_voidp addr,
                       size_t size, int fd);

public:
    /* No simple init or constructor for lmi_mapmem. */
                                /* Constructor of lmi_mapmem */
    lmi_mapmem(char *name, int numnodes, size_t nodesize,
               lm_voidp addr, /*OUT*/ lm_stat *statp,
               int mapforstat = NORMAL_ATTACH);

int         match(char *name) { return (strcmp(name, i_name) == 0); }
    lm_stat     numnodes()        { return i_numnodes; }
    lm_stat     nodep(int nid, /*OUT*/ lmi_nodep *lmnpp);

lm_stat     mark_created_and_unlock();
    lm_stat     unlock();
    int         elog_sets() { return i_elog_sets; }
    void        set_elog_sets(int elog_sets) { i_elog_sets = elog_sets; }

};
```

/* Rounds up to a multiple of the page size, includes space for node */
/* pointers and name string with terminating null character. */

```
size_t lmi_mapmem_size(int namelen, int numnodes);

/****************************************************************
Machine dependent helper function declarations.
****************************************************************/ lm_stat lmi_md_cluster(/*OUT*/ int *cidp, /*OUT*/ int *numnodesp,
                    /*OUT*/ int *nidp);

lm_stat lmi_md_alloc(char *address, size_t size, int nid,
                    /*OUT*/ char **basepp);

lm_stat lmi_md_mapmem(char *address, size_t size, int fd, off_t offset,
                    int nid, /*OUT*/ char **basepp);

lm_stat lmi_md_deallocate(char *address, size_t size);

lm_stat lmi_md_open(char *name, /*OUT*/ int *fdp);

lm_stat lmi_md_close(int fd);

lm_stat lmi_md_errno_stat(void);

extern int sigblock(int mask);   /* 4.3BSD & POSIX system call */
    extern int getpid();             /* Very standard Unix system call */
    inline int lmi_md_getpid()       { return getpid(); } extern int getpagesize();        /* Berkeley Unix system call */
    inline size_t lmi_md_getpagesize()  { return getpagesize(); } void    bcopy(char *src, char *dst, int len);

int     bcmp(char *cp1, char *cp2, int len);
    int     caller(void);
    int     caller_caller(void);
    int     caller_caller_caller(void);

int     strcmp(char *cp1, char *cp2);
    size_t  strlen(char *cp);

void    printf(char *format, ...);
    void    sprintf(char *bufp, char *format, ...);

#ifdef LM_SYSDEF_USER_SLEEP
    int     user_sleep_and_unlock(unsigned chan, int *lockp, int timeout);
    int     user_wakeup(unsigned chan);
endif /****************************************************************
Private process context variable declarations.
These are uninitialized globals, and are only declared in this
header file.  Their initial value must be zero.
****************************************************************/ lmi_mapmemp  lmi_mp;          /* Mapmem named shared memory context ptr. */
lmi_nodep    lmi_np;          /* Node context pointer */
lmi_procp    lmi_pp;          /* Process context pointer */
int          lmi_nid_pid;     /* Convolved nid and pid for our process. */
int          lmi_check_level; /* Global used to prevent recursive lm_check */
int          lmi_pflag;       /* Preemption control flag */
int          lmi_ptime;       /* Preemption control timeout timer */
extern realtime  lmi_sim_timeout_ticks; /* Simplelock timeout in rtc ticks */
                              /* (Must be extern due to C++ init) */

/* Event logging globals */
int          lmi_elog_face;   /* Enables interface elogging */
```

```
int        lmi_elog_sim;        /* Enables simple lock elogging */

/* Trace debugging file pointer */
#ifdef TRACE
FILE       *lmi_trace_file;
endif TRACE /* ----- end of file marker ------------------------------------------ */
endif _LMI_HXX
/******************************************************************************
File:     lm_face.cxx
Contents: Contains C callable interface functions for lock manager library.
System:   BBNACI Programming Environments.
Created:  10-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
******************************************************************************/

/* $Header: /nfs/oak/u1/ksedgwic/src/liblm/RCS/lm_face.cxx,v 1.28 90/03/15 20:30:11 rwells Exp $ */ include <errno.h>
include <lmi.hxx> realtime lmi_sim_timeout_ticks;

/* ----- static function declarations ---- */ static lm_stat s_attach_freshen(int pid);
static lm_stat s_attachforstat_freshen(int pid);
static lm_stat s_mapmem_freshen(char *name);
static lm_stat s_mapmemforstat_freshen(char *name);
static void s_timeout_freshen();
#ifdef TRACE
static void s_print_lockname(char* lockname, int locknamelen, char* printbuf);
endif TRACE /* ----- system function  prototypes ----- */ extern int user_nopreempt(int*, int*);
extern int kill(int pid, int sig);
extern int errno;
extern char *getenv(char*);
extern int atoi(char*);

/******************************************************************************
 lm_create(): create a new lock manager instance.
******************************************************************************/ lm_stat lm_create(char *name, int maxprocs, int maxlocks, int maxres,
                  int hashsize, size_t valuelen, lm_voidp address,
                  size_t maxbytes)
{
    lm_stat status;

s_timeout_freshen();     /* Freshen up the simplelock timeout */ if (lmi_np != NULL || lmi_mp != NULL)
```

```
    return LM_STAT_BADCREATE;

/* ----- Tune up simple lock spin wait timing ----- */
/* Do it twice just for luck... */
lmi_sim_wait_tune(10000);   /* Request a wait of ~1/10 sec */
lmi_sim_wait_tune(10000);   /* Request a wait of ~1/10 sec */

/* ----- Do the creation ----- */

/* LM_STAT_BADCREATE can be returned by new lmi_node if a non-NULL */
/* name is specified, and a shared memory region is already active */
/* under that name.  -rwells, 19-Jan-89 */ lmi_np = new lmi_node(name, maxprocs, maxlocks, maxres, hashsize, valuelen,
                          address, maxbytes, &status);

/* $$$ For now we're going to force the event logging on
       -ksedgwic 19-July-89 */
    lm_elog(LM_ELOG_FACE | LM_ELOG_SIM);

return status;
}   /* end lm_create */

/****************************************************************************
lm_attach(): attach process to existing lock manager instance/context.
****************************************************************************/ lm_stat lm_attach(char *name, /*OUT*/ lm_conp *lmcpp)
{
    lm_stat status;
    register int pid;
    int temp_flag;
    int *dummy1, *dummy2;

s_timeout_freshen();        /* Freshen up the simple lock timeout */ if (lmcpp != NULL)
        return LM_STAT_NIY;

/* If the name is non-NULL, go make sure we have the shared memory */
    /* regions for that name mapped in; if not, try to map them in.  If */
    /* they haven't been created, give a LM_STAT_NOCREATE error. */
    /* -rwells, 19-Jan-89 */

/* If we already have a creation context without a mapmem context, */
    /* complain about the name since we were created without a name. */
    /* -rwells, 27-Jan-89. */ if (name != NULL)
    {
        if (lmi_mp == NULL && lmi_np != NULL)
            return LM_STAT_BADNAME;

if ((status = s_mapmem_freshen(name)) != LM_STAT_DONE)
            return status;
    }

/* If the name is NULL, complain if we have previously created, */
    /* attached, or inherited a named context. -rwells, 22-Jan-89 */ else if (lmi_mp != NULL)
        return LM_STAT_BADNAME;

pid = lmi_md_getpid();
    if ((status = s_attach_freshen(pid)) != LM_STAT_DONE)
        return status;

/* If the proc pointer is non-null, we are already well attached. */
```

```
    if (lmi_pp != NULL)
        return LM_STAT_DONE;

/* Open the trace file if tracing is selected.  Set the file pointer
       to NULL if it is not selected. */
#ifdef TRACE
    char fname[64];
    char *tracedir;

tracedir = getenv("LM_TRACE");
    if(tracedir != NULL)
    {
        sprintf(fname, "%s/lm_%d.trc", tracedir, pid);
        lmi_trace_file = fopen(fname, "w");
    }
    else
        lmi_trace_file = NULL;
endif TRACE /* Register the preemption control variables with the kernel.
       Dummy variables are used here because the real preemption
       control globals are already known to all the routines
       which use them ... */
    status = lm_nopreempt(&dummy1, &dummy2);
    if (status != LM_STAT_DONE)
        return status;

/* Localize our copies of the elog_flag globals. */
    temp_flag = lmi_elog_face;
    lmi_elog_face = temp_flag;
    temp_flag = lmi_elog_sim;
    lmi_elog_sim = temp_flag;

/* Allocate a new process block, and set lm_checkp appropriately. */
    /* If the allocation fails, the two globals will be set to detached */
    /* values, and an error status code will be returned. */ lmi_pp = new lmi_proc(pid, &lm_checkp, &status);

/* Touch the lock, resource and hash table segments on each node
       to get the vm faults over with. */
    lmi_np->touch_pools();

return status;
}   /* end lm_attach */

/************************************************************************
s_mapmem_freshen(): freshen our mapping of a named shared memory region.
Assumes that name is non-null, and is only called from lm_attach.
************************************************************************/ static lm_stat s_mapmem_freshen(char *name)
{
    lm_stat status;

/* If we already have a mapmem structure, make sure it has same name */
    if (lmi_mp != NULL)
    {
        if (lmi_mp->match(name))
            return LM_STAT_DONE;
        else
            return LM_STAT_BADNAME;
    }

/* Otherwise we should try to get the named region and map it in. */
    /* If successful, it will also set our node pointer through the */
    /* argument pointer.  The 0 numnodes and size arguments identify */
    /* this as an attach rather than a create.  -rwells, 19-Jan-89 */
```

```
    lmi_mp = new lmi_mapmem(name, 0, 0, NULL, &status);

/* This looks like a good place to freshen our elog flags.  We
       don't get here unless we actually had to use mapmem.  If we didn't
       have to use mapmem then we will have inherited the flags. */
    if (status == LM_STAT_DONE)
    {
        if (lmi_mp->elog_sets() & LM_ELOG_FACE)
            lmi_elog_face = TRUE;
        if (lmi_mp->elog_sets() & LM_ELOG_SIM)
            lmi_elog_sim = TRUE;
    }

/* If the construction succeeds, we have to unlock the mapmem object, */
    /* since the constructor leaves it locked for the sake of create. */ if (status == LM_STAT_DONE)
        status = lmi_mp->unlock();

/* If we have succeeded so far, store pointer to first node object */
    /* into lmi_np where the rest of the code can find it. */ if (status == LM_STAT_DONE)
        status = lmi_mp->nodep(0, &lmi_np);

return status;
}   /* end s_mapmem_freshen */

/**************************************************************************
s_attach_freshen(): freshen our global node and process pointers.
This helper function is used for both attach and detach.
**************************************************************************/ static lm_stat s_attach_freshen(int pid)
{
    int cid, numnodes, nid;
    register lm_stat status;

if (lmi_np == NULL)         /* Maybe an lm_create wasn't done. */
        return LM_STAT_NOCREATE;

/* Check for library version compatibility */
    status = lmi_np->check_version();
    if (status != LM_STAT_DONE)
        return status;

if ((status = lmi_md_cluster(&cid, &numnodes, &nid)) != LM_STAT_DONE)
        return status;

/* Freshen up the convolved node id and process id. */
    lmi_nid_pid = (nid << 16) | pid;

/* If we have forked into a different cluster, forget it. */ if (lmi_np->cid() != cid)
        return LM_STAT_BADCLUSTER;

/* If the cluster has somehow grown beyond its size at creation time */
    /* and we are on a new node, we have to give up; coding assumes that */
    /* we setup memory on each eligible node in cluster at creation time. */
    /* -rwells, 22-Jan-89 */ if (nid >= lmi_np->numnodes())
        return LM_STAT_BADNID;

/* Freshen up the node pointer, just in case. */
    /* We need a different node pointer if we have forked to */
```

```
    /* a different node. */
    /* By assigning to lmi_np, we force its page to be local to our node. */ if ((status = lmi_np->getnp(nid, &lmi_np)) != LM_STAT_DONE)
        return status;

/* If we have forked to different process since attach, clear the ptr */ if (lmi_pp != NULL && lmi_pp->pid() != pid)
        lmi_pp = NULL;

return LM_STAT_DONE;
}   /* end s_attach_freshen */

/****************************************************************************
lm_detach(): detach from lock manager instance/context.
****************************************************************************/ lm_stat lm_detach(lm_conp lmcp)
{
    lm_stat status;
    register int pid;
/*  int retval;  */ if (lmcp != NULL)
        return LM_STAT_NIY;

pid = lmi_md_getpid();
    if ((status = s_attach_freshen(pid)) != LM_STAT_DONE)
        return status;

/* If the proc pointer is NULL, we are already detached. */
    if (lmi_pp == NULL)
        return LM_STAT_DONE;

/* Un-register the preemption control variables. */
    /* We aren't going to unregister them since we've added lm_nopreempt
       to allow clients to use the variable too.  It would be bad to
       unregister them if the client was using them ... */
/*  retval = user_nopreempt(NULL, NULL);
    if (retval == -1)
        return lmi_md_errno_stat();
*/

/* Destroy the process object, closing all its open locks, */
    /* removing it from the node list, returning it to the pool, */
    /* and resetting the globals appropriately. */ return lmi_pp->destroy(&lmi_pp, &lm_checkp);

}   /* end lm_detach */

/****************************************************************************
lm_open(): open a lock at null level on the given resource name.
****************************************************************************/ lm_stat lm_open(lm_conp lmcp, lm_lockp parentp, char *lockname,
                size_t locknamelen, /*OUT*/ lm_lockp *lmlpp)
{
    register lmi_lockp lmilpp;
    register lm_stat tmpstat;
    lm_stat status;
    union {
        char    aschars[LM_MAXNAMELEN];
        int     dummy;          /* This forces 32 bit alignment */
    } aligned_lockname;

#ifdef TRACE
```

```
    if (lmi_trace_file)
    {
        int time = getusecclock();
        char printbuf[(LM_MAXNAMELEN*4)];
        s_print_lockname(lockname, locknamelen, printbuf);

fprintf(lmi_trace_file,
                "%16u: lm_open(lmcp=0x%x, parentp=0x%x, lmlpp=0x%x)\n",
                time, lmcp, parentp, locknamelen, lmlpp);
        fprintf(lmi_trace_file,
                "%16u: lm_open lockname=%s\n",
                time, printbuf);

fflush(lmi_trace_file);
    }
endif TRACE if (lmcp != NULL)
        return LM_STAT_NIY;

if (lmlpp == NULL)
        return LM_STAT_NULLPTR;

#ifdef EVENT_POINTS
    if (lmi_elog_face)
    {
        KLOG_LOG(LM_KLOG_FACE_LEVEL, LMbeginOpen, (int) lmlpp);
        ELOG_LOG(LMbeginOpen, (int) lmlpp);
    }
endif EVENT_POINTS /* Check the alignment of the users namestring. If it is not
       32 bit aligned, put it in an aligned buffer and use the
       buffer instead. */
    if ( (unsigned)(lockname) & 0x3)
    {
        /* Oh well, it wasn't aligned ... */
        bcopy(lockname, aligned_lockname.aschars, (int) locknamelen);
        lockname = aligned_lockname.aschars;
    } lmilpp = new lmi_lock((lmi_lockp) parentp, lockname, locknamelen, &status);
    *lmlpp = (lm_lockp) lmilpp;

#ifdef EVENT_POINTS
    if (lmi_elog_face)
    {
        KLOG_LOG(LM_KLOG_FACE_LEVEL, LMendOpen, (int) lmlpp);
        ELOG_LOG(LMendOpen, (int) lmlpp);
    }
endif EVENT_POINTS tmpstat = lm_check();       /* Check for callbacks */
    status = (status != LM_STAT_DONE) ? status : tmpstat;

#ifdef TRACE
    if (lmi_trace_file)
    {
        fprintf(lmi_trace_file,
                "%16u: lm_open returns \"%s\"; *lmlpp=0x%x\n\n",
                getusecclock(), lm_stat_msg(status), *lmlpp);
        fflush(lmi_trace_file);
    }
endif TRACE return status;
}   /* end lm_open */
```

```
/**********************************************************************
lm_close(): close an open lock.
**********************************************************************/ lm_stat lm_close(lm_lockp lmlp)
{
    register lmi_lockp lmilp = (lmi_lockp) lmlp;
    register lm_stat status, tmpstat;

if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginClose, (int) lmlp);
        ELOG_LOG(LMbeginClose, (int) lmlp);
    }
endif EVENT_POINTS status = lmilp->close();    /* Close the lock, and return status */ ifdef EVENT_POINTS
    if (lmi_elog_face)
    {
        KLOG_LOG(LM_KLOG_FACE_LEVEL, LMendClose, (int) lmlp);
        ELOG_LOG(LMendClose, (int) lmlp);
    }
endif EVENT_POINTS tmpstat = lm_check();       /* Check for callbacks */
    return (status != LM_STAT_DONE) ? status : tmpstat;
}   /* end lm_close */

/**********************************************************************
lm_convert(): convert between lock levels.
**********************************************************************/ lm_stat lm_convert(lm_lockp lmlp, lm_level locklevel, int optionmask,
                   lm_optionp lmop)
{
    register lmi_lockp lmilp = (lmi_lockp) lmlp;
    register lm_stat status, tmpstat;

#ifdef TRACE
    if (lmi_trace_file)
    {
        fprintf(lmi_trace_file,
    "%16u: lm_convert(lmlp=0x%x, locklevel=%d, optionmask=0x%x, lmop=0x%x)\n",
                getusecclock(), lmlp, locklevel, optionmask, lmop);
        fflush(lmi_trace_file);
    }
endif TRACE if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginConvert, (int) lmlp);
        ELOG_LOG(LMbeginConvert, (int) lmlp);
    }
endif EVENT_POINTS status = lmilp->convert(locklevel, optionmask, lmop);

ifdef EVENT_POINTS
```

```
        if (lmi_elog_face)
        {
            KLOG_LOG(LM_KLOG_FACE_LEVEL, LMendConvert, (int) lmlp);
            ELOG_LOG(LMendConvert, (int) lmlp);
        }
endif EVENT_POINTS tmpstat = lm_check();      /* Check for callbacks */
        /* status can have several successful values, so we check tmpstat */
        status = (tmpstat != LM_STAT_DONE) ? tmpstat : status;

#ifdef TRACE
        if (lmi_trace_file)
        {
            char *lockname;
            int  namelen;
            int  time = getusecclock();
            char printbuf[(LM_MAXNAMELEN*4)];
            lockname = lm_lock_name(lmlp, &namelen);
            s_print_lockname(lockname, namelen, printbuf);
            fprintf(lmi_trace_file,
                    "%16u: lm_convert lockname=%s\n", time, printbuf);
            fprintf(lmi_trace_file,
                    "%16u: lm_convert returns \"%s\"\n\n", time, lm_stat_msg(status));
            fflush(lmi_trace_file);
        }
endif TRACE return status;
}   /* end lm_convert */

/**********************************************************************
lm_open_convert(): open a lock and convert it to a specified level.
**********************************************************************/ lm_stat lm_open_convert(lm_conp lmcp, lm_lockp parentp, char *lockname,
                        size_t locknamelen, lm_level locklevel,
                        int optionmask, lm_optionp lmop,
                        /*OUT*/ lm_lockp *lmlpp)
{
        register lm_stat status;

status = lm_open(lmcp, parentp, lockname, locknamelen, lmlpp);
        if (status != LM_STAT_DONE)
            return status;

status = lm_convert(*lmlpp, locklevel, optionmask, lmop);

switch (status)
        {
        case LM_STAT_DONE:
        case LM_STAT_GOTVALUE:
        case LM_STAT_DUBVALUE:
        case LM_STAT_U64VALUE:
        case LM_STAT_NOVALUE:
        case LM_STAT_QUEUED:
            return status;

default:
            (void) lm_close(*lmlpp);
            *lmlpp = NULL;
            return status;
        }

}   /* end lm_open_convert */

/**********************************************************************
lm_cancel(): cancel a pending LM_NOWAIT conversion request.
```

```
*****************************************************************/ lm_stat lm_cancel(lm_lockp lmlp)
{
    register lm_stat status, tmpstat;
    register lmi_lockp lmilp = (lmi_lockp) lmlp;

if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginCancel, (int) lmlp);
        ELOG_LOG(LMbeginCancel, (int) lmlp);
    }
endif EVENT_POINTS status = lmilp->cancel();    /* Cancel the lock's pending request, if any */ ifdef EVENT_POINTS
    if (lmi_elog_face)
    {
        KLOG_LOG(LM_KLOG_FACE_LEVEL, LMendCancel, (int) lmlp);
        ELOG_LOG(LMendCancel, (int) lmlp);
    }
endif EVENT_POINTS tmpstat = lm_check();        /* Check for callbacks */
    return (tmpstat != LM_STAT_DONE) ? tmpstat : status;
}   /* end lm_cancel */

/*****************************************************************
lm_checkfun(): helper function for lm_check macro, don't call this directly.
*****************************************************************/ lm_stat lm_checkfun()
{
    if (lmi_check_level != 0)    /* If already in lm_checkfun callbacks, */
        return LM_STAT_DONE;     /* just return... */ if (lmi_pp != NULL)
    {
#ifdef EVENT_POINTS
        if (lmi_elog_face)
        {
            KLOG_LOG(LM_KLOG_FACE_LEVEL, LMbeginCheck, 0);
            ELOG_LOG(LMbeginCheck, 0);
        }
endif EVENT_POINTS lmi_check_level = 1;     /* Mark ourselves as already in lm_checkfun */ lm_stat status = lmi_pp->callbacks();

lmi_check_level = 0;     /* Clear lm_checkfun level before returning */ ifdef EVENT_POINTS
        if (lmi_elog_face)
        {
            KLOG_LOG(LM_KLOG_FACE_LEVEL, LMendCheck, 0);
            ELOG_LOG(LMendCheck, 0);
        }
endif EVENT_POINTS
        return status;
    }
    else
        return LM_STAT_DETACHED;
```

```
}   /* end lm_checkfun */

/****************************************************************************
lm_wait(): block process until an interesting event occurs, or until posted.
****************************************************************************/ lm_stat lm_wait(int timeout)
{
    if (lmi_pp != NULL)
    {
#ifdef EVENT_POINTS
        if (lmi_elog_face)
        {
            KLOG_LOG(LM_KLOG_FACE_LEVEL, LMbeginWait, timeout);
            ELOG_LOG(LMbeginWait, timeout);
        }
endif EVENT_POINTS lm_stat status = lmi_pp->wait(timeout);

ifdef EVENT_POINTS
        if (lmi_elog_face)
        {
            KLOG_LOG(LM_KLOG_FACE_LEVEL, LMendWait, timeout);
            ELOG_LOG(LMendWait, timeout);
        }
endif EVENT_POINTS
        return status;
    }
    else
        return LM_STAT_DETACHED;
}   /* end lm_wait */

/****************************************************************************
lm_post(): post a wakeup to a given process, for return by lm_wait.
****************************************************************************/ lm_stat lm_post(int pid, /*INOUT*/ lm_procp *lmppp)
{
    register lmi_procp *lmippp;
    register lm_stat status;
    lmi_procp dummy_lmipp;

#ifdef EVENT_POINTS
    if (lmi_elog_face)
    {
        KLOG_LOG(LM_KLOG_FACE_LEVEL, LMbeginPost, pid);
        ELOG_LOG(LMbeginPost, pid);
    }
endif EVENT_POINTS /* If we were given a cache pointer, coerce it to an internal pointer; */
    /* if there is no cache pointer, use a dummy NULL local variable. */ if (lmppp != NULL)
        lmippp = (lmi_procp *) lmppp;
    else
    {
        dummy_lmipp = NULL;
        lmippp = &dummy_lmipp;
    }

/* If we have a cached hint, try to do post directly; */
    /* if it complains that the pid is non-existent, we'll try searching */
    /* for the pid starting with our node.  If we don't have a node, */
    /* complain about it.  If we didn't have a cached hint or it didn't work, */
    /* try the more slower but more general linear pid lookup. */
```

```
    if (*lmippp != NULL)
        status = (*lmippp)->post(pid);
    else if (lmi_np != NULL)
        status = LM_STAT_BADPID;
    else
        return LM_STAT_NOCREATE;

if (status == LM_STAT_BADPID)
        status = lmi_np->post(pid, lmippp); /* lmippp will not be NULL */ ifdef EVENT_POINTS
    if (lmi_elog_face)
    {
        KLOG_LOG(LM_KLOG_FACE_LEVEL, LMendPost, pid);
        ELOG_LOG(LMendPost, pid);
    }
endif EVENT_POINTS return status;
}   /* end lm_post */

/**************************************************************************
lm_detach_pid(): detach specified process that has terminated abnormally.
**************************************************************************/ lm_stat lm_detach_pid(int target_pid)
{
    int       target_nid;
    lmi_procp lmipp;
    lm_stat   status;

/* Does the lock manager instance exist? */
    if (lmi_np == NULL)
        return LM_STAT_BADCREATE;

/* Is the caller attached */
    if (lmi_pp == NULL)
        return LM_STAT_DETACHED;

/* Does the target pid make any sense at all? */
    if (target_pid < 1)
        return LM_STAT_BADPID;

/* Is the target currently attached? */
    status = lmi_np->proc_lookup(target_pid, &lmipp);
    if (status == LM_STAT_BADPID)
        return LM_STAT_BADPID;

/* Does the target process currently exist? */
    int pidstat = kill(target_pid, 0);
    if (pidstat == -1)
    {
        switch (errno)
        {
        case ESRCH:    /* This is the GOOD case, the pid doesn't exist */
            break;

default:       /* Unexpected cases */
            return lmi_md_errno_stat();
        }
    }
    else               /* This is bad because the pid is alive */
        /* $$$ Should have a different status return here.
            I think we'll need a new one which reflects that the
            target pid of a lm_detach_pid is still alive and shouldn't
            be detached! ksedgwic 16-Mar-89 */
        return LM_STAT_BADARG;
```

```
/* -------- Well, looks like it's OK to detach the poor fellow -------- */

/* We're going to assume the identity of the lost soul.  First we'll
    save OUR identity somewhere where we can get it later. */
lmi_nodep  saved_lmi_np     = lmi_np;
lmi_procp  saved_lmi_pp     = lmi_pp;
int        saved_lmi_nid_pid = lmi_nid_pid;
int*       saved_lm_checkp  = lm_checkp;

/* Next we assume the identity of the lost soul w/ the exception
    of the check pointer which we'll patch to a permanently zero
    value */

/* We already have his proc struct address */
lmi_pp = lmipp;

/* Our node can give us his node */
target_nid = lmipp->nid();
status = saved_lmi_np->getnp(target_nid, &lmi_np);
if (status != LM_STAT_DONE)
    return status;

/* We'll build a nid_pid */
lmi_nid_pid = (target_nid << 16) | target_pid;

/* We'll patch the checkpointer to a zero */
static int s_always_false = 0;
lm_checkp = &s_always_false;

/* -------- We're all dressed and ready to go! --------- */ status = lmi_pp->destroy(&lmi_pp, &lm_checkp);

/* ---- That should do it; Where's that phone booth? ---- */ lmi_np      = saved_lmi_np;
lmi_pp      = saved_lmi_pp;
lmi_nid_pid = saved_lmi_nid_pid;
lm_checkp   = saved_lm_checkp;

/* Let's check for our callbacks */
lm_stat chkstat = lm_check();

/* If status is OK then we'll return chkstat */
return (status == LM_STAT_DONE) ? chkstat : status;
}   /* end lm_detach_pid */

/****************************************************************************
lm_check_deadlock(): check for a deadlock blocking the given lock request.
****************************************************************************/ lm_stat lm_check_deadlock(lm_lockp lmlp)
{
    /* We'll use the lmlp variable to make c++ happy ... */
    return (lmlp == NULL) ? LM_STAT_NIY : LM_STAT_NIY;

}   /* end lm_check_deadlock */

/****************************************************************************
lm_stat_lock(): return lock status information.
****************************************************************************/ lm_stat lm_stat_lock(lm_lockp lmlp, size_t structsize,
                     /*INOUT*/ lm_stlockp lslp)
{
    register lmi_lockp lmilp = (lmi_lock *) lmlp;
```

```
        if (lmilp == NULL)
            return LM_STAT_NULLPTR;

return lmilp->stat(structsize, lslp);

}   /* end lm_stat_lock */

/*******************************************************************************
lm_stat_res(): return resource status information
*******************************************************************************/ lm_stat lm_stat_res(lm_resp lmrp, size_t structsize,
                    /*INOUT*/ lm_stresp lsrp)
{
    register lmi_resp lmirp = (lmi_res *) lmrp;

if (lmirp == NULL)
        return LM_STAT_NULLPTR;

return lmirp->stat(structsize, lsrp);

}   /* end lm_stat_res */

/*******************************************************************************
lm_stat_proc(): return process status information
*******************************************************************************/ lm_stat lm_stat_proc(lm_procp lmpp, size_t structsize,
                    /*INOUT*/ lm_stprocp lspp)
{
    register lmi_procp lmipp = (lmi_proc *) lmpp;

if (lmipp == NULL)
        return LM_STAT_NULLPTR;

return lmipp->stat(structsize, lspp);

}   /* end lm_stat_proc */

/*******************************************************************************
lm_stat_node(): return node status information
*******************************************************************************/ lm_stat lm_stat_node(int nid, size_t structsize, /*INOUT*/ lm_stnodep lsnp)
{
    register lm_stat status;
    lmi_nodep np;

if (lmi_np == NULL)
        return LM_STAT_NOCREATE;

if ((status = lmi_np->getnp(nid, &np)) != LM_STAT_DONE)
        return status;

return np->stat(structsize, lsnp);

}   /* end lm_stat_node */

/*******************************************************************************
lm_stat_hash(): return hash table status information
*******************************************************************************/ lm_stat lm_stat_hash(int nid, size_t structsize,
                    /*INOUT*/ lm_sthashp lshp)
{
    register lm_stat status;
    lmi_nodep np;
```

```c
    if (lmi_np == NULL)
        return LM_STAT_NOCREATE;

if ((status = lmi_np->getnp(nid, &np)) != LM_STAT_DONE)
        return status;

return np->stat_hash(structsize, lshp);

}   /* end lm_stat_hash */

/**********************************************************************
s_timeout_freshen(): Reads an environmental variable to determine which
simple lock timeout value to use.
**********************************************************************/ ifdef BFLY1
define MAX_SIM_TIMEOUT_SECS    (0x7FFFFFFF/TICKS_PER_SECOND)
                                /* 134217 seconds on a GP1000 */
endif BFLY1 ifdef BFLY2
define MAX_SIM_TIMEOUT_SECS    1000000         /* A million seconds */
endif BFLY2 static void s_timeout_freshen()
{
    char *timeout_string;

/* Check the environment for a simple lock timeout value. If
       the environmental variable is not defined or the environmental
       supplied value is negative use the default value */
    lmi_sim_timeout_ticks = 0;  /* Start w/ it equal to zero */

/* Look for the environment variable */
    timeout_string = getenv(ENV_SIM_TIMEOUT_VAR);
    if (timeout_string)
    {
        /* There seems to be a value defined */
        realtime timeout_secs = atoi(timeout_string);

/* If the user requests a negative number give him the default */
        if (timeout_secs < 0) timeout_secs = 0;

/* If the user requesst too large a number give him the largest
           possible. */
        if (timeout_secs > MAX_SIM_TIMEOUT_SECS)
            timeout_secs = MAX_SIM_TIMEOUT_SECS;

/* Convert the seconds to rtc ticks */
        lmi_sim_timeout_ticks = timeout_secs * (realtime)(TICKS_PER_SECOND);
    }

/* If we haven't a value yet we'll use the default */
    if (lmi_sim_timeout_ticks == 0)
        lmi_sim_timeout_ticks = LMI_SIM_TIMEOUT_TICKS;
}

/**********************************************************************
lm_elog(): Sets up event logging for the lock manager.

Currently the following elog sets are defined and selected by the
following option bits:
        LM_ELOG_FACE    Event logs lock manager interface routines
        LM_ELOG_SIM     Event logs simple lock manipulations
**********************************************************************/ void lm_elog(int elog_sets)
{
```

```
#ifdef EVENT_POINTS
    /* Unpack the option bits; turn on the individual flag variables
       per each selected event log set. */
    if (elog_sets & LM_ELOG_FACE)
        lmi_elog_face = TRUE;
    if (elog_sets & LM_ELOG_SIM)
        lmi_elog_sim = TRUE;

/* If there is a shared memory segment save the elog_sets in it.
       Later when processes attach we'll grab the values from there.
       We won't bother locking it because:
       1) We're called right after lm_create and before any lm_attaches.
       2) We act atomically on the data structure anyway. */
    if (lmi_mp != NULL)
        lmi_mp->set_elog_sets(elog_sets);

#ifdef ELOG
    /* Do any elog defines required */
    if (lmi_elog_face)
    {
        elog_define(LMbeginOpen,    "LMbeginOpen",    "%x"); /* lm_lockpp */
        elog_define(LMendOpen,      "LMendOpen",      "%x"); /* lm_lockpp */
        elog_define(LMbeginClose,   "LMbeginClose",   "%x"); /* lm_lockp */
        elog_define(LMendClose,     "LMendClose",     "%x"); /* lm_lockp */
        elog_define(LMbeginConvert, "LMbeginConvert", "%x"); /* lm_lockp */
        elog_define(LMendConvert,   "LMendConvert",   "%x"); /* lm_lockp */
        elog_define(LMbeginCancel,  "LMbeginCancel",  "%x"); /* lm_lockp */
        elog_define(LMendCancel,    "LMendCancel",    "%x"); /* lm_lockp */
        elog_define(LMbeginCheck,   "LMbeginCheck",   "%d"); /* 0 */
        elog_define(LMendCheck,     "LMendCheck",     "%d"); /* 0 */
        elog_define(LMbeginWait,    "LMbeginWait",    "%d"); /* timeout */
        elog_define(LMendWait,      "LMendWait",      "%d"); /* timeout */
        elog_define(LMbeginPost,    "LMbeginPost",    "%d"); /* pid */
        elog_define(LMendPost,      "LMendPost",      "%d"); /* pid */
    } if (lmi_elog_sim)
    {
        elog_define(LMbeginSimLock,    "LMbeginSimLock",    "%x");
        elog_define(LMendSimLock,      "LMendSimLock",      "%x");
        elog_define(LMbeginSimLocked,  "LMbeginSimLocked",  "%x");
        elog_define(LMendSimLocked,    "LMendSimLocked",    "%x");
        elog_define(LMsimLockOneTry,   "LMsimLockOneTry",   "%x");
        elog_define(LMsimLockRetry,    "LMsimLockRetry",    "%x");
        elog_define(LMsimLockFinally,  "LMsimLockFinally",  "%x");
        elog_define(LMsimLockNidPid,   "LMsimLockNidPid",   "%x");
        elog_define(LMsimLockTimeout,  "LMsimLockTimeout",  "%x");
        elog_define(LMsimLockNowait,   "LMsimLockNowait",   "%x");
        elog_define(LMsimLockSleepU,   "LMsimLockSleepU",   "%x");
        elog_define(LMsimLockNoidle,   "LMsimLockNoidle",   "%x");
        elog_define(LMsimLockSame,     "LMsimLockSame",     "%x");
        elog_define(LMsimLockDiff,     "LMsimLockDiff",     "%x");
    }
#endif ELOG
#else
    elog_sets = elog_sets;    /* To hush up C++ unused arg complaint */
#endif EVENT_POINTS
}

/****************************************************************************
lm_lock_name(): returns a pointer to the resource name associated
with a lock pointer.
****************************************************************************/ char *lm_lock_name(lm_lockp lmlp, /*OUT*/ int *namelen)
{
    register lmi_lockp lmilp = (lmi_lockp) lmlp;
```

```
    if (lmilp == NULL)
        return NULL;

return lmilp->lock_name(namelen);
}

/******************************************************************************
lm_lock_level(): returns the lock level that a current lock is held at.
******************************************************************************/ lm_level lm_lock_level(lm_lockp lmlp)
{
    register lmi_lockp lmilp = (lmi_lockp) lmlp;

if (lmilp == NULL)
        return -1;

return lmilp->lock_level();
}

/******************************************************************************
lm_lock_req_cookie(): returns the lock cookier that is current.
******************************************************************************/ lm_voidp lm_lock_req_cookie(lm_lockp lmlp)
{
    register lmi_lockp lmilp = (lmi_lockp) lmlp;

if (lmilp == NULL)
        return NULL;

return lmilp->lock_req_cookie();
}

/******************************************************************************
lm_attachforstat(): attach process to existing lock manager instance/context.
******************************************************************************/ lm_stat lm_attachforstat(char *name, /*OUT*/ lm_conp *lmcpp)
{
    lm_stat status;
    register int pid;
    int temp_flag;
    int *dummy1, *dummy2;

s_timeout_freshen();        /* Freshen up the simple lock timeout */ if (lmcpp != NULL)
        return LM_STAT_NIY;

/* If the name is non-NULL, go make sure we have the shared memory */
    /* regions for that name mapped in; if not, try to map them in.  If */
    /* they haven't been created, give a LM_STAT_NOCREATE error. */
    /* -rweils, 19-Jan-89 */

/* If we already have a creation context without a mapmem context, */
    /* complain about the name since we were created without a name. */
    /* -rweils, 27-Jan-89. */ if (name != NULL)
    {
        if (lmi_mp == NULL && lmi_np != NULL)
            return LM_STAT_BADNAME;

if ((status = s_mapmemforstat_freshen(name)) != LM_STAT_DONE)
            return status;
    }
```

```c
    /* If the name is NULL, complain if we have previously created, */
    /* attached, or inherited a named context. -rwells, 22-Jan-89 */ else if (lmi_np != NULL)
        return LM_STAT_BADNAME;

pid = lmi_md_getpid();
    if ((status = s_attachforstat_freshen(pid)) != LM_STAT_DONE)
        return status;

/* If the proc pointer is non-null, we are already well attached. */
    if (lmi_pp != NULL)
        return LM_STAT_DONE;

/* Register the preemption control variables with the kernel.
       Dummy variables are used here because the real preemption
       control globals are already known to all the routines
       which use them ... */
    status = lm_nopreempt(&dummy1, &dummy2);
    if (status != LM_STAT_DONE)
        return status;

/* Localize our copies of the elog_flag globals. */
    temp_flag = lmi_elog_face;
    lmi_elog_face = temp_flag;
    temp_flag = lmi_elog_sim;
    lmi_elog_sim = temp_flag;

/* (Note that standard attach uses constructor lmi_proc() to set
     * lm_checkp.  What do I need to do? BCM ???)
     */
#ifdef UNDEF
    /* Allocate a new process block, and set lm_checkp appropriately. */
    /* If the allocation fails, the two globals will be set to detached */
    /* values, and an error status code will be returned. */ lmi_pp = new lmi_proc(pid, &lm_checkp, &status);
    return status;
else
    return LM_STAT_DONE;
#endif UNDEF
}   /* end lm_attachforstat */

/*************************************************************************
s_attachforstat_freshen(): freshen our global node and process pointers.
This helper function is used for both attach and detach.
*************************************************************************/ static lm_stat s_attachforstat_freshen(int pid)
{
    int cid, numnodes, nid;
    register lm_stat status;

if (lmi_np == NULL)         /* Maybe an lm_create wasn't done. */
        return LM_STAT_NOCREATE;

if ((status = lmi_md_cluster(&cid, &numnodes, &nid)) != LM_STAT_DONE)
        return status;

/* Force nid to 0 so we borrow node 0's data structs */
    nid = 0;

/* Freshen up the convolved node id and process id. */
    lmi_nid_pid = (nid << 16) | pid;

/* Avoid the check for BADCLUSTER or BADNID, as is done in the
     * standard s_attach_freshen().
     */
```

```c
#ifdef UNDEF
    /* If we have forked into a different cluster, forget it. */ if (lmi_np->cid() != cid)
        return LM_STAT_BADCLUSTER;

/* If the cluster has somehow grown beyond its size at creation time */
    /* and we are on a new node, we have to give up; coding assumes that */
    /* we setup memory on each eligible node in cluster at creation time. */
    /* -rwells, 22-Jan-89 */ if (nid >= lmi_np->numnodes())
        return LM_STAT_BADNID;
#endif UNDEF

/* Freshen up the node pointer, just in case. */
    /* We need a different node pointer if we have forked to */
    /* a different node. */
    /* By assigning to lmi_np, we force its page to be local to our node. */ if ((status = lmi_np->getnp(nid, &lmi_np)) != LM_STAT_DONE)
        return status;

/* Careful here! Stat attach won't have a valid lmi_pp (it should already
     * be NULL), so don't check it
     */
#ifdef UNDEF
    /* If we have forked to different process since attach, clear the ptr */ if (lmi_pp != NULL && lmi_pp->pid() != pid)
        lmi_pp = NULL;
endif UNDEF return LM_STAT_DONE;
}   /* end s_attachforstat_freshen */

/************************************************************************
s_mapmemforstat_freshen(): freshen our mapping of a named shared memory region.
Assumes that name is non-null, and is only called from lm_attach.
************************************************************************/ static lm_stat s_mapmemforstat_freshen(char *name)
{
    lm_stat status;

/* If we already have a mapmem structure, make sure it has same name */
    if (lmi_mp != NULL)
    {
        if (lmi_mp->match(name))
            return LM_STAT_DONE;
        else
            return LM_STAT_BADNAME;
    }

/* Otherwise we should try to get the named region and map it in. */
    /* If successful, it will also set our node pointer through the */
    /* argument pointer. The 0 numnodes and size arguments identify */
    /* this as an attach rather than a create. -rwells, 19-Jan-89 */ lmi_mp = new lmi_mapmem(name, 0, 0, NULL, &status, (int) STAT_ATTACH);

/* This looks like a good place to freshen our elog flags. We
       don't get here unless we actually had to use mapmem. If we didn't
       have to use mapmem then we will have inherited the flags. */
    if (status == LM_STAT_DONE)
    {
        if (lmi_mp->elog_sets() & LM_ELOG_FACE)
            lmi_elog_face = TRUE;
```

```c
        if (lmi_mp->elog_sets() & LM_ELOG_SIM)
            lmi_elog_sim = TRUE;
    }

/* If the construction succeeds, we have to unlock the mapmem object, */
    /* since the constructor leaves it locked for the sake of create. */ if (status == LM_STAT_DONE)
        status = lmi_mp->unlock();

/* If we have succeeded so far, store pointer to first node object */
    /* into lmi_np where the rest of the code can find it. */ if (status == LM_STAT_DONE)
        status = lmi_mp->nodep(0, &lmi_np);

return status;
}   /* end s_mapmemforstat_freshen */

/*************************************************************************
s_print_lockname: prints a dual representation of the resource name into a
provided buffer. The first part shows the ascii representation.  Te character
"^" is subsituted for unprintables.  The second part is a hex dump of the name.
*************************************************************************/ ifdef TRACE
void s_print_lockname(char* lockname, int namelen, char* printbuf)
{
    int count;
    int i = 0;

printbuf[i++] = '"';
    for(count = 0; count < namelen; count++, i++)
        if ( isprint(lockname[count]) )
            sprintf( &printbuf[i], "%c", lockname[count] );
        else
            sprintf( &printbuf[i], "^");
    sprintf( &printbuf[i], "\" : 0x" );
    i+=6;
    for (count = 0; count < namelen; count++, i+=2)
        sprintf( &printbuf[i], "%02x", (int) lockname[count] );
    sprintf( &printbuf[i], ": %2d", namelen );
}
endif TRACE /*************************************************************
lm_nopreempt(): This function returns the addresses of the preemption
control variables used by the lock manager.  It is intended to allow
clients of the lock manager to avoid preemption in their latching
routines as well.
*************************************************************/ lm_stat lm_nopreempt(/*OUT*/int **flagaddr, /*OUT*/int **timeaddr)
{
    int  retval;

*flagaddr = &lmi_pflag;
    *timeaddr = &lmi_ptime;

retval = user_nopreempt(&lmi_pflag, &lmi_ptime);
    if (retval == -1)
        return lmi_md_errno_stat();
    else
        return LM_STAT_DONE;

}   /* end lm_nopreempt */
```

```
/****************************************************************
lm_u64_set(): Set an unsigned 64 bit counter value.
Leaves the lock at NL level, and executes very quickly if the resource is
only held at NL level.  Returns status LM_STAT_DONE if successful.
****************************************************************/ lm_stat lm_u64_set(lm_lockp lmlp, lm_u64p u64p)
{
    register lmi_lockp lmilp = (lmi_lockp) lmlp;
    register lm_stat status, tmpstat;

#ifdef TRACE
    if (lmi_trace_file)
    {
        fprintf(lmi_trace_file,
                "%16u: lm_u64_set(lmlp=0x%x, *u64=0x%08x %08x)\n",
                lmlp, u64p->hi, u64p->lo);
        fflush(lmi_trace_file);
    }
endif TRACE if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginU64Set, (int) lmlp);
        ELOG_LOG(LMbeginU64Set, (int) lmlp);
    }
endif EVENT_POINTS status = lmilp->u64_set(u64p);

ifdef EVENT_POINTS
    if (lmi_elog_face)
    {
        KLOG_LOG(LM_KLOG_FACE_LEVEL, LMendU64Set, (int) lmlp);
        ELOG_LOG(LMendU64Set, (int) lmlp);
    }
endif EVENT_POINTS tmpstat = lm_check();       /* Check for callbacks */
    /* status can have several successful values, so we check tmpstat */
    status = (tmpstat != LM_STAT_DONE) ? tmpstat : status;

#ifdef TRACE
    if (lmi_trace_file)
    {
        int  time = getusecclock();
        fprintf(lmi_trace_file,
                "%16u: lm_u64_set returns \"%s\"\n\n", time, lm_stat_msg(status));
        fflush(lmi_trace_file);
    }
endif TRACE return status;
}   /* end lm_u64_set */

/****************************************************************
lm_u64_get(): Get an unsigned 64 bit counter value.
Leaves the lock at NL level, and executes very quickly if the resource is
only held at NL level.  Returns LM_STAT_U64VALUE if successful.
****************************************************************/ lm_stat lm_u64_get(lm_lockp lmlp, /*OUT*/ lm_u64p u64p)
{
```

```
    register lmi_lockp lmilp = (lmi_lockp) lmlp;
    register lm_stat status, tmpstat;

#ifdef TRACE
    if (lmi_trace_file)
    {
        fprintf(lmi_trace_file, "%16u: lm_u64_get(lmlp=0x%x)\n", lmlp);
        fflush(lmi_trace_file);
    }
endif TRACE if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginU64Get, (int) lmlp);
        ELOG_LOG(LMbeginU64Get, (int) lmlp);
    }
endif EVENT_POINTS status = lmilp->u64_get(u64p);

ifdef EVENT_POINTS
    if (lmi_elog_face)
    {
        KLOG_LOG(LM_KLOG_FACE_LEVEL, LMendU64Get, (int) lmlp);
        ELOG_LOG(LMendU64Get, (int) lmlp);
    }
endif EVENT_POINTS tmpstat = lm_check();       /* Check for callbacks */
    /* status can have several successful values, so we check tmpstat */
    status = (tmpstat != LM_STAT_DONE) ? tmpstat : status;

#ifdef TRACE
    if (lmi_trace_file)
    {
        int  time = getusecclock();
        fprintf(lmi_trace_file,
            "%16u: lm_u64_get returns 0x%08x %08x \"%s\"\n\n",
            time, u64p->hi, u64p->lo, lm_stat_msg(status));
        fflush(lmi_trace_file);
    }
endif TRACE return status;
}   /* end lm_u64_get */

/*************************************************************************
lm_u64_incget(): Atomically increment an unsigned 64 bit counter value and
get the new value.  Returns LM_STAT_U64VALUE if successful.  If incrementing
the value would result in wrap-around to zero, the value is left unchanged and
the error status LM_STAT_U64MAX is returned instead.
Leaves the lock at NL level, and executes very quickly if the resource is
only held at NL level.

*************************************************************************/ lm_stat lm_u64_incget(lm_lockp lmlp, /*OUT*/ lm_u64p u64p)
{
    register lmi_lockp lmilp = (lmi_lockp) lmlp;
    register lm_stat status, tmpstat;

#ifdef TRACE
    if (lmi_trace_file)
    {
```

```
        fprintf(lmi_trace_file, "%16u: lm_u64_incget(lmlp=0x%x)\n", lmlp);
        fflush(lmi_trace_file);
    }
endif TRACE if (lmilp == NULL)
        return LM_STAT_NULLPTR;

#ifdef EVENT_POINTS
    if (lmi_elog_face)
    {
        KLOG_LOG(LM_KLOG_FACE_LEVEL, LMbeginU64IncGet, (int) lmlp);
        ELOG_LOG(LMbeginU64IncGet, (int) lmlp);
    }
endif EVENT_POINTS status = lmilp->u64_incget(u64p);

ifdef EVENT_POINTS
    if (lmi_elog_face)
    {
        KLOG_LOG(LM_KLOG_FACE_LEVEL, LMendU64IncGet, (int) lmlp);
        ELOG_LOG(LMendU64IncGet, (int) lmlp);
    }
endif EVENT_POINTS tmpstat = lm_check();      /* Check for callbacks */
    /* status can have several successful values, so we check tmpstat */
    status = (tmpstat != LM_STAT_DONE) ? tmpstat : status;

#ifdef TRACE
    if (lmi_trace_file)
    {
        int  time = getusecclock();
        fprintf(lmi_trace_file,
             "%16u: lm_u64_incget returns 0x%08x %08x \"%s\"\n\n",
             time, u64p->hi, u64p->lo, lm_stat_msg(status));
        fflush(lmi_trace_file);
    }
endif TRACE return status;
}   /* end lm_u64_incget */
/**************************************************************************
File:     lmi_lock.cxx
Contents: Methods for the lock class.
System:   BBNACI Programming Environments.
Created:  13-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
**************************************************************************/

/* $Header: /nfs/oak/u1/ksedgwic/src/liblm/RCS/lmi_lock.cxx,v 1.14 90/03/15 20:30:25 rwells Exp $ */
```

```c
#include <lmi.hxx>

/***********************************************************************
lmi_lock::check(): be paranoid, sniff and see if it is really a lock, probably.
***********************************************************************/ lm_stat lmi_lock::check()
{
    if (i_tid == LMI_LOCK)
        return LM_STAT_DONE;
    else if (i_tid == LMI_FREE)
        return LM_STAT_FREE;
    else
        return LM_STAT_BADOBJECT;
}   /* end lmi_lock::check */

/***********************************************************************
lmi_lock::stat(): Return status info on lock object.

Since the status report is not interlocked, it may be somewhat
inconsistent if the lock is stat'ed while its owner is changing it.
It does not seem worth the extra overhead of full interlocking just to
get fully consistent status at this level; since the lock object can
only be changed by its owning process, no interlocking is needed for
non-stat operations.
***********************************************************************/ lm_stat lmi_lock::stat(size_t structsize, /*OUT*/ lm_stlock *lslp)
{
    register lm_stat    status;
    register int        len;

if (structsize != sizeof(lm_stlock))
        return LM_STAT_BADSIZE;
    if (lslp == NULL)
        return LM_STAT_NULLPTR;
    lslp->nid = i_nid;          /* Set nid and dex even for free object */
    lslp->dex = i_dex;          /* Bad objects too, but shouldn't kill us */ if ((status = check()) != LM_STAT_DONE)
        return status;

if (lmi_np == NULL)         /* Just being careful before we use it... */
        return LM_STAT_NOCREATE;

/* No lock on the open lock object */ len = lmi_np->valuelen();
    lslp->vallen = len;
    if (lslp->valp != NULL)
    {
        if (len > lslp->valmaxlen)
            len = lslp->valmaxlen;
        bcopy((char *) i_value, (char *) lslp->valp, len);
    } lslp->resp      = (lm_resp) i_resp;
    lslp->procp     = (lm_procp) i_procp;
    lslp->level     = i_level;
    lslp->notify    = i_notify;
    lslp->req_stat  = i_req_stat;
    lslp->req_level = i_req_level;
    lslp->req_opts  = i_req_opts;
    lslp->req_endp  = i_req_endp;
    lslp->req_notp  = i_req_notp;
    lslp->req_cook  = i_req_cook;
    lslp->end_stat  = i_end_stat;
    lslp->end_valp  = i_end_valp;
    lslp->cur_notp  = i_cur_notp;
    lslp->cur_cook  = i_cur_cook;

return LM_STAT_DONE;
}   /* end lmi_lock::stat */
```

```
/************************************************************************
lmi_lock::lock_name(): returns the resource name that this lock is
associated with.  This is a reletively lightweight routine.  The
namelen argument should point to a place to store the length of the
name.  If no length is desired a NULL pointer should be passed.  This
routine returns NULL if something is wrong.
************************************************************************/ char* lmi_lock::lock_name(/*OUT*/ int *namelen)
{
    if (check() != LM_STAT_DONE)
        return NULL;

if (namelen != NULL)
        *namelen = i_resp->namelen();

return i_resp->name();
}

/************************************************************************
lmi_lock::lmi_lock(): Construct lock object, opening it on a resource.
************************************************************************/ lmi_lock::lmi_lock(lmi_lockp parentp, char *lockname,
                   size_t locknamelen, /*OUT*/ lm_stat *statp)
{
    auto    lmi_lockp argthis;  /* Just for passing to out argument */
    register lm_stat  status;
    register lmi_resp parresp;

this = NULL; .              /* Make it clear we control allocation */ if (lockname == NULL)
    {
        *statp = LM_STAT_NULLPTR;
        return;
    } if (locknamelen < 0 || locknamelen > LM_MAXNAMELEN)
    {
        *statp = LM_STAT_BADNAME;
        return;
    } if (lmi_np == NULL)
    {
        *statp = LM_STAT_NOCREATE;
        return;
    } if (lmi_pp == NULL)
    {
        *statp = LM_STAT_DETACHED;
        return;
    } if (parentp == NULL)         /* Null parent lock is the easiest */
        parresp = NULL;
    else if ((status = parentp->check()) != LM_STAT_DONE)
    {
        *statp = status;         /* Parent lock must be valid */
        return;
    }
    else if (parentp->i_procp != lmi_pp)
    {
        *statp = LM_STAT_NOTOWNER; /* Must be owner of parent lock */
        return;
    }
    else                         /* We have a live parent resource pointer */
    {
```

```
        parresp = parentp->i_resp;
        /* Make sure the parent resource pointer is valid */
        if (parresp == NULL || parresp->check() != LM_STAT_DONE)
        {
            *statp = LM_STAT_BADOBJECT;
            return;
        }
    }

/* Arguments look valid, lets allocate a lock for ourselves */ if ((status = lmi_np->newlock(&argthis)) != LM_STAT_DONE)
    {
        *statp = status;        /* Oops, allocation failed */
        return;
    }
    else
        this = argthis;

/* ----- lock is now allocated; if we fail, we should free it up ----- */ i_level = LM_NL;              /* Lock starts at null level */
    i_req_stat = LM_STAT_IDLE;    /* This is the idle request status */
    i_end_stat = LM_STAT_IDLE;    /* For cleanliness */
    i_notify = LM_NL;             /* For cleanliness */

/* We don't bother setting the request or end fields since request */
    /* is idle and no completion callback is pending.  The status will */
    /* reflect initially zero fields for first allocation, and will have */
    /* previously set values for subsequent re-allocations. */
    /* Ditto for current notify and cookie fields. */ i_procp = lmi_pp;             /* We are the owning process */
    i_resp = NULL;                /* We will set resource for real below. */ if (i_resq.isnull())          /* Only initialize queue entries if this */
    {                             /*    is the first time for this object. */
        i_resq.init();            /* We will put lock in resource queue below. */
        i_notifyq.init();         /* It may never get put in the notify queue. */
        i_procq.init();           /* We will put lock in process queue below. */
        i_callq.init();           /* It may never get put in the callback queue. */
    }

/* Don't bother initializing value field - only interesting after convert */

/* ----- Our local fields are as initialized as they need to be ----- */
    /* We need to: */
    /* put lock in process queue, */
    /* find or create the right resource, */
    /* link lock and resource together, and link resource and optional parent. */

/* Add lock to process ownership queue */
    if ((status = lmi_pp->addlock(&i_procq)) != LM_STAT_DONE)
    {
        /* Somehow the queue addition failed - free lock and return status */
        (void) lmi_np->freelock(this); /* Status is bad, don't need more status */
        this = NULL;              /* Reset this pointer to null */
        *statp = status;          /* Return the primary error status */
        return;
    }

/* ----- lock is allocated AND in process queue. ----- */

/* Let the node object mediate fixing up the resource and node stat queue */
    /* Note that the two field arguments will get set by this call. */ status = lmi_np->openlock(parresp, lockname, locknamelen, &i_resp, &i_resq);

/* Clean up our part of the mess if the resource part failed. */
    if (status != LM_STAT_DONE)
```

```
        (void) lmi_pp->dellock(&i_procq); /* Remove from process queue */
        (void) lmi_np->freelock(this); /* Free its storage */
        this = NULL;            /* Reset this pointer to null */
        *statp = status;        /* Return the primary error status */
        return;
    }

/* ----- We made it all the way through ----- */

*statp = LM_STAT_DONE;

}   /* end lmi_lock::lmi_lock */

/************************************************************************
lmi_lock::close(): close the lock, taking care of all the details.
************************************************************************/ lm_stat lmi_lock::close()
{
    register lm_stat status, tmpstat;

if (lmi_np == NULL)
        return LM_STAT_NOCREATE;
    if (lmi_pp == NULL)
        return LM_STAT_DETACHED;

if ((status = check()) != LM_STAT_DONE)
        return status;

if (i_procp != lmi_pp)
        return LM_STAT_NOTOWNER; /* Must be owner of lock */

/* Deal with cancelling pending requests. */
    if (i_req_stat != LM_STAT_IDLE)
    {
        if ((status = cancel()) != LM_STAT_DONE && status != LM_STAT_IDLE)
            return status;
    }

/* Convert to null lock level if it is held at higher level */
    if (i_level != LM_NL)
    {
        /* Suppose a queued conversion for this lock completed before the */
        /* cancel, but after the last time lm_check() could have delivered */
        /* the completion callback. The lock would then be in LM_STAT_DONE */
        /* request status rather than LM_STAT_IDLE, and the convert below */
        /* could fail due to the lock not being in LM_STAT_IDLE state. */
        /* Cancel any pending completion callback, so convert can work. */ if (i_req_stat == LM_STAT_DONE) /* Cancel pending completion */
            i_req_stat = LM_STAT_IDLE;  /*    callback, if any. */ if ((status = convert(LM_NL, 0, NULL)) != LM_STAT_DONE)
            return status;
    }

/* Cancel all pending callbacks for this lock, whether or not it is ours */
    if ((status = i_procp->nocallback_lock(this)) != LM_STAT_DONE)
        return status;
    /* At this point, i_callq.isempty() must be true. */

/* Close null lock from resource and node point of view. */
    status = lmi_np->closelock(&i_resp, &i_resq);

/* Remove lock from process ownership queue */
    if ((tmpstat = i_procp->dellock(&i_procq)) != LM_STAT_DONE)
        status = tmpstat;

/* Finally free the lock chunk back to its/our node. */
```

```c
    if ((tmpstat = lmi_np->freelock(this)) != LM_STAT_DONE)
        status = tmpstat;

return status;

}   /* end lmi_lock::close */

/******************************************************************************
lmi_lock::convert(): convert to a new lock level.
******************************************************************************/ lm_stat lmi_lock::convert(lm_level locklevel, register int optionmask,
                          register lm_optionp lmop)
{
    register lm_stat status;
    register int valoption;

/* If the lock level is out of bounds, complain. */
    if (locklevel < LM_NL || locklevel > LM_EX)
        return LM_STAT_BADLEVEL;

/* If any extra bits are set in the option mask, complain. */
    if (optionmask & ~(LM_TIMEOUT | LM_INTERRUPT | LM_NOQUEUE |

LM_EXPRESS | LM_NOWAIT | LM_NOTIFY | LM_GETVALUE |
                       LM_PUTVALUE | LM_NOVALUE | LM_DUBVALUE))
        return LM_STAT_BADOPTION;

/* If more than one value option is given, complain. */
    valoption = optionmask & (LM_GETVALUE | LM_PUTVALUE | LM_NOVALUE | LM_DUBVALUE);
    if ((valoption != 0) && (valoption != LM_GETVALUE) &&
        (valoption != LM_PUTVALUE) && (valoption != LM_NOVALUE) &&
        (valoption != LM_DUBVALUE))
        return LM_STAT_BADOPTION;

/* If an option was specified but there is no option block pointer, */
    /* complain.  If an option requires a non-null field pointer, */
    /* complain if it is null. */ if ((optionmask & (LM_TIMEOUT|LM_NOWAIT|LM_NOTIFY|LM_GETVALUE|LM_PUTVALUE)) &&
        (lmop == NULL ||
         ((optionmask & LM_NOWAIT) && lmop->nowait_fp == NULL) ||
         ((optionmask & LM_NOTIFY) && lmop->notify_fp == NULL) ||
         ((optionmask & (LM_GETVALUE|LM_PUTVALUE)) && lmop->lockvalp == NULL)))
        return LM_STAT_NULLPTR;

/* Make sure the lock object is valid and open. */
    if ((status = check()) != LM_STAT_DONE)
        return status;

if (i_procp != lmi_pp)
        return LM_STAT_NOTOWNER; /* Must be owner of lock */

/* We have validated the arguments thoroughly and the lock state */
    /* sufficiently.  It now feels best to transfer to the resource */
    /* class to work on the conversion itself, and open ourselves up */
    /* as friends of the resource class.  Maybe a cleaner solution */
    /* will reveal itself later, but right now it feels very clumsy */
    /* to keep locks and resources as unfriendly classes; they have */
    /* too much in common.  And the shared resource is clearly the */
    /* dominant class.  -rwells, 24-Sept-88. */ if (i_resp == NULL)        /* Paranoid check before usage */
        return LM_STAT_NULLPTR;

return i_resp->convert(this, locklevel, optionmask, lmop);

}   /* end lmi_lock::convert */
```

```
/*****************************************************************
lmi_lock::grant(): grant lock that has been in the request queue.

Assumes that owning resource is held simlocked by caller, and assumes
that the process object is simlocked by caller as well.  It gets
passed the various resource and process queue heads that it needs.
The simlocks keep our changes to the lock object status atomic with
regard to callbacks, which interlock only on the process object and
not on resource objects.  We always enqueue a completion callback for
this lock, even if LM_NOWAIT was not specified; the callback handler
will ignore a null function pointer, and the non-empty callback queue
will cause a return from lm_wait within a blocked conversion.
*****************************************************************/ lm_stat lmi_lock::grant(lmi_queuep granted_qp, int blocklevel,
                        lmi_queuep notify_qp, lmi_queuep callback_qp)
{
    register lm_stat status, tmpstat;

status = i_resq.remove();    /* Remove lock from the request queue */
                                 /*   and append it to the granted queue. */
    if ((tmpstat = granted_qp->append(&i_resq)) != LM_STAT_DONE)
        status = tmpstat;
/* Mark request as done, but pending completion processing. */
i_req_stat = LM_STAT_DONE;
i_level = i_req_level;    /* Set newly granted level code */

/* Deal with value options, if any */
if (i_req_opts & (LM_GETVALUE|LM_PUTVALUE|LM_NOVALUE|LM_DUBVALUE))
{
    tmpstat = i_resp->valoption((i_req_opts & (LM_GETVALUE|LM_PUTVALUE|
                                          LM_NOVALUE|LM_DUBVALUE)),
                                i_value);
    if (status == LM_STAT_DONE) /* tmpstat has several successful values */
        status = tmpstat;
} i_cur_cook = i_req_cook;    /* Install cookie for all callbacks */
i_end_stat = status;        /* Remember the grant status */

/* Install notify function, if any; cancel if none. */
/* Only worth installing if new level is not null. */
/* Process object is simlocked, so is ok to change notify state */
if ((i_req_opts & LM_NOTIFY) && i_level != LM_NL)
{
    i_cur_notp = i_req_notp;

/* Put it in the resource's notify queue if it isn't there */
    if (i_notifyq.isempty())
    {
        if ((tmpstat = notify_qp->append(&i_notifyq)) != LM_STAT_DONE)
            status = tmpstat;
    }

/* If we are blocking current requests, mark for notify callback. */
    if (blocklevel > LM_NL)
    {
        if ((tmpstat = notify(callback_qp, blocklevel)) != LM_STAT_DONE)
            status = tmpstat;
    }
}
else
{
    i_cur_notp = NULL;    /* Cancel current notify fctn, if any */

/* Remove it from the resource notify queue if it is there. */
    if (! i_notifyq.isempty())
    {
        if ((tmpstat = i_notifyq.remove()) != LM_STAT_DONE)
            status = tmpstat;
```

```
        }
    }

/* Make sure we are in the process callback queue. */ if (callback_qp == NULL) /* Make sure we got passed a queue head */
            return LM_STAT_NULLPTR; /* Should never happen. */

/* We could be in the callback queue already, due to pending */
        /* notify callback related to previously granted level; so we */
        /* check before putting ourselves in the queue. Note that the */
        /* callback queue entries are "owned" by the process object, and */
        /* thus the caller must have the process object simlocked */
        /* while we are doing this stuff. -rwells, 2-Oct-88 */ if (i_callq.isempty())
        {
            if ((tmpstat = callback_qp->append(&i_callq)) != LM_STAT_DONE)
                status = tmpstat;
        }

/* There are five successful status codes; we save the actual code */
        /* in the lock object for later return to client code, and we return */
        /* a simple LM_STAT_DONE for all successes. Error codes we both */
        /* save in the lock and return to our caller, since they reflect */
        /* serious failures. */ switch (status)
        {
        case LM_STAT_DONE:
        case LM_STAT_GOTVALUE:
        case LM_STAT_DUBVALUE:
        case LM_STAT_U64VALUE:
        case LM_STAT_NOVALUE:
            return LM_STAT_DONE;
        default:
            return status;
        }
    }   /* end lmi_lock::grant */

/************************************************************************
lmi_lock::notify(): arrange for lock's process to get notify callback.
Assumes that owning process is simlocked during duration of call.
************************************************************************/ lm_stat lmi_lock::notify(lmi_queuep callback_qp, lm_level reqlevel)
{
    if (callback_qp == NULL)  /* Make sure we got passed a queue head */
        return LM_STAT_NULLPTR; /* Should never happen. */ if (i_notify < reqlevel)   /* Mark as needing notify callback */
        i_notify = reqlevel;   /* and remember highest blocked level */

/* We could be in the callback queue already, due to pending */
    /* notify or completion callback; so we */
    /* check before putting ourselves in the queue. Note that the */
    /* callback queue entries are "owned" by the process object, and */
    /* thus the caller better have the process object simlocked */
    /* while we are doing this stuff. -rwells, 2-Oct-88 */ if (i_callq.isempty())
        return callback_qp->append(&i_callq);
    else
        return LM_STAT_DONE;
}                           /* end lmi_lock::notify */

/************************************************************************
lmi_lock::cancel(): cancel pending request for lock, if any.
************************************************************************/ lm_stat lmi_lock::cancel()
```

```
{
    register lm_stat status;

/* Make sure the lock object is valid and open. */
    if ((status = check()) != LM_STAT_DONE)
        return status;

if (i_procp != lmi_pp)
        return LM_STAT_NOTOWNER;   /* Must be owner of lock */ if (i_resp == NULL)            /* Paranoid check before usage */
        return LM_STAT_NULLPTR;

/* We transfer over to the resource object, since resource needs */
    /* to be simlocked, and it has friend access to our fields. */ return i_resp->cancel(this);

}   /* end lmi_lock::cancel */

/****************************************************************************
lmi_lock::nocallback(): cancel pending callbacks on lock, used in closing.
Assumes that owning process is simlocked during duration of call.
****************************************************************************/ lm_stat lmi_lock::nocallback()
{
    /* Remove marks associated with pending notification and completion */
    /* callbacks.  In the completion case, we don't bother to copy back */
    /* the value we got into the user buffer, since the user is closing */
    /* the lock and will never get a completion indication. */ i_notify = LM_NL;              /* Remove any pending notification mark... */ if (i_req_stat == LM_STAT_DONE) /* If completion callback is pending... */
        i_req_stat = LM_STAT_IDLE;  /* then cancel delivery of completion. */

/* Remove this lock from the process callout queue, if it is there. */
    /* Note that the callback queue entries are "owned" by the process */
    /* object, and thus the caller better have the process object simlocked */
    /* while we are doing this stuff. -rwells, 12-Feb-90 */ if (i_callq.isempty())
        return LM_STAT_DONE;
    else
        return i_callq.remove();

}   /* end lmi_lock::nocallback */

/****************************************************************************
lmi_lock::callend(): decide if completion callback is needed, and set it up.
This method is called by the process callbacks method, which actually
performs the callbacks.  We return a non-null completion function
pointer as our method value only if it needs to be called.  We
return the cookie value through an OUT argument pointer, and return
the completion status via another OUT argument.  When a value is being
returned for a completion, we copy the value into the user buffer
address provided to the convert call that started the conversion.

We leave the lock in the callback queue if we return NULL, or if there is also
a pending notification callback for the lock; otherwise we remove it from
the callback queue.

We reset the lock state to indicate that the completion callback has been made.
Assumes that our arguments are valid.
Assumes that the owning process object is locked so we get a
consistent snapshot.
Assumes that the executing thread is the owning process.
Assumes that lmi_np is valid.
****************************************************************************/
```

```
lm_endfunp lmi_lock::callend(/*OUT*/ lm_voidp *cookiep,
                             /*OUT*/ lm_stat *endstatp)
{
    lm_endfunp endfp;
    register lm_stat endstat;

/* If we are waiting to complete granting a conversion... */
    if (i_req_stat == LM_STAT_DONE)
    {
        /* We can go ahead and mark it idle since we are the owning thread */
        i_req_stat = LM_STAT_IDLE;  /* Mark it as idle */

*endstatp = endstat = i_end_stat;
        *cookiep = i_cur_cook;  /* Return cookie we were given */

/* If we have a value, copy back into user buffer, */
        /* before we do the callback. */
        if (endstat == LM_STAT_GOTVALUE || endstat == LM_STAT_DUBVALUE ||
            endstat == LM_STAT_U64VALUE)
            bcopy((char *) i_value, (char *) i_end_valp,
                  lmi_np->valuelen());

endfp = i_req_endp;
    }
    else
        endfp = NULL;           /* No completion callback needed */

/* If we need completion callback and have a function, and there is */
    /* no notification pending, remove the lock from the callback queue. */ if (endfp != NULL && i_notify == LM_NL)
        (void) i_callq.remove();

return endfp;
}   /* end lmi_lock::callend */

/*************************************************************************
lmi_lock::callnot(): decide if notify callback is needed, and set it up.
This method is called by the process callbacks method, which actually
performs the callbacks.  We return a non-null notify function
pointer as our method value only if it needs to be called.  We
return the cookie value through an OUT argument pointer, and return the top
level that has notified this lock it is blocked via another OUT arg pointer.
Assumes that our arguments are valid.
Assumes that the owning process object is locked so we get a
consistent snapshot.
Assumes that the executing thread is the owning process.
Assumes that lmi_np is valid.
*************************************************************************/ lm_notfunp lmi_lock::callnot(/*OUT*/ lm_voidp *cookiep,
                             /*OUT*/ lm_level *toplevelp)
{
    lm_level toplevel;
    lm_notfunp notfp;

if ((toplevel = i_notify) > LM_NL)
    {
        /* The i_notify flag can be set again as soon as the process is */
        /* unlocked... */ i_notify = LM_NL;
        *toplevelp = toplevel;
        *cookiep = i_cur_cook;  /* Return the cookie we were given */
        notfp = i_cur_notp;
    }
    else
        notfp = NULL;           /* No notify callback needed */

/* If we need a notify and have a function, remove the lock from */
    /* the callback queue. */
```

```
        if (notfp != NULL)
            (void) i_callq.remove();

return notfp;
}       /* end lmi_lock::callnot */

/******************************************************************************
lmi_lock::u64_set(): Set unsigned 64 bit counter value.
******************************************************************************/ lm_stat lmi_lock::u64_set(lm_u64 *u64p)
{
    register lm_stat status;

if (u64p == NULL)
        return LM_STAT_NULLPTR;

/* Make sure the lock object is valid and open. */
    if ((status = check()) != LM_STAT_DONE)
        return status;

return i_resp->u64_set(u64p);

}       /* end lmi_lock::u64_set */

/******************************************************************************
lmi_lock::u64_get(): Get unsigned 64 bit counter value.
******************************************************************************/ lm_stat lmi_lock::u64_get(lm_u64 *u64p)
{
    register lm_stat status;

if (u64p == NULL)
        return LM_STAT_NULLPTR;

/* Make sure the lock object is valid and open. */
    if ((status = check()) != LM_STAT_DONE)
        return status;

return i_resp->u64_get(u64p);

}       /* end lmi_lock::u64_get */

/******************************************************************************
lmi_lock::u64_incget(): Increment and get unsigned 64 bit counter value.
******************************************************************************/ lm_stat lmi_lock::u64_incget(lm_u64 *u64p)
{
    register lm_stat status;

if (u64p == NULL)
        return LM_STAT_NULLPTR;

/* Make sure the lock object is valid and open. */
    if ((status = check()) != LM_STAT_DONE)
        return status;

return i_resp->u64_incget(u64p);

}       /* end lmi_lock::u64_incget */

/******************************************************************************
File:    lmi_res.cxx
Contents: Methods for resource class (lmi_res) in lock manager library.
System:  BBNACI Programming Environments.
Created: 13-Aug-1988
Author:  rwells
```

Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
********************************************************************/

```
/* $Header: lmi_res.cxx,v 1.16 90/03/05 10:30:44 rwells Exp $ */ include <lmi.hxx>

/* ----- static read-only data ----- */ static u_char s_blockage[LM_NUM_LEVELS] =
{
    LMI_NL_BLOCKAGE,
    LMI_CR_BLOCKAGE,
    LMI_CW_BLOCKAGE,
    LMI_PR_BLOCKAGE,
    LMI_PW_BLOCKAGE,
    LMI_EX_BLOCKAGE,
};

static u_char s_toplevel[LMI_SIZE_TOPLEVEL] =
{
    LM_NL, LM_CR, LM_CW, LM_CW,
    LM_PR, LM_PR, LM_PR, LM_PR,
    LM_PW, LM_PW, LM_PW, LM_PW,
    LM_PW, LM_PW, LM_PW, LM_PW,
    LM_EX, LM_EX, LM_EX, LM_EX,
    LM_EX, LM_EX, LM_EX, LM_EX,
    LM_EX, LM_EX, LM_EX, LM_EX,
    LM_EX, LM_EX, LM_EX, LM_EX,
};

/********************************************************************
lmi_res::stat(): return statistics on resource object.
********************************************************************/ lm_stat lmi_res::stat(size_t structsize, /*OUT*/ lm_stres *lsrp)
{
    register lm_stat    status, tmpstat;
    register lmi_lockp *lmilpp;
    register int        len, i;

if (structsize != sizeof(lm_stres))
        return LM_STAT_BADSIZE;
    if (lsrp == NULL)
        return LM_STAT_NULLPTR;

lsrp->nid = i_nid;          /* Set nid and dex even for free object */
    lsrp->dex = i_dex;          /* Bad objects too, but shouldn't kill us */ if ((status = check()) != LM_STAT_DONE)
        return status;
```

```
    status = i_sim.lock();        /* Lock resource against other callers */
    if (status != LM_STAT_DONE) /* Give up if lock fails. */
        return status;

/* ----- We have the lock; make sure we unlock it before returning ---- */ lsrp->valstat = i_valstat;
    lsrp->levmask = i_levmask;
    lsrp->reqmask = i_reqmask;
    lsrp->childcnt = i_childcnt;
    lsrp->parentp = (lm_resp) i_parentp;
    lsrp->lockcnt = i_lockcnt;

for (i = 0; i < LM_NUM_LEVELS; i++)
    {
        lsrp->gotcnts[i] = i_gotcnts[i];
        lsrp->reqcnts[i] = i_reqcnts[i];
    } len = i_namelen;
    lsrp->namelen = len;
    if (lsrp->name != NULL)
    {
        if (len > lsrp->namemaxlen)
            len = lsrp->namemaxlen;
        bcopy(i_name, lsrp->name, len);
    } len = lmi_np->valuelen();
    lsrp->vallen = len;
    if (lsrp->valp != NULL)
    {
        if (len > lsrp->valmaxlen)
            len = lsrp->valmaxlen;
        bcopy((char *) i_value, (char *) lsrp->valp, len);
    } lmilpp = (lmi_lockp *) (lsrp->gotlpp);
    status = i_granted.stat_res_locks(lsrp->gotmaxcnt, lmilpp,
                                      &(lsrp->gotcnt));

lmilpp = (lmi_lockp *) (lsrp->reqlpp);
    if (status == LM_STAT_DONE)
        status = i_requested.stat_res_locks(lsrp->reqmaxcnt, lmilpp,
                                            &(lsrp->reqcnt));
    lmilpp = (lmi_lockp *) (lsrp->notlpp);
    if (status == LM_STAT_DONE)
        status = i_notifyhead.stat_res_notifies(lsrp->notmaxcnt, lmilpp,
                                                &(lsrp->notcnt));

tmpstat = i_sim.unlock();     /* Unlock the resource */ return (status != LM_STAT_DONE) ? status : tmpstat;
}   /* end lmi_res::stat */

/************************************************************************
lmi_res::lookup(): return TRUE if parentp and name match resource object.

!!! IMPORTANT !!!
This routine assumes that both the supplied name and the scrutinized
name are "word aligned character strings". Its OK for the strings to
not be a multiple of 4 bytes long however. Violating the alignment
will generate a misaligned exception on the 88k. The user supplied
string will be realigned if neccessary in lm_open, the string in the
resource shall be aligned by careful definition of the resource.
*************************************************************************/ int lmi_res::lookup(lmi_resp parentp, char *name, int len)
{
    register unsigned   *a, *b;
```

```
    if (parentp != i_parentp || len != i_namelen)
        return FALSE;

a = (unsigned*) name;       /* First we'll work by words */
    b = (unsigned*) i_name;

for (; len > 3; len -= 4)
        if (*a++ != *b++) return FALSE;

/* Deal with what's left */
    switch (len)
    {
    case 0:             /* Nothing left */
        return TRUE;

case 1:
        if ( (*a ^ *b) & 0xff000000 ) return FALSE;
        return TRUE;

case 2:
        if ( (*a ^ *b) & 0xffff0000 ) return FALSE;
        return TRUE;

case 3:
        if ( (*a ^ *b) & 0xffffff00 ) return FALSE;
        return TRUE;
    }

}    /* end lmi_res::lookup */

/******************************************************************************
lmi_res::check(): check whether it is claims to be a valid resource object.
******************************************************************************/ lm_stat lmi_res::check()
{
    if (i_tid == LMI_RES)
        return LM_STAT_DONE;
    else if (i_tid == LMI_FREE)
        return LM_STAT_FREE;
    else
        return LM_STAT_BADOBJECT;
}    /* end lmi_res::check */

/******************************************************************************
lmi_res::lmi_res(): Construct new resource from the arguments given.
Assumes arguments are valid, and lmi_np is valid.
Assumes that caller has hash node locked for duration of this call; we do
hash operations here atomically with the resource installation that depend
on the node being locked.
******************************************************************************/ lmi_res::lmi_res(lmi_resp parentp, char *name, int len, lmi_nodep lmnp,
                int index, /*OUT*/ lmi_resp *lock_respp,
                /*INOUT*/ lmi_queue *lock_resqp, /*OUT*/ lm_stat *statp)

{
    lmi_resp arg_lmrp;
    register lm_stat status;

this = NULL;                /* Show we control allocation */ status = lmi_np->newres(lmnp->nid(), &arg_lmrp);
    if (status != LM_STAT_DONE)
    {
        *statp = status;
        return;
    }
    else
        this = arg_lmrp;        /* Use this register from here on. */
```

```
/* ----- Now initialize fields of resource object ----- */

/* i_sim starts out okay, and stays okay, so needs no re-initialization */
i_namelen = len;
bcopy(name, i_name, len);       /* Copy in the name */
i_valstat = LM_STAT_NOVALUE;    /* Start out with no value */

/* i_levmask, i_reqmask, i_lockcnt, i_gotcnts, i_reqcnts, */
/* and i_childcnt start zero, */
/* and return to zero when resource gets freed, so need no */
/* re-initializing. */ i_parentp = NULL;               /* i_parentp is handled more fully below */ if (i_granted.isnull())         /* Only init queue entries if is first time. */
{
    i_granted.init();
    i_requested.init();
    i_notifyhead.init();
    i_hashq.init();
}

/* i_value needs no initialization while i_valstat is NOVALUE */

/* ----- Now lock the resource before tying it into the world ---- */ status = i_sim.lock();          /* Lock resource against other callers */
if (status != LM_STAT_DONE)     /* Give up if lock fails. */
{
    this = NULL;
    *statp = status;            /* A resource with a failed simlock is */
    return;                     /*  better lost then returned to the pool. */
}

/* ----- We have the lock; make sure we unlock it before returning ---- */

/* Put initial lock into our granted queue. */
if ((status = i_granted.append(lock_resqp)) != LM_STAT_DONE)
{                               /* If append fails, try to cleanup... */
    (void) i_sim.unlock();      /* Unlock the resource. */
    (void) lmi_np->freeres(this); /* Free the resource */
    this = NULL;
    *statp = status;
    return;
}

/* Install resource in hash table where arguments indicate it should go. */
/* This code assumes that hash node is locked by caller; otherwise */
/* Not safe to be doing hash install or remove here. -rwells, 14-Sept-88 */ if ((status = lmnp->hashinstall(&i_hashq, index)) != LM_STAT_DONE)
{                               /* If install fails, try to cleanup... */
    (void) lock_resqp->remove(); /* Remove only lock from granted queue */
    (void) i_sim.unlock();      /* Unlock the resource. */
    (void) lmi_np->freeres(this); /* Free the resource */
    this = NULL;
    *statp = status;
    return;
}

/* If we have a parent, we need to lock it and update its child count */
/* and our parent pointer.  We depend on the parent lock passed to */
/* the lock open keeping the parent resource open for the duration */
/* of this call. */

/* DEADLOCK AVOIDANCE: We lock the child resource, then the parent */
/* resource.  If you find ourself wanting to lock a parent resource, */
/* and then a potential child resource of that parent, DON'T DO IT. */
/* Its not good for you.  -rwells, 14-Sept-88. */
```

```
    if (parentp != NULL)
    {
        if ((status = parentp->addchild()) != LM_STAT_DONE)
        {
            (void) lmnp->hashremove(&i_hashq, index); /* Remove hash */
            (void) lock_resqp->remove();   /* Remove lock from granted queue */
            (void) i_sim.unlock();         /* Unlock the resource. */
            (void) lmi_np->freeres(this);  /* Free the resource */
            this = NULL;
            *statp = status;
            return;
        }
        else                    /* If it all succeeds, fix to point */
            i_parentp = parentp; /* to the parent! */
    }                           /* end if parentp non-null */

*lock_respp = this;        /* Fix lock to point to its resource */
    i_lockcnt = 1;             /* We have one lock for starters */
    i_gotcnts[LM_NL] = 1;      /* We have one null lock for starters */

/* ----- Unlock the resource ----- */

/* If simunlock fails, recovery seems a dim hope... just return status */

*statp = i_sim.unlock();   /* Unlock the resource */

}   /* end lmi_res::lmi_res */

/******************************************************************************
lmi_res::dellock(): remove lock from resource, freeing resource if needed.
Assumes arguments are valid, and lmi_np is valid.
Assumes that caller has hash node locked for duration of this call; we do
hash operations here atomically with the resource installation that depend
on the node being locked.  A more complex scheme might add an argument flag
that tells us if the node is locked; then if node operations are needed we
would do nothing except unlock the resource again, and return a status
indicating that the node had to be locked before trying again.  If no node
operations were needed, we would have saved the cost of the node lock and
unlock; if they are needed we pay an extra lock and unlock on the resource.
It all depends on the probability that the node will need to be changed.
I am saving that more complex scheme for later, if ever. -rwells, 14-sept-88.
******************************************************************************/ lm_stat lmi_res::dellock(lmi_nodep lmnp, int index,
                        /*INOUT*/ lmi_resp *lock_respp,
                        /*INOUT*/ lmi_queue *lock_resqp,
                        /*OUT*/   lmi_resp *parentpp)

register lm_stat status, tmpstat;

*parentpp = NULL;          /* Make sure parent pointer is set */
/* ----- First lock the resource ---- */ if ((status = i_sim.lock()) != LM_STAT_DONE)
    return status;

/* ----- We have the lock; make sure we unlock it before returning ---- */ status = lock_resqp->remove(); /* Remove lock from granted queue */
*lock_respp = NULL;            * Null lock's resource pointer */
i_lockcnt--;                   /* Decrement total lock count */
i_gotcnts[LM_NL]--;            /* Decrement the granted null lock count. */

/* If there are no open locks and no children, */
/* it is time to close this resource. */ if (i_lockcnt <= 0 && i_childcnt <= 0)
{
    /* If there is a parent resource, pass back its pointer */
    /* so its child count can get decremented later.  We can't do it */
    /* here without getting too many things locked and risking deadlock. */
```

```
        *parentpp = i_parentp;

/* Remove resource from the hash node table indicated by the */
        /* arguments.  We depend on the caller to have the hash node */
        /* locked during the course of this call.  -rwells, 18-Sept-88 */ if ((tmpstat = lmnp->hashremove(&i_hashq, index)) != LM_STAT_DONE)
            status = tmpstat;

/* Unlock the resource before we free it. */
        if ((tmpstat = i_sim.unlock()) != LM_STAT_DONE)
            status = tmpstat;

/* Free resource block back to its node. */
        if ((tmpstat = lmi_np->freeres(this)) != LM_STAT_DONE)
            status = tmpstat;

}   /* end if the resource got closed. */ else                            /* Resource stays open. */
    {
        /* Unlock the resource before we return. */
        if ((tmpstat = i_sim.unlock()) != LM_STAT_DONE)
            status = tmpstat;
    } return status;

}   /* end lmi_res::dellock */

/******************************************************************************
lmi_res::addlock(): Add a new null lock to an existing resource.
******************************************************************************/ lm_stat lmi_res::addlock(/*OUT*/ lmi_resp *lock_respp,
                         /*INOUT*/ lmi_queue *lock_resqp)
{
    register lm_stat status;

/* ----- Now lock the resource against other callers ---- */ if ((status = i_sim.lock()) != LM_STAT_DONE)
        return status;              /* Just give up if lock fails */

/* ----- We have the lock; make sure we unlock it before returning ---- */ if (i_lockcnt >= LM_MAX_LOCKS_PER_RESOURCE)
    {
        (void) i_sim.unlock();
        return LM_STAT_MAXOLOCKS;
    }

/* Put new null lock into our granted queue. */
    if ((status = i_granted.append(lock_resqp)) != LM_STAT_DONE)
    {                               /* If append fails, try to cleanup */
        (void) i_sim.unlock();      /* Unlock the resource. */
        return status;
    }

*lock_respp = this;         /* Fix lock to point to its resource */
    i_lockcnt++;                /* We have another open lock */
    i_gotcnts[LM_NL]++;         /* We have another null lock */

/* ----- Unlock the resource ----- */

/* If simunlock fails, recovery seems a dim hope... just return status */
    return i_sim.unlock();      /* Unlock the resource */

}   /* end lmi_res::addlock */
```

```
/************************************************************************
lmi_res::addchild(): Increment child counter for parent resource.
Most of the work is locking and unlocking the resource.
************************************************************************/ lm_stat lmi_res::addchild()
{
    register lm_stat status;

/* Lock the resource against other callers */
    if ((status = i_sim.lock()) != LM_STAT_DONE)
        return status;          /* Just return if fail to lock resource */ i_childcnt++;               /* Atomically increment child cnt */

/* Only a logic error here could cause an unlock error, so we don't */
    /* try too hard to do recovery. */ return i_sim.unlock();
}   /* end lmi_res::addchild */

/************************************************************************
lmi_res::delchild(): Decrement child counter, and close resource if its time.
Assumes argument is valid.  Assumes that parent pointer has been initialized
to null by caller, so we don't have to initialized it here.
Assumes that the hash node for the resource is locked.
************************************************************************/ lm_stat lmi_res::delchild(lmi_nodep lmnp, int index, /*OUT*/ lmi_resp *parentpp)
{
    register lm_stat status, tmpstat;

/* Lock the resource against other callers */
    if ((status = i_sim.lock()) != LM_STAT_DONE)
        return status;          /* Just return if fail to lock resource */ i_childcnt--;               /* Atomically decrement child cnt */

/* If there are no open locks and no children, */
    /* it is time to close this resource. */ if (i_lockcnt <= 0 && i_childcnt <= 0)
    {

/* If there is a parent resource, pass back its pointer */
    /* so its child count can get decremented later.  We can't do it */
    /* here without getting too many things locked and risking deadlock. */

*parentpp = i_parentp;

/* Remove resource from the hash node table indicated by the */
    /* arguments.  We depend on the caller to have the hash node */
    /* locked during the course of this call.  -rwells, 18-Sept-88 */ if ((tmpstat = lmnp->hashremove(&i_hashq, index)) != LM_STAT_DONE)
            status = tmpstat;

/* Unlock the resource before we free it. */
        if ((tmpstat = i_sim.unlock()) != LM_STAT_DONE)
            status = tmpstat;

/* Free resource block back to its node. */
        if ((tmpstat = lmi_np->freeres(this)) != LM_STAT_DONE)
            status = tmpstat;

}   /* end if the resource got closed. */ else                        /* Resource stays open. */
    {
    /* Unlock the resource before we return. */
        if ((tmpstat = i_sim.unlock()) != LM_STAT_DONE)
            status = tmpstat;
```

} return status;

}   /* end lmi_res::delchild */

/*****************************************************************************
lmi_res::convert(): handle level convert with both resource and lock in hand.
This function and its menions take advantage of friend access to the lmi_lock
class to directly manipulate both this resource and its lock objects.
Assumes that the arguments have been validated.
*****************************************************************************/

```c
lm_stat lmi_res::convert(register lmi_lockp lmlp, register lm_level newlevel,
                         register int optionmask, register lm_optionp lmop)
{
    register lm_stat status, tmpstat;
    register int oldlevel;
    register int timeout, blockmask;

/* This static table gives request mask bits that are unblocked */
    /* by the given transition, indexed by [oldlevel][newlevel]. */
    /* It is used to decide whether it is worth going through the */
    /* request queue. */ static char s_tranmask[LM_NUM_LEVELS][LM_NUM_LEVELS] =
    {
    /* NL->XX ==> nothing */
    /*  NL,    CR,    CW,    PR,    PW,    EX  */
    {  0x00,  0x00,  0x00,  0x00,  0x00,  0x00 }, /* NL */
    /* CR->NL ==> EX */
    {  0x10,  0x00,  0x00,  0x00,  0x00,  0x00 }, /* CR */
    /* CW->NL ==> EX,PW,PR;  CW->CR ==> PW,PR;  CW->PR ==> PR. */
    {  0x1c,  0x0c,  0x00,  0x04,  0x00,  0x00 }, /* CW */
    /* PR->NL ==> EX,PW,CW;  PR->CR ==> PW,CW;  PR->CW ==> CW. */
    {  0x1a,  0x0a,  0x02,  0x00,  0x00,  0x00 }, /* PR */
    /* PW->NL ==> EX,PW,PR,CW;  PW->CR ==> PW,PR,CW;  */
    /* PW->CW ==> CW;  PW->PR ==> PR. */
    {  0x1e,  0x0e,  0x02,  0x04,  0x00,  0x00 }, /* PW */
    /* EX->NL ==> EX,PW,PR,CW,CR;  EX->CR ==> PW,PR,CW,CR;  */
    /* EX->CW ==> CW,CR;  EX->PR ==> PR,CR;  EX->PW ==> CR. */
    {  0x1f,  0x0f,  0x03,  0x05,  0x01,  0x00 }, /* EX */
    };

status = LM_STAT_DONE;    /* To make it clear it gets set. */

/* Lock the resource against other callers */
    if ((status = i_sim.lock()) != LM_STAT_DONE)
        return status;        /* Just return if fail to lock resource */

/* The fields of both the resource and all its lock objects are */
    /* guarded by the simlock on the resource object. */

/* ----- The resource is locked; must unlock before return. ----- */

/* Make sure the target lock object is idle */
    if (lmlp->i_req_stat != LM_STAT_IDLE)
    {
        (void) i_sim.unlock();  /* Make sure we unlock the resource */
        return LM_STAT_BUSY;
    }

/* See if the new level is blocked by any of the granted levels; */
    /* ignore the old lock level if it is the only lock at that level, */
    /* since the current level should not block conversion to a new level. */ oldlevel = lmlp->i_level;
    if (s_blockage[newlevel] & ((i_gotcnts[oldlevel] == 1) ?
                                (i_levmask & ~LMI_LEVBIT(oldlevel)) :
                                (i_levmask)))
```

```
{                       /* then we are blocked. */
    if (optionmask & LM_NOQUEUE)
    {
        /* Unlock the resource */
        if ((tmpstat = i_sim.unlock()) != LM_STAT_DONE)
            return tmpstat;
        else
            return LM_STAT_NOTQUEUED; /* Blocked NOQUEUE */
    }
    else
    {
        /* Let a friend handle the enqueueing. */
        status = enqueue(lmlp, newlevel, optionmask, lmop);

/* Unlock the resource */
        if ((tmpstat = i_sim.unlock()) != LM_STAT_DONE)
            return tmpstat;
        if (status != LM_STAT_DONE)
            return status;

if (optionmask & LM_NOWAIT)
            return LM_STAT_QUEUED;

/* Get timeout if any was given; 0 means no timeout */
        timeout = (optionmask & LM_TIMEOUT) ? lmop->timeout : 0;

/* Keep waiting until conversion finishes, timeout expires, */
        /* or we get interrupted (and we said to pay attention). */ while (lmlp->i_req_stat == LM_STAT_QUEUED)
        {
            /* Wait for something to happen. */
            status = lmlp->i_procp->wait(timeout);

/* If our process got one or more callbacks, or we got */
            /* posted, or if we got signaled but don't care, circle */
            /* around and see if this conversion is still queued. */ switch (status)
            {
            case LM_STAT_DONE:      /* Always circle back */
            case LM_STAT_POSTED:
                continue;

case LM_STAT_SIGNAL:    /* We got a signal */
                if (optionmask & LM_INTERRUPT)
                {
                    break;          /* We care about signals */
                }
                else
                    continue;       /* We don't care about signals */ default:                /* Something bad happened */
                break;
            }

/* Otherwise, it appears that something bad happened; */
            /* we might have timed out, or received a signal and */
            /* wanted to be interrupted, or had a internal failure. */
            /* Cancel the conversion and return. */ if ((tmpstat = lmlp->cancel()) == LM_STAT_DONE)
                return status;
            /* If the conversion had completed already, return its */
            /* completion status and forget about the timeout/signal.*/
            else if (tmpstat == LM_STAT_IDLE)
                return lmlp->i_end_stat;
            /* If the cancel blew up, return its error status */
            else
                return tmpstat;
}                       /* end while our conversion is queued */
```

```
            /* If we get here, the lock isn't queued anymore. */
            /* By construction, i_req_stat must be LM_STAT_IDLE, */
            /* LM_STAT_QUEUED, or LM_STAT_DONE; it is done when the */
            /* conversion has been granted but the callback hasn't */
            /* been called yet. We can ignore the distinction between */
            /* LM_STAT_DONE and LM_STAT_IDLE, as the completion callback */
            /* will get done in lm_convert on the way out if it hasn't been */
            /* done already.  -rwells, 24-Dec-88. */

/* Return the completion status of the conversion. */
            return lmlp->i_end_stat;
        }                       /* end else we can be queued */
    }                           /* end if we are blocked */ else                        /* else we aren't blocked. */
    {
        /* We are in the granted queue already, but we need to */
        /* change our level. If our level change vacates a level, */
        /* we may unblock queued requests. */ if (oldlevel != newlevel)
        {
            if (--i_gotcnts[oldlevel] == 0)
                i_levmask &= ~LMI_LEVBIT(oldlevel);
            if (i_gotcnts[newlevel]++ == 0)
                i_levmask |= LMI_LEVBIT(newlevel);

lmlp->i_level = newlevel;
        }

/* Deal with value options, if any */
        if (optionmask & (LM_GETVALUE|LM_PUTVALUE|LM_NOVALUE|LM_DUBVALUE))
            status = valoption((optionmask & (LM_GETVALUE|LM_PUTVALUE|

LM_NOVALUE|LM_DUBVALUE)),
                        ((lmop != NULL) ? lmop->lockvalp : NULL));
    else
        status = LM_STAT_DONE;

/* Install notify function, if any. */
/* Since WE are the owning process, and we are obviously not */
/* in the middle of doing a callback, we do not have to simlock */
/* our process block. Furthermore, another process cannot be */
/* in the middle of granting a queued request on this lock */
/* since we are in the middle of granting an immediate request. */
/* -rwells, 2-Oct-88 */

/* Notifying only makes sense for levels that can block other */
/* levels, and it is convenient to keep the null level free */
/* of notify functions and queues. */ if ((optionmask & LM_NOTIFY) && newlevel != LM_NL)
{
    lmlp->i_cur_notp = lmop->notify_fp;
    lmlp->i_cur_cook = lmop->cookie;

/* Put it in the resource's notify queue if it isn't there */
    if (lmlp->i_notifyq.isempty())
    {
        tmpstat = i_notifyhead.append(&(lmlp->i_notifyq));
        if (tmpstat != LM_STAT_DONE)
            status = tmpstat;
    }

/* See if new request blocks a remaining request; */
    /* If so, queue a notify callback; do it via the owning */
    /* proc object, as it has to be locked to change callback */
    /* stuff. */ if ((blockmask = (s_blockage[newlevel] & i_reqmask)) != 0)
    {
```

```
            tmpstat = lmlp->i_procp->notify_lock(lmlp,
                                                 s_toplevel[blockmask]);
            if (tmpstat != LM_STAT_DONE)
                status = tmpstat;
        }

}
    else
    {
        lmlp->i_cur_notp = NULL; /* Cancel current notify fctn, if any */
        /* Don't need to null the cookie if notify fctn is null. */

/* Remove it from the resource notify queue if it is there. */
        if (! lmlp->i_notifyq.isempty())
        {
            if ((tmpstat = lmlp->i_notifyq.remove()) != LM_STAT_DONE)
                status = tmpstat;
        }
    }

/* If the transition could have enabled any of the queued */
    /* requests, go grind through the request queue. */ if (oldlevel != newlevel &&
        ((s_tranmask[oldlevel][newlevel]) & i_reqmask) != 0)
    {
        if ((tmpstat = grant_requests()) != LM_STAT_DONE)
            status = tmpstat;
    }

} /* end else we weren't blocked */

/* Unlock the resource before we return. */
    if ((tmpstat = i_sim.unlock()) != LM_STAT_DONE)
        status = tmpstat;

return status;

}   /* end lmi_res::convert */

/******************************************************************************
lmi_res::valoption(): Private method to handle value option at grant time.
We are given a pointer to the lock value buffer, generally in the user
process but perhaps in the lock object for a queued request that is being
granted after a delay.
Assumes arguments have been validated.
Assumes caller has resource locked for the duration of this call.
The status return should reflect the status that the convert should return
regarding a successful LM_GETVALUE or other operation, or an error status
if an error occurs.
******************************************************************************/ lm_stat lmi_res::valoption(int option, lm_voidp uservalp)
{
    register lm_stat status;

switch (option)
    {
    case LM_NOVALUE:
        i_valstat = LM_STAT_NOVALUE;
        return LM_STAT_DONE;

case LM_DUBVALUE:
        if (i_valstat == LM_STAT_GOTVALUE)
            i_valstat = LM_STAT_DUBVALUE;
        return LM_STAT_DONE;

case LM_PUTVALUE:
        bcopy((char *) uservalp, (char *) i_value, lmi_np->valuelen());
        i_valstat = LM_STAT_GOTVALUE;
        return LM_STAT_DONE;
```

```
    case LM_GETVALUE:
        status = i_valstat;
        if (status == LM_STAT_GOTVALUE | status == LM_STAT_DUBVALUE ||
            status == LM_STAT_U64VALUE)
            bcopy((char *) i_value, (char *) uservalp, lmi_np->valuelen());
        return status default:
        return LM_STAT_BADOPTION; /* Should never happen. */
    }
}   /* end lmi_res::valoption */

/************************************************************************
lmi_res::enqueue(): Private method to enqueue blocked request.
Assumes arguments have been validated.
Assumes caller has resource locked for the duration of this call.
Returns LM_STAT_DONE if successful.
Checks LM_EXPRESS option to see if express service is desired.
************************************************************************/ lm_stat lmi_res::enqueue(lmi_lockp lmlp, lm_level locklevel,
                         int optionmask, lm_optionp lmop)
{
    register lm_stat status, tmpstat;

/* Put lock into request queue, at front or back as specified. */
    if (optionmask & LM_EXPRESS)
        tmpstat = i_requested.prepend(&(lmlp->i_resq));
    else
        tmpstat = i_requested.append(&(lmlp->i_resq));

if (tmpstat != LM_STAT_DONE)
        status = tmpstat;

lmlp->i_req_stat = LM_STAT_QUEUED; /* Mark request as enqueued */
    lmlp->i_end_stat = LM_STAT_QUEUED; /* For cleanliness */
    lmlp->i_req_level = locklevel; /* Remember request level */
    lmlp->i_req_opts = optionmask; /* Remember options */
    if (lmop != NULL)
    {
        lmlp->i_req_endp = ((optionmask & LM_NOWAIT) ? lmop->nowait_fp : NULL);
        lmlp->i_req_notp = ((optionmask & LM_NOTIFY) ? lmop->notify_fp : NULL);
        lmlp->i_req_cook = ((optionmask & (LM_NOWAIT|LM_NOTIFY)) ?
                            lmop->cookie : NULL);

/* If we want to put a value, copy the value into the lock object */
        /* so it will be available when the lock is granted. If we want */
        /* to get a value, save the address of the user value buffer so */
        /* we will know where to copy it back to when the time comes. */ if (optionmask & LM_PUTVALUE)
            bcopy((char *) lmop->lockvalp, (char *) lmlp->i_value,
                  lmi_np->valuelen());
        else if (optionmask & LM_GETVALUE)
            lmlp->i_end_valp = (int *) lmop->lockvalp;
    } if (i_reqcnts[locklevel]++ == 0) /* Bump request level count */
        i_reqmask |= LMI_LEVBIT(locklevel); /* Set mask bit if transitioning */

/* Notify any lock owners that are in the notify queue and are */
    /* blocking this request, but don't notify this lock even if it */
    /* appears to be blocking itself, since locks never really block */
    /* themselves from converting... As a small optimization, we only */
    /* do the call if the notify queue is not empty. -rwells, 17-Oct-88 */ if (! i_notifyhead.isempty())
    {
        if ((tmpstat = notify_all(lmlp, locklevel)) != LM_STAT_DONE)
            status = tmpstat;
    }
```

```
    return status;
}   /* end lmi_res::enqueue */

/******************************************************************************
lmi_res::notify_all(): notify all lock owners blocking given lock request.
Only locks in the notify queue of the resource are examined.
Assumes arguments are valid.
Assumes resource object is simlocked for the duration of the call.
Assumes the owning process objects are not simlocked when call begins.
******************************************************************************/ lm_stat lmi_res::notify_all(lmi_lockp reqlp, lm_level reqlevel)
{
    register lm_stat status, tmpstat;
    register lmi_queuep headqp, lmqp;
    register lmi_lockp lmlp;
    register int reqbit;

status = LM_STAT_DONE;
    reqbit = LMI_LEVBIT(reqlevel);

headqp = &i_notifyhead;
    for (lmqp = headqp->next(); lmqp != headqp; lmqp = lmqp->next())
    {
        lmlp = lmqp->res_notify(); /* Get lock handle for notify queue entry */ if (lmlp == reqlp)     /* Don't notify the lock that is blocked, */
            continue;          /*    it can't really block itself. */

/* If the level of this lock blocks the requested level, */
        /* notify the lock's process about the blockage as requested. */ if (s_blockage[lmlp->i_level] & reqbit)
        {
            if ((tmpstat = lmlp->i_procp->notify_lock(lmlp, reqlevel))
                != LM_STAT_DONE)
                status = tmpstat;
        }
    } return status;
}   /* end lmi_res::notify_all */

/******************************************************************************
lmi_res::grant_requests(): grant as many requests as can make the jump.
Assumes caller is holding the resource simlocked for the duration.
The status return strategy is to keep on going through the request queue,
and remember any error status we get back on any individual grant, and return
the last error we get, if any.
******************************************************************************/ lm_stat lmi_res::grant_requests()
{
    register lm_stat status, tmpstat;
    register int levmask;
    register lmi_queuep headqp, lmqp, nextqp;
    register lmi_lockp lmlp;
    register int oldlevel, newlevel;
    register int cnt;
    register int again;
    register int blockmask, blocklevel;

status = LM_STAT_DONE;

levmask = i_levmask;

/* There is a very special situation in which granting a request */
    /* can unblock prior requests, so we are prepared to do a second */
    /* pass through the requests as needed.  It could happen like this. */
    /* There are two PR locks granted, and a number of NL and/or CR locks */
    /* waiting to convert to CW level.  One of the two PR locks now gets */
```

```
/* queued to convert to CW level, but is blocked by the other PR.  Now */
/* the other PR converts to NL or CR level. The pending conversions */
/* from NL and/or CR to CW are still blocked by the remaining PR lock. */
/* But the remaining PR lock can now convert to CW, and subsequently */
/* all the NL and/or CR locks are free to convert to CW level.  The */
/* same scenario applies to two locks at CW level, with low level locks */
/* waiting to convert to PR level.  This trick can only be played once */
/* per original grant, so we can limit ourselves to just two passes, */
/* avoiding any chance of infinite looping due to currupt flags... */
/* -rwells, 2-Oct-88 */ again = TRUE;              /* We will set it false inside */
for (cnt = 2; cnt > 0 && again; cnt--)
{
    again = FALSE;         /* We can override it later for second pass */

/* Run through all the entries in the request queue. */ headqp = &i_requested;
    for (lmqp = headqp->next(); lmqp != headqp; lmqp = nextqp)
    {
        nextqp = lmqp->next(); /* Get next early, as may dequeue current */ lmlp = lmqp->res_lock(); /* Get lock handle for queue entry */
        oldlevel = lmlp->i_level;
        newlevel = lmlp->i_req_level;

if (! (s_blockage[newlevel] &
               (i_gotcnts[oldlevel] == 1 ?
                (levmask & ~LMI_LEVBIT(oldlevel)) : (levmask))))
        {
            if (--i_gotcnts[oldlevel] == 0) /* Drop old level count */
                i_levmask = levmask &= ~LMI_LEVBIT(oldlevel);
            if (--i_reqcnts[newlevel] == 0) /* Drop request level count */
                i_reqmask &= ~LMI_LEVBIT(newlevel);
            if (i_gotcnts[newlevel]++ == 0) /* Bump new level count */
                i_levmask = levmask |= LMI_LEVBIT(lmlp->i_req_level);

/* Handle the lock part of granting the conversion. */

/* Pass the grant through its process so the process object */
            /* can be simlocked while information used by callbacks */
            /* and completions is updated. */

/* DEADLOCK AVOIDANCE: If you have process object simlocked, */
            /* don't even think about simlocking a resource object.  Its */
            /* not good for you.  Right here we have a resource object */
            /* simlocked and some of the time we simlock the process of */
            /* one of its locks, so you can't go the other way. */
            /* -rwells, 2-Oct-88 */

/* See if new request blocks remaining request(s), and */
            /* pass on the highest level blocked. -rwells, 28-Feb-90 */
            blockmask = (s_blockage[newlevel] & i_reqmask);
            blocklevel = s_toplevel[blockmask];

tmpstat = lmlp->i_procp->grant_lock(lmlp, &i_granted,
                                          blocklevel, &i_notifyhead);
            if (tmpstat != LM_STAT_DONE)
                status = tmpstat;

/* If we transition from CW->PR or PR->CW, there may be */
            /* requests that were blocked before but are now unblocked, */
            /* so in this rare case we go around for a second pass. */
            /* In fact, we quit working on our current pass, and do */
            /* a complete second pass, saving duplicate scanning of */
            /* the rest of the queue if they are not going to convert. */
            if ((oldlevel == LM_CW && newlevel == LM_PR) ||
                (oldlevel == LM_PR && newlevel == LM_CW))
            {
```

```
                        again = TRUE;
                        break;       /* out of requests in queue, to next pass */
                    }
                }                    /* end if request is grantable */
            }                        /* end for all requests in queue. */
        }                            /* end for two passes */ return status;

}   /* end lmi_res::grant_requests */

/**************************************************************************
lmi_res::cancel(): cancel pending request on given argument.
Assumes lock and resource are minimally valid.
**************************************************************************/
lm_stat lmi_res::cancel(lmi_lockp lmlp)
{
    register lm_stat status, tmpstat;
    register int reqlevel;

/* Lock the resource against other callers */
    if ((status = i_sim.lock()) != LM_STAT_DONE)
        return status;          /* Just return if fail to lock resource */

/* The fields of both the resource and all its lock objects are */
    /* guarded by the simlock on the resource object. */

/* ----- The resource is locked; must unlock before return. ----- */

/* Make sure the target lock object is queued */
    if (lmlp->i_req_stat != LM_STAT_QUEUED)
    {
        (void) i_sim.unlock();   /* Make sure we unlock the resource */
        return LM_STAT_IDLE;
    } status = lmlp->i_resq.remove(); /* Remove lock from request queue */

/* Put lock back into granted queue */
    if ((tmpstat = i_granted.append(&(lmlp->i_resq))) != LM_STAT_DONE)
        status = tmpstat;

lmlp->i_req_stat = LM_STAT_IDLE; /* Mark lock as ready for new request */
    lmlp->i_end_stat = LM_STAT_CANCELLED; /* Mark completion status. */ reqlevel = lmlp->i_req_level;
    if (--i_reqcnts[reqlevel] == 0) /* Drop request level count */
        i_reqmask &= ~LMI_LEVBIT(reqlevel); /* Clr mask bit if transition */

/* Unlock the resource before we return. */
    if ((tmpstat = i_sim.unlock()) != LM_STAT_DONE)
        status = tmpstat;

return status;

}   /* end lmi_res::cancel */

/**************************************************************************
lmi_res::u64_set(): Set unsigned 64 bit counter value.
**************************************************************************/ lm_stat lmi_res::u64_set(lm_u64 *u64p)
{
    register lm_stat status;
    register lm_u64 *ru64p = (lm_u64 *) i_value;
    register unsigned int lo, hi;
    register int len = lmi_np->valuelen();

lo = u64p->lo;              /* Get caller value into registers */
    hi = u64p->hi;
```

```
    if (len < sizeof(lm_u64))    /* Make sure value field is big enough */
        return LM_STAT_BADSIZE;

/* Lock the resource against other callers */
    if ((status = i_sim.lock()) != LM_STAT_DONE)
        return status;          /* Just return if fail to lock resource */

/* Set value into resource and mark as holding U64VALUE */
    ru64p->lo = lo;
    ru64p->hi = hi;
    i_valstat = LM_STAT_U64VALUE;

/* Unlock the resource before we return. */
    return i_sim.unlock();

}   /* end lmi_res::u64_set */

/*****************************************************************************
lmi_res::u64_get(): Get unsigned 64 bit counter value.
*****************************************************************************/ lm_stat lmi_res::u64_get(/*OUT*/ lm_u64 *u64p)
{
    register lm_stat status, tmpstat;
    register lm_u64 *ru64p = (lm_u64 *) i_value;
    register unsigned int hi, lo;

/* If value field isn't big enough, lm_u64_set will have failed... */

/* Lock the resource against other callers */
    if ((status = i_sim.lock()) != LM_STAT_DONE)
        return status;          /* Just return if fail to lock resource */ status = i_valstat;
    lo = ru64p->lo;
    hi = ru64p->hi;

/* Unlock the resource before we return. */
    if ((tmpstat = i_sim.unlock()) != LM_STAT_DONE)
        return tmpstat;

/* Store value into caller buffer, don't need resource lock */
    if (status == LM_STAT_U64VALUE)
    {
        u64p->lo = lo;
        u64p->hi = hi;
    } return status;
}   /* end lmi_res::u64_get */

/*****************************************************************************
lmi_res::u64_incget(): Increment and get an unsigned 64 bit counter value.
*****************************************************************************/ lm_stat lmi_res::u64_incget(/*OUT*/ lm_u64 *u64p)
{
    register lm_stat status, tmpstat;
    register lm_u64 *ru64p = (lm_u64 *) i_value;
    register unsigned int hi, lo;

hi = lo = 0;                /* Initialize to keep C++ happy */

/* If value field isn't big enough, lm_u64_set will have failed... */

/* Lock the resource against other callers */
    if ((status = i_sim.lock()) != LM_STAT_DONE)
        return status;          /* Just return if fail to lock resource */ status = i_valstat;
    if (status == LM_STAT_U64VALUE)
```

```
{
    lo = ru64p->lo;
    hi = ru64p->hi;

/* Increment the lo half; if it wraps, increment the hi half; */
    /* if the hi half wraps too, we report an error status and leave */
    /* the values in the resouce and caller's buffer unchanged. */
    /* If it doesn't wrap the hi half, store back into resource */
    /* and into caller's buffer. */ if (++lo != 0)
        ru64p->lo = lo;
    else if (++hi != 0)
    {
        ru64p->lo = lo;
        ru64p->hi = hi;
    }
    else
        status = LM_STAT_U64MAX;
}

/* Unlock the resource before we return. */
if ((tmpstat = i_sim.unlock()) != LM_STAT_DONE)
    return tmpstat;

if (status == LM_STAT_U64VALUE)
{
    u64p->lo = lo;       /* Store bumped value into caller buffer */
    u64p->hi = hi;       /* Don't need to keep resource locked here */
} return status;
}   /* end lmi_res::u64_incget */

/**************************************************************************
File:     lmi_proc.cxx
Contents: Methods for process context (lmi_proc) class.
System:   BBNACI Programming Environments.
Created:  16-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
**************************************************************************/

/* $Header: lmi_proc.cxx,v 1.17 90/03/01 16:04:57 rwells Exp $ */ include <lmi.hxx>

/* ----- static variables ----- */ static int s_keep_checking = 1;
```

```
/************************************************************************
lmi_proc::check(): check whether this is a valid proc object.
************************************************************************/ lm_stat lmi_proc::check()
{
    if (i_tid == LMI_PROC)
        return LM_STAT_DONE;
    else if (i_tid == LMI_FREE)
        return LM_STAT_FREE;
    else
        return LM_STAT_BADOBJECT;
}   /* end lmi_proc::check */

/************************************************************************
lmi_proc::lmi_proc(): Constructor with arguments.
Allocates new process object, initializes it, and returns it.
Returns status through argument, and returns failure status if
process object allocation doesn't succeed.
************************************************************************/ lmi_proc::lmi_proc(int pid, /*OUT*/ int **checkpp, /*OUT*/ lm_stat *statp)
{
    /* Assume lmi_np is not NULL when we are called. */ this = NULL;               /* To make it clear we control allocation */
    *checkpp = &s_keep_checking; /* In case stuff below fails */

/* Get it allocated, but not initialized or in lists */
    /* If there is no space in the proc pool, report it to the user */
    /* as "too many attaches".  -rwells & ksedgwick, 15-Feb-89 */

*statp = lmi_np->newproc(&this);
    if (*statp == LM_STAT_NOSPACE)
        *statp = LM_STAT_MAXPROC;
    if (*statp != LM_STAT_DONE)
        return;

/* Initialize it, and put it in node's list of processes. */
    *statp = init(pid, checkpp);

}   /* end lmi_proc::lmi_proc */

/************************************************************************
lmi_proc::init(): Initialize raw process object, and put on node's queue.
************************************************************************/ lm_stat lmi_proc::init(int pid, /*OUT*/ int **checkpp)
{
    i_pid = pid;
    i_waiting = 0;
    i_posted = 0;
    i_check = 0;

/* i_sim could be initialized here, but it will start out being */
    /* zero in our environment, which is a valid starting state, and */
    /* the operations will keep it in a valid state thereafter.  If */
    /* we don't re-initialize it, statistics on the simple locking will */
    /* continue to accumulate, which sounds better at the moment. */
    /* -rwells, BBNACI, 31-Aug-88 */ i_locks.init();
    i_calls.init();
    i_nodeq.init();

*checkpp = &i_check;       /* Make check ptr point to field */ return lmi_np->addproc(&i_nodeq); /* Pass queue entry to be added. */

}   /* end lmi_proc::init */
```

```
/************************************************************************
lmi_proc::destroy(): destroy this process object.

Close all its open locks, remove it from the node list, return it to
the pool, and reset the argument globals appropriately.
This version gives up pretty fast when it encounters errors.
*************************************************************************/ lm_stat lmi_proc::destroy(/*OUT*/ lmi_procp *lmppp, /*OUT*/ int **checkpp)
{
    register lm_stat status, tmpstat;
    register lmi_lockp  lmlp;
    lmi_queuep lmqp;

/* ----- Close all open locks. ----- */

/* Loop until there isn't another open lock to be closed. */
    while (TRUE)
    {
        /* Get the process object locked */
        if ((status = i_sim.lock()) != LM_STAT_DONE)
            return status;      /* Give up easy if simlock fails */

/* Remove and return next entry from process' lock queue */
        /* Here we just get a pointer to the first queue entry. */
        /* A previous version actually removed the lock from the */
        /* process ownership queue, and that was very bad news because */
        /* close would then get upset that the lock wasn't in the process */

/* ownership queue to be removed.  -rwells, 12-Feb-89 */ if (! i_locks.isempty())
        {                       /* If we got a live one, process it */
            lmqp = i_locks.next();
            lmlp = lmqp->proc_lock();

status = i_sim.unlock(); /* Get process unlocked */ tmpstat = lmlp->close();    /* Close the lock, and get status */
            if (status == LM_STAT_DONE)
                status = tmpstat;

if (status != LM_STAT_DONE)
                return status;
        } else
        {                       /* else if queue is empty, we are done */

/* At this moment, the process object is still locked and */
            /* there is nothing in the queue.  So we unlock the proc */
            /* object and break out of the loop.  -rwells, 8-Feb-89 */ if ((status = i_sim.unlock()) != LM_STAT_DONE)
                return status;
            break;
        }

}                           /* end while true... */

/* I assert that we do not need to lock the process object for these */
    /* shutting down operations.  The lock queues can only be changed by */
    /* our own process, or if our own process is terminated by another */
    /* process.  I will have to interlock the recoveries so only one */
    /* process is allowed to recover a given dead process, but there are */
    /* many ways to do that interlock.  Once all the locks are closed, no */
    /* additional callbacks can be posted for this process.  The removal */
    /* from the node queue is interlocked on the node object, so doesn't */
    /* need to be interlocked here.  Another process doing stat calls */
    /* on this process object will never see it in a badly inconsistent */
```

```
/* state; the worst that can happen is that the pid will still be */
/* set when it isn't in the node queue and isn't in the free list. */
/* The return to the free list is interlocked on its pool object. */
/* As soon as it is on the free list it may be grabbed for a new */
/* process, but we are all done at that point.  */
/* -rwells, BBNACI, 31-Aug-88 */

/* Double check that the lock queue is empty. */
    if (! i_locks.isempty())    /* At this point it can't have open locks, */
        return LM_STAT_QFAIL;   /* if we are its process. */

/* Double check that the callback queue is empty */
    if (! i_calls.isempty())    /* At this point it can't have a pending */
        return LM_STAT_QFAIL;   /* callback, if we are its process. */

/* Assumes arguments are non-NULL and valid */
    *lmppp   = NULL;              /* Set proc pointer to NULL */
    *checkpp = &s_keep_checking;  /* Set check pointer to constant 1 */

/* Pass queue entry to be removed. */
    if ((status = lmi_np->delproc(&i_nodeq)) != LM_STAT_DONE)
        return status;

i_pid = 0;                  /* Clear the pid entry to invalidate */

/* Return object to free list */ return lmi_np->freeproc(this);

}   /* end lmi_proc::destroy */

/************************************************************************
lmi_proc::stat(): return status information about process.
************************************************************************/ lm_stat lmi_proc::stat(size_t structsize, /*OUT*/ lm_stproc *lspp)
{
    register lm_stat    status, tmpstat;
    register lmi_lockp *lmilpp;

if (structsize != sizeof(lm_stproc))
        return LM_STAT_BADSIZE;

if (lspp == NULL)
        return LM_STAT_NULLPTR; /* Argument ptr cannot be NULL */ lspp->nid = i_nid;          /* Set nid and dex even for free object */
    lspp->dex = i_dex;          /* Bad objects too, but shouldn't kill us */ if ((status = check()) != LM_STAT_DONE)
        return status;

status = i_sim.lock();      /* Lock process object against other callers */
    if (status != LM_STAT_DONE) /* Give up if lock fails. */
        return status;

/* ----- We have the lock; make sure we unlock it before returning ---- */ lspp->pid     = i_pid;
    lspp->check   = i_check;
    lspp->waiting = i_waiting;
    lspp->posted  = i_posted;

lmilpp = (lmi_lockp *) (lspp->lockpp);
    status = i_locks.stat_proc_locks(lspp->lockmaxcnt, lmilpp,
                                     &(lspp->lockcnt));

/* ----- Here we unlock it, for sure. ---------------------------------- */ tmpstat = i_sim.unlock();
```

```
        return (status != LM_STAT_DONE) ? status : tmpstat;

}   /* end lmi_proc::stat */

/******************************************************************************
lmi_proc::addlock(): Add lock queue entry to proc's ownership lock queue.
******************************************************************************/ lm_stat lmi_proc::addlock(lmi_queuep lmqp)
{
    register lm_stat status, unstat;

if ((status = i_sim.lock()) != LM_STAT_DONE)
        return status;

/* ----- We have the lock; make sure we unlock it before returning ---- */ status = i_locks.append(lmqp);  /* Append lock entry to process lock queue */ unstat = i_sim.unlock();    /* Unlock the process object. */ return (status == LM_STAT_DONE) ? unstat : status;

}   /* end lmi_proc::addlock */

/******************************************************************************
lmi_proc::dellock(): Remove lock queue entry from proc's ownership lock queue.
Assumes that argument queue pointer is valid, and in the proc's queue.
******************************************************************************/ lm_stat lmi_proc::dellock(lmi_queuep lmqp)
{
    register lm_stat status, unstat;

if ((status = i_sim.lock()) != LM_STAT_DONE)
        return status;

/* ----- We have the lock; make sure we unlock it before returning ---- */ status = lmqp->remove();    /* Remove the queue entry from its queue */ unstat = i_sim.unlock();    /* Unlock the process object. */ return (status == LM_STAT_DONE) ? unstat : status;

}   /* end lmi_proc::dellock */

/******************************************************************************
lmi_proc::grant_lock(): grant lock conversion involving callbacks.
Assumes arguments are valid.
Assumes caller has resource for lock simlocked for duration of this call.
Main purpose of being here is to get process object locked for duration.
We also set the i_check field for this process so its lm_check calls will
subsequently do the callbacks.
******************************************************************************/ lm_stat lmi_proc::grant_lock(lmi_lockp lmlp, lmi_queuep granted_qp,
                             int blocking, lmi_queuep notify_qp)
{
    register lm_stat status, tmpstat;

/* DEADLOCK AVOIDANCE: resource object must be simlocked BEFORE process */
    /* object is simlocked, and not vice versa.  That is the natural flow  */
    /* for updating callback information related to granting locks on      */
    /* resources.  So if you find yourself wanting to simlock resource when */
    /* you already have a process simlocked, DON'T DO IT.   */
    /* Its not good for you.  -rwells, 2-Oct-88 */ if ((status = i_sim.lock()) != LM_STAT_DONE)
        return status;
```

```
/* ----- We have the lock; make sure we unlock it before returning ---- */

/* Pass the process callback queue head to the lock method to */
/* get the grant done. */ status = lmlp->grant(granted_qp, blocking, notify_qp, &i_calls);

/* Set the i_check flag for the owning process, so when its thread */
/* does an lm_check macro, it will actually go do the callbacks. */ i_check = TRUE;           /* Set the check flag, for lm_check */

/* Wakeup the owning process if it is sleeping. */
if ((tmpstat = wakeup()) != LM_STAT_DONE)
    status = tmpstat;

/* Unlock the process object. */
if ((tmpstat = i_sim.unlock()) != LM_STAT_DONE)
    status = tmpstat;

return status;
}                         /* end lmi_proc::grant_lock */

/******************************************************************************
lmi_proc::notify_lock(): queue a proc callback for given lock.
Assumes arguments are valid.
Main purpose of being here is to get process object locked for duration.
We also set the i_check field for this process so its lm_check calls will
subsequently do the callback.
******************************************************************************/ lm_stat lmi_proc::notify_lock(lmi_lockp lmlp, lm_level reqlevel)
{
    register lm_stat status, tmpstat;

/* DEADLOCK AVOIDANCE: resource object must be simlocked BEFORE process */
    /* object is simlocked, and not vice versa.  That is the natural flow */
    /* for updating callback information related to granting locks on */
    /* resources.  So if you find yourself wanting to simlock resource when */
    /* you already have a process simlocked, DON'T DO IT.  */
    /* Its not good for you.  -rwells, 2-Oct-88 */ if ((status = i_sim.lock()) != LM_STAT_DONE)
        return status;

/* ----- We have the lock; make sure we unlock it before returning ---- */

/* Pass the process callback queue head to the lock method to */
    /* get the notify done. */ if ((tmpstat = lmlp->notify(&i_calls, reqlevel)) != LM_STAT_DONE)
        status = tmpstat;

/* Set the i_check flag for the owning process, so when its thread */
    /* does an lm_check macro, it will actually go do the callbacks. */ i_check = TRUE;           /* Set the check flag, for lm_check */

/* Wakeup the process if it is sleeping. */
    if ((tmpstat = wakeup()) != LM_STAT_DONE)
        status = tmpstat;

/* Unlock the process object. */
    if ((tmpstat = i_sim.unlock()) != LM_STAT_DONE)
        status = tmpstat;

return status;
}                         /* end lmi_proc::notify_lock */
```

```
/******************************************************************
lmi_proc::nocallback_lock(): remove any pending callbacks for lock.
Assumes arguments are valid.
Main purpose of being here is to get process object locked for duration.
This internal method is used when closing a lock.
******************************************************************/ lm_stat lmi_proc::nocallback_lock(lmi_lockp lmlp)
{
    register lm_stat status, tmpstat;

/* DEADLOCK AVOIDANCE: resource object must be simlocked BEFORE process */
    /* object is simlocked, and not vice versa.  That is the natural flow  */
    /* for updating callback information related to granting locks on      */
    /* resources.  So if you find yourself wanting to simlock resource when */
    /* you already have a process simlocked, DON'T DO IT. */
    /* Its not good for you.  -rwells, 2-Oct-88 */ if ((status = i_sim.lock()) != LM_STAT_DONE)

return status;

/* ----- We have the lock; make sure we unlock it before returning ---- */

/* Do the work of removing pending callbacks for this lock */
    if ((tmpstat = lmlp->nocallback()) != LM_STAT_DONE)
        status = tmpstat;

/* Unlock the process object. */
    if ((tmpstat = i_sim.unlock()) != LM_STAT_DONE)
        status = tmpstat;

return status;
}                               /* end lmi_proc::nocallback_lock */

/******************************************************************
lmi_proc::callbacks(): do all pending callbacks for this process.
Assumes that 'this' process object corresponds to the process currently
executing, and thus does the callbacks in this thread of execution.

Process recovery code will have to be careful not to get into here, if it
ends up running with the globals swapped to pretend to be a different process.
******************************************************************/ lm_stat lmi_proc::callbacks()
{
    register lm_stat    status;
    register lmi_lockp  lmlp;
    lm_voidp    cookie;
    lmi_queuep  lmqp;
    lm_endfunp  endfp;
    lm_notfunp  notfp;
    lm_stat     endstat;
    lm_level    toplevel;

/* Get the process object locked */
    if ((status = i_sim.lock()) != LM_STAT_DONE)
        return status;          /* Give up easy if simlock fails */

/* Loop while there are callbacks to be done. */
    while (! i_calls.isempty())
    {
        lmqp = i_calls.next();  /* Get lock that needs 1 or more callbacks */
        lmlp = lmqp->proc_call();

/* The lmi_lock callend method will return a non-null function */
        /* pointer if and only if a completion callback needs to be    */
        /* made; in this case, it will reset the lock status and may   */
        /* also copy a lock value back to its user buffer, and will    */
        /* remove the lock from the callback queue unless there is also */
        /* a notification callback pending; in that case we will get    */
```

```
/* the notification callback on the next loop around, unless */
/* the completion callback does something wild like close the */
/* lock, in which case the notification may vanish into the mist. */
/* -rwells, BBNACI, 12-Feb-90 */ if ((endfp = lmlp->callend(&cookie, &endstat)) != NULL)
    {
        /* Unlock proc object before doing callback */
        if ((status = i_sim.unlock()) != LM_STAT_DONE)
            return status;

(*endfp)(cookie, endstat);  /* Do completion callback! */

/* Now get the process object locked again */
        if ((status = i_sim.lock()) != LM_STAT_DONE)
            return status;  /* Give up easy if simlock fails */
    }

/* The lmi_lock callnot method will return a non-null function */
        /* pointer if and only if a notification callback needs to be */
        /* made.  We will only be here if we didn't do a completion */
        /* callback above.  If a non-null return is made, the lock */
        /* will also be removed from the callback queue. */ else if ((notfp = lmlp->callnot(&cookie, &toplevel)) != NULL)
        {
            /* Unlock proc object before doing callback */
            if ((status = i_sim.unlock()) != LM_STAT_DONE)
                return status;

(*notfp)(cookie, toplevel);  /* Do notify callback! */

/* Now get the process object locked again */
            if ((status = i_sim.lock()) != LM_STAT_DONE)
                return status;  /* Give up easy if simlock fails */
        }

/* We only get here if the lock was in the callback queue */
        /* but seems to need neither a completion callback nor a */
        /* notify callback; this should happen rarely, but when it does, */
        /* we just remove it from the callback queue. */ else if ((status = lmqp->remove()) != LM_STAT_DONE)
        {
            (void) i_sim.unlock(); /* Unlock proc object, return orig err */
            return status;
        }
    }                            /* end while we have callbacks in queue... */

/* At this moment, the process object is still locked and */
    /* there is nothing in the queue.  So it is the right time */
    /* to clear the check field so the lm_check macro gets cheap */
    /* again for a while. -rwells, 11-Oct-88 */ i_check = FALSE;    /* We don't need to keep checking */ return i_sim.unlock(); /* Just unlock the process object. */
}                            /* end lmi_proc::callbacks */

/******************************************************************
lmi_proc::check_pid(): check pid and return LM_STAT_DONE if matches.
Assumes proc is not locked, and leaves it unlocked.
Returns LM_STAT_DONE if matches, LM_STAT_BADPID if doesn't match.
******************************************************************/ lm_stat lmi_proc::check_pid(int pid)
{
    register lm_stat status;

if ((status = check()) != LM_STAT_DONE) /* Make sure its a proc object */
        return status;
```

```
    if ((status = i_sim.lock()) != LM_STAT_DONE) /* Lock it. */
        return status;

/* ----- We have the lock; make sure we unlock it ---- */ if ((status = check()) != LM_STAT_DONE) /* Make sure not free */
    {
        (void) i_sim.unlock();  /* Get unlocked, just got freed */
        return status;
    } if (i_pid == 0 || i_pid != pid) /* Make sure pid is valid and our own. */
    {
        (void) i_sim.unlock();
        return LM_STAT_BADPID;
    }

/* We found the right proc!  unlock it and return successfully */
    return i_sim.unlock();      /* Get unlocked */

}   /* end lmi_proc::check_pid */

/*************************************************************************
lmi_proc::wait(): block this process until an interesting event occurs.
*************************************************************************/ lm_stat lmi_proc::wait(int timeout)
{
    register lm_stat status, tmpstat;
    register int pid;

if (timeout < 0)            /* timeout must be zero or positive */
        return LM_STAT_BADARG;

if ((status = check()) != LM_STAT_DONE) /* Make sure its a proc object */
        return status;

while (TRUE)                /* Loop until something happens */
    {
        if ((status = i_sim.lock()) != LM_STAT_DONE) /* Lock it. */
            return status;

/* ----- We have the lock; make sure we unlock it ---- */ if ((status = check()) != LM_STAT_DONE) /* Make sure not free */
        {
            (void) i_sim.unlock();   /* Get unlocked, just got freed */
            return status;
        } pid = i_pid;            /* Make sure pid is valid and our own. */
        if (pid == 0 || pid != (lmi_nid_pid & 0xffff))
        {
            (void) i_sim.unlock();
            return LM_STAT_BADPID;
        }

/* Our favorite case - we have pending callbacks, and we are not */
        /* at a recursive callback check level, so we can service them. */
        if (lmi_check_level == 0 && ! i_calls.isempty())
        {
            status = i_sim.unlock(); /* Unlock before doing callbacks */
            if ((tmpstat = lm_check()) != LM_STAT_DONE) /* Do callbacks */
                status = tmpstat;
            return status;      /* Return LM_STAT_DONE if callbacks work */
        } if (i_posted)           /* If we have been posted, tell caller */
        {
            i_posted = FALSE;   /* Clear posts to this point */
```

```
        status = i_sim.unlock();  /* Unlock before doing returning */
        return (status == LM_STAT_DONE) ? LM_STAT_POSTED : status;
    }

/* We just can't find any action, time to go to sleep */
    /* We use our pid as our wakeup channel. */
    /* This call will unlock the simlock. */ i_waiting = TRUE;      /* Let others know we are waiting */
    status = i_sim.sleep_and_unlock((unsigned) pid, timeout);
    i_waiting = FALSE;     /* Don't have to hold lock to clear int */

/* ----- We've released the lock with usu ----- */

/* If anything out of the ordinary happened, return the status. */
        /* This includes LM_STAT_TIMEOUT and LM_STAT_SIGNAL */
        if (status != LM_STAT_DONE)
            return status;

/* Otherwise loop around, see if something interesting has happened. */
    }                              /* end while true */

/* Control never gets here, always return inside loop above */
}   /* end lmi_proc::wait */

/***********************************************************************
lmi_proc::post(): post given process, waking it if it is sleeping.
If the process object doesn't have the right pid, complain.
***********************************************************************/ lm_stat lmi_proc::post(int pid)
{
    register lm_stat status;

if ((status = check()) != LM_STAT_DONE) /* Make sure its a proc object */
        return status;

if ((status = i_sim.lock()) != LM_STAT_DONE) /* Lock it. */
        return status;

/* ----- We have the lock; make sure we unlock it ---- */ if ((status = check()) != LM_STAT_DONE) /* Make sure not free */
    {
        (void) i_sim.unlock();  /* Get unlocked, just got freed */
        return status;
    } if (i_pid == 0 || i_pid != pid) /* Make sure pid is valid and our own. */
    {
        (void) i_sim.unlock();
        return LM_STAT_BADPID;
    } i_posted = TRUE;               /* Let process know we posted it */

/* Wakeup the process if it is already sleeping */
    if ((status = wakeup()) != LM_STAT_DONE)
    {
        (void) i_sim.unlock();
        return status;
    } return i_sim.unlock();
}   /* end lmi_proc::post */

/***********************************************************************
lmi_proc::wakeup(): wakeup process for given proc if it is sleeping.
Private method, assumes that proc object is valid and already simlocked.
Doesn't have to do anything if process isn't sleeping; simlock on process
object avoids missed wakeups.
***********************************************************************/
```

```
lm_stat lmi_proc::wakeup()
{
    register int retval;

if (i_waiting)
    {
#ifdef LM_SYSDEF_USER_SLEEP
        retval = user_wakeup((unsigned) i_pid); /* Wake sleeper */ if (retval < 0)
            return lmi_md_errno_stat();
else
        /* If user_wakeup isn't around, give it up and confess that */
        /* we haven't implemented for this situation yet. Better be */
        /* running on a butterfly if you want to try this stuff. */ return LM_STAT_NIY;
endif

/* Once we have waked the process up, there is no need to do it */
        /* again until it again prepares to retire. The process itself */
        /* will clear the waiting flag when it starts running again, but */
        /* that may take a while and wakeups are expensive, so we clear it */
        /* right here while we still have the process object locked. */
        /* -rwells, 30-Oct-88. */ i_waiting = FALSE;
    }                           /* end if waiting */ return LM_STAT_DONE;
}

/****************************************************************************
File:     lmi_node.cxx
Contents: Methods for node (lmi_node) class of lock manager library.
System:   BBNACI Programming Environments.
Created:  15-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
****************************************************************************/

/* $Header: lmi_node.cxx,v 1.12 90/02/11 12:52:56 rwells Exp $ */ include <lmi.hxx>

/* ----- prototypes ----- */ char* strcpy(char*, char*);

/* ----- static function declarations ------------------------------------ */
```

```
static lm_stat s_create(char *name, int maxprocs, int maxlocks, int maxres,
                        int hashsize, size_t valuelen, char *address,
                        size_t maxbytes, /*OUT*/ lmi_nodep *ournpp);

static size_t  s_create_getsize(int nodeprocs, int nodelocks, int noderes,
                                int nodehash, size_t valuelen, int numnodes);

static int     s_create_hashsize(int maxres);

static lm_stat s_node_mapmem_unlock(lm_stat status, lmi_mapmemp lmmp);

/************************************************************************
lmi_node::lmi_node(): Constructor for node object.  Really builds all of them.
This constuctor is called to make the node object for the creating process.
In filling out the node pointers array, it actually builds all the node objects
that will ever exist.  The rest of them are later accessed by index into that
array.

This constructor only works for dynamically allocated node objects; it sets
``this'' without checking first to make sure it is NULL.
************************************************************************/ lmi_node::lmi_node(char *name, int maxprocs, int maxlocks, int maxres,
                   int hashsize, size_t valuelen, lm_voidp address,
                   size_t maxbytes, /*OUT*/ lm_stat *statp)
{
    this = NULL;                  /* Make it clear that we control allocation */

/* Call helper function so status return can be simple. */
    *statp = s_create(name, maxprocs, maxlocks, maxres, hashsize, valuelen,
                     (char *) address, maxbytes, &this);
}   /* end lmi_node::lmi_node */

/************************************************************************
s_create(): do the work of constructing the node objects.
The lmi_node constructor calls us to get into a more convenient framework,
where status codes are the return values.
************************************************************************/ static lm_stat s_create(char *name, int maxprocs, int maxlocks, int maxres,
                        int hashsize, size_t valuelen, char *address,
                        size_t maxbytes, /*OUT*/ lmi_nodep *ournpp)
{
    lm_stat status;
    int cid, numnodes, ournid;
    register int nodeprocs, nodelocks, noderes, nodehash, inode;
    register int nodesize, usedsize, pagesize, mapsize;
    char *nodebasep;
    register lmi_nodep *node_array;
    register lmi_nodep lmnp;

if (maxprocs < 1 || maxlocks < 1 || maxres < 1 ||
        valuelen < 0 || maxbytes < 0 || (valuelen % sizeof(int)) != 0)
        return LM_STAT_BADARG;

if (hashsize < 1)
        hashsize = s_create_hashsize(maxres);

if ((status = lmi_md_cluster(&cid, &numnodes, &ournid)) != LM_STAT_DONE)
        return status;

/* Calculate how many of each thing go on each node. */
    /* Example: assume 3 nodes, try for various n: */
    /* 0->0, 1->1, 2->1, 3->1, 4->2, 5->2, 6->2, 7->3... */ nodeprocs = (maxprocs + numnodes - 1) / numnodes;
    nodelocks = (maxlocks + numnodes - 1) / numnodes;
    noderes   = (maxres   + numnodes - 1) / numnodes;
    nodehash  = (hashsize + numnodes - 1) / numnodes;

usedsize = s_create_getsize(nodeprocs, nodelocks, noderes, nodehash,
                                valuelen, numnodes);
```

```
pagesize = lmi_md_getpagesize();

/* Round up to nearest multiple of the page size */
/* because the shared memory allocator will probably do it anyway. */
/* This techique only works for page sizes that are powers of 2 :) */
nodesize = usedsize;
nodesize += (pagesize - 1); /* Add in ALMOST another page */
nodesize &= ~(pagesize - 1); /* Truncate to multiple of pages */ mapsize = (name == NULL) ? 0 : lmi_mapmem_size(strlen(name), numnodes);

if (maxbytes > 0 && (mapsize + numnodes * nodesize) > maxbytes)
    return LM_STAT_MAXBYTES;

/* If a name was specified, go setup named shared memory rather */
/* than later doing allocation of inheritable memory. */ if (name != NULL)
{
    lmi_mp = new lmi_mapmem(name, numnodes, nodesize, address, &status);
    if (status != LM_STAT_DONE)
        return status;

/* After this point, if name is non-null, lmi_mp is also non-null */
    /* and is simlocked by us. we must unlock it. */
}

/* Allocate the storage for node 0 */
/* We treat node 0 special because we use its storage to */
/* build our list of node addresses to put in all the nodes. */
/* If we are using named shared memory, get address out of mapmem */ if (lmi_mp == NULL)
    status = lmi_md_alloc(address, nodesize, 0, &nodebasep);
else
    status = lmi_mp->nodep(0, (lmi_nodep *) &nodebasep);

if (status != LM_STAT_DONE)
    return s_node_mapmem_unlock(status, lmi_mp);

node_array = (lmi_nodep *) (nodebasep + lmi_node_size());
node_array[0] = (lmi_nodep) nodebasep;

for (inode = 1; inode < numnodes; inode++)
{
    if (address != NULL)    /* If we have a live address, */
        address += nodesize; /*  bump past what we just allocated. */ if (lmi_mp == NULL)
        status = lmi_md_alloc(address, nodesize, inode, &nodebasep);
    else
        status = lmi_mp->nodep(inode, (lmi_nodep *) &nodebasep);

if (status != LM_STAT_DONE)
        return s_node_mapmem_unlock(status, lmi_mp);

node_array[inode] = (lmi_nodep) nodebasep;
}

/* We now have all the memory allocated, and need to initialize it */ for (inode = 0; inode < numnodes; inode++)
{
    lmnp = node_array[inode];
    status = lmnp->init(node_array, cid, inode,
                        numnodes, nodeprocs, nodelocks, noderes,
                        nodehash, hashsize, valuelen, usedsize, nodesize);
    if (status != LM_STAT_DONE)
        return s_node_mapmem_unlock(status, lmi_mp);
}
```

```
    *ournpp = node_array[ournid];

/* If we are creating a named shared memory context, we need */
    /* to mark it successfully created and unlock it so attachers */
    /* have access to it.  This should always succeed and return */
    /* LM_STAT_DONE. */ if (lmi_mp == NULL)
        return LM_STAT_DONE;
    else
        return lmi_mp->mark_created_and_unlock();

}   /* end s_create */

/******************************************************************************
s_node_mapmem_unlock(): unlock mapmem object if it is non-null.
Returns status argument, unless unlock fails, which it shouldn't ever do.
******************************************************************************/ static lm_stat s_node_mapmem_unlock(lm_stat status, lmi_mapmemp lmmp)
{
    register lm_stat tmpstat;

if (lmmp != NULL && (tmpstat = lmmp->unlock()) != LM_STAT_DONE)
        status = tmpstat;

return status;
}   /* end s_node_mapmem_unlock */

/******************************************************************************
s_create_getsize(): figure out how much space is needed per node.
Assumes that the arguments have already been validated.
Caller should round the size up to the next page boundary before allocating.
******************************************************************************/ static size_t s_create_getsize(int nodeprocs, int nodelocks, int noderes,
                               int nodehash, size_t valuelen, int numnodes)
{
    return (lmi_node_size() +                          /* Node struct itself */
            numnodes * sizeof(lmi_nodep) +             /* Array of node pointers */
            nodeprocs * lmi_proc_size() +              /* Pool of proc objects */
            nodelocks * lmi_lock_size(valuelen) +      /* Pool of lock objects */
            noderes * lmi_res_size(valuelen) +         /* Pool of res objects */
            nodehash * sizeof(lmi_queuep));            /* Hash bucket arena */
}   /* end s_create_getsize */

/******************************************************************************
s_create_hashsize(): pick default hash size based on max resources.
We just return the prime that is next higher than the ceiling power of 2.
******************************************************************************/ define MAXLOG2 24 static s_sizes[MAXLOG2] =
{      1,      1,      3,      5,     11,     17,     37,     67,
     131,    257,    521,   1031,   2053,   4099,   8209,  16411,
   32771,  65537, 131101, 262147, 524309,1048583,2097169,4194319 };

static int s_create_hashsize(int maxres)
{
    register int cnt = maxres;
    register int log2 = 1;

if (cnt <= 1)
        return 1;

cnt--;                          /* In case it is already a power of 2 */
    while (cnt > 0)
    {
        cnt >>= 1;
        log2++;
```

```
    }

/* Examples of maxres -> log2: */
    /* 2 -> 2 */
    /* 3 -> 3 */
    /* 4 -> 3 */
    /* 5 -> 4 */
    /* 6 -> 4 */
    /* 7 -> 4 */
    /* 8 -> 4 */ if (log2 < MAXLOG2)
        return s_sizes[log2];
    else                        /* I lose interest at 4 million resources... */
        return maxres;
}   /* end s_create_hashsize */

/**********************************************************************
lmi_node::init(): Fully initialize the node structure given all the info.
One special case: the list of nodes is copied into all the nodes except
node 0, where we verify that the argument list of nodes is in fact the
calculated list of nodes, and leave it alone.  It assumes that the list of
nodes comes right after the lmi_node struct itself.
**********************************************************************/ lm_stat lmi_node::init(lmi_nodep *lmnpp, int cid, int inode, int numnodes,
                       int nodeprocs, int nodelocks, int noderes, int nodehash,
                       int hashsize, size_t valuelen, size_t usedsize,
                       size_t nodesize)
{
    register int thishash;
    register size_t size;
    register char *cp = (char *) this;
    register lm_stat status;
    lmi_nodep *node_array;
    char *proc_basep, *lock_basep, *res_basep;
    lmi_queuep *hash_array;

cp += lmi_node_size();      /* Skip past lmi_node structure itself */ node_array = (lmi_nodep *) cp; /* List of node pointers is next */
    cp += (numnodes * sizeof(lmi_nodep));

proc_basep = cp;            /* Raw proc storage for proc pool */
    cp += (nodeprocs * lmi_proc_size());

lock_basep = cp;            /* Raw lock storage for lock pool */
    cp += (nodelocks * lmi_lock_size(valuelen));

res_basep  = cp;            /* Raw res storage for resource pool */
    cp += (noderes * lmi_res_size(valuelen));

hash_array = (lmi_queuep *) cp; /* Hash bucket array */
    cp += (nodehash * sizeof(lmi_queuep));

if (usedsize > nodesize)
        return LM_STAT_BADARG;

if (cp != (((char *) this) + usedsize)) /* This should not happen. */
        return LM_STAT_NOSPACE; /* Somehow we missed our allocation */ if (inode == 0 && node_array != lmnpp) /* This should not happen */
        return LM_STAT_BADOBJECT; /* Gives the general idea. */

/* For all nodes except the first, copy the list of node pointers */
    /* into the local storage of each node - these tend to be remote- */
    /* remote copies.  With extra effort we could use the local array */
    /* instead of the node 0 array, and make them local-remote copies. */
    /* Sometimes we will be on node 0 initially, and will win anyway. */
    /* -Robert Wells, BBNACI, 16-Aug-88. */
```

```
    if (inode > 0)
    {
        bcopy((char *) lmnpp, (char *) node_array,
            numnodes * sizeof(lmi_nodep));
    }

/* ----- Now initialize all the fields of the lmi_node object ----- */ i_cid = cid;
    i_nid = inode;
    i_numnodes = numnodes;
    i_valuelen = valuelen;
    i_nodebytes = nodesize;
    i_nodepp = node_array;
    i_lastnid = inode;
    i_sim.init();
    strcpy(i_version_library, lm_version_library());

/* Example: hashsize=7,  numnodes=3 -> nodehash=3, thishash=1 */
    /* Example: hashsize=8,  numnodes=3 -> nodehash=3, thishash=2 */
    /* Example: hashsize=9,  numnodes=3 -> nodehash=3, thishash=3 */
    /* Example: hashsize=10, numnodes=3 -> nodehash=4, thishash=1 */ if (inode < (numnodes - 1))
        thishash = nodehash;
    else
        thishash = ((hashsize - 1) % nodehash) + 1;

status = i_hash.init(hashsize, nodehash, thishash, hash_array);
    if (status != LM_STAT_DONE)
        return status;

size = lmi_lock_size(valuelen);
    status = i_lockpool.init(lock_basep, nodelocks * size, size, LMI_LOCK, inode);
    if (status != LM_STAT_DONE)
        return status;

size = lmi_proc_size();
    status = i_procpool.init(proc_basep, nodeprocs * size, size, LMI_PROC, inode);
    if (status != LM_STAT_DONE)
        return status;

size = lmi_res_size(valuelen);
    status = i_respool.init(res_basep, noderes * size, size, LMI_RES, inode);
    if (status != LM_STAT_DONE)
        return status;

i_procs.init();

return LM_STAT_DONE;
}   /* end lmi_node::init */

/***********************************************************************
lmi_node::stat(): return status information about this node object.
***********************************************************************/ lm_stat lmi_node::stat(size_t structsize, /*OUT*/ lm_stnode *lsnp)
{
    register lm_stat   status, tmpstat;
    register lmi_procp *lmippp;
    register int inode, cnt;

if (structsize != sizeof(lm_stnode))
        return LM_STAT_BADSIZE;

if (lsnp == NULL)
        return LM_STAT_NULLPTR; /* Argument ptr cannot be NULL */ status = i_sim.lock();      /* Lock node against other callers */
    if (status != LM_STAT_DONE) /* Give up if lock fails. */
        return status;
```

```
/* ----- We have the lock; make sure we unlock it before returning ---- */ lsnp->cid      = i_cid;
    lsnp->nid      = i_nid;
    lsnp->numnodes = i_numnodes;
    lsnp->valuelen = i_valuelen;
    lsnp->nodebytes = i_nodebytes;

cnt = i_numnodes;

lsnp->nodecnt = cnt;
    if (lsnp->nodepp != NULL)
    {
        if (cnt > lsnp->nodemaxcnt)
            cnt = lsnp->nodemaxcnt;

for (inode = 0; inode < cnt; inode++)
            lsnp->nodepp[inode] = (lm_nodep) (i_nodepp[inode]);
    } lmippp = (lmi_procp *) (lsnp->procpp);
    status = i_procs.stat_node_procs(lsnp->procmaxcnt, lmippp,
                                     &(lsnp->proccnt));

if (status == LM_STAT_DONE)
        status = i_lockpool.stat(&(lsnp->lockpool));
    if (status == LM_STAT_DONE)
        status = i_procpool.stat(&(lsnp->procpool));
    if (status == LM_STAT_DONE)
        status = i_respool.stat(&(lsnp->respool));

tmpstat = i_sim.unlock();   /* Unlock the node, for sure. */ return (tmpstat != LM_STAT_DONE) ? tmpstat : status;
}   /* end lmi_node::stat */

/************************************************************************
lmi_node::stat_hash(): return status information about node's hash object.
************************************************************************/ lm_stat lmi_node::stat_hash(size_t structsize, /*OUT*/ lm_sthash *lshp)
{
    register lm_stat    status, tmpstat;

status = i_sim.lock();       /* Lock node against other callers */
    if (status != LM_STAT_DONE)  /* Give up if lock fails. */
        return status;

status = i_hash.stat(structsize, lshp); /* Get the hash status */ tmpstat = i_sim.unlock();   /* Unlock the node, for sure. */ return (status != LM_STAT_DONE) ? status : tmpstat;
}   /* end lmi_node::stat */

/************************************************************************
lmi_node::getnp(): return node pointer for given node index.
Does validation just in case.
************************************************************************/ lm_stat lmi_node::getnp(int nid, /*OUT*/ lmi_nodep *lmnpp)
{
    if (nid < 0 || nid >= i_numnodes)
        return LM_STAT_BADNID;

if (lmnpp == NULL)
        return LM_STAT_NULLPTR;

*lmnpp = i_nodepp[nid];

return LM_STAT_DONE;
}   /* end lmi_node::getnp */
```

```
/**********************************************************************
lmi_node::addproc(): Add proc queue entry to node's process queue.
**********************************************************************/ lm_stat lmi_node::addproc(lmi_queuep lmqp)
{
    register lm_stat status, unstat;

if ((status = i_sim.lock()) != LM_STAT_DONE)
        return status;

/* ----- We have the lock; make sure we unlock it before returning ---- */ status = i_procs.append(lmqp);  /* Append proc entry to node process queue */ unstat = i_sim.unlock();    /* Unlock the node. */ return (status == LM_STAT_DONE) ? unstat : status;

}   /* end lmi_node::addproc */

/**********************************************************************
lmi_node::delproc(): Remove proc queue entry from node's process queue.
Assumes that argument queue pointer is valid, and in the node's queue.
**********************************************************************/ lm_stat lmi_node::delproc(lmi_queuep lmqp)
{
    register lm_stat status, unstat;

if ((status = i_sim.lock()) != LM_STAT_DONE)
        return status;

/* ----- We have the lock; make sure we unlock it before returning ---- */ status = lmqp->remove();    /* Remove the queue entry from its queue */ unstat = i_sim.unlock();    /* Unlock the node. */ return (status == LM_STAT_DONE) ? unstat : status;

}   /* end lmi_node::delproc */

/**********************************************************************
lmi_node::openlock(): open lock on resource, given lock stuff.
**********************************************************************/ lm_stat lmi_node::openlock(lmi_resp parresp, char *lockname, size_t locknamelen,
                    /*OUT*/ lmi_resp *lock_respp,
                    /*INOUT*/ lmi_queue *lock_resqp)
{
    lm_stat status, unstat;
    register lmi_nodep lmnp;
    lmi_resp lmrp;
    lmi_nodep arg_lmnp;
    int nid, index;

status = i_hash.hash(parresp, lockname, (int) locknamelen, &nid, &index);
    if (status != LM_STAT_DONE)
        return status;

if ((status = getnp(nid, &arg_lmnp)) != LM_STAT_DONE)
        return status;
    else
        lmnp = arg_lmnp;        /* Get in register for speed */

/* ----- From here on we operate on 'lmnp' instead of 'this' ----- */ if ((status = lmnp->i_sim.lock()) != LM_STAT_DONE)
        return status;
```

```
/* ----- We have the lock; make sure we unlock it before returning ---- */

/* See if we can find a resource in the hash table for this lock. */
status = lmnp->i_hash.lookup(parresp, lockname, (int) locknamelen, index,
                             &lmrp);

/* If resource already exists, just add a null lock to it. */
if (status == LM_STAT_DONE)
{
    /* DEADLOCK AVOIDANCE: hash node must be simlocked BEFORE resource */
    /* object is simlocked, and not vice versa.  If we unlock the hash */
    /* node before this call, we chance having the resource get freed */
    /* before we have a chance to add our lock to it, and things could */
    /* get all inconsistent.  So if you find yourself wanting to */
    /* simlock a node when you already have a resource simlocked, */
    /* DON'T DO IT.  Its not good for you. -rwells, 12-Sept-88. */ status = lmrp->addlock(lock_respp, lock_resqp);
}

/* If the resource doesn't exist, construct it. */
else if (status == LM_STAT_QEMPTY)
{
    lmrp = new lmi_res(parresp, lockname, (int) locknamelen, lmnp, index,
                       lock_respp, lock_resqp, &status);
}

/* ----- Unlock the node. ----- */ unstat = lmnp->i_sim.unlock(); /* Unlock the node. */

/* If we fail trying to unlock the node, it isn't worth */
/* trying to tear down the lock's resource connection, since the */
/* node is likely to just keep failing. */ return (status == LM_STAT_DONE) ? unstat : status;

}   /* end lmi_node::openlock */

/************************************************************************
lmi_node::closelock(): close lock on resource, given lock stuff.
************************************************************************/ lm_stat lmi_node::closelock(/*INOUT*/ lmi_resp *lock_respp,
                            /*INOUT*/ lmi_queue *lock_resqp)
{
    register lm_stat  status, tmpstat;
    register lmi_nodep lmnp;
    register lmi_resp  lmrp;
    lmi_nodep  arg_lmnp;
    lmi_resp   parentp;
    int        nid, index;

if (lock_respp == NULL || lock_resqp == NULL)
        return LM_STAT_NULLPTR;
    lmrp = *lock_respp;         /* Get resource via pointer to field of lock */
    if (lmrp == NULL)
        return LM_STAT_NULLPTR;
    if ((status = lmrp->check()) != LM_STAT_DONE)
        return status;

/* While our lock holds the resource open, it is safe to look at */
    /* its name and parent without locking it. */ status = i_hash.hash(lmrp->parent(), lmrp->name(), lmrp->namelen(),
                         &nid, &index);
    if (status != LM_STAT_DONE)
        return status;
```

```
if ((status = getnp(nid, &arg_lmnp)) != LM_STAT_DONE)
    return status;
else
    lmnp = arg_lmnp;         /* Get in register for speed */

/* ----- From here on we operate on 'lmnp' instead of 'this' ----- */

/* Lock the hash node for the resource, in case we want to free it. */
if ((status = lmnp->i_sim.lock()) != LM_STAT_DONE)
    return status;

/* ----- We have the lock; make sure we unlock it before returning ---- */

/* DEADLOCK AVOIDANCE: Because lmi_node::openlock has to lock the */
/* hash node and then the resource, we have to do it in the same */
/* order, even though we will only need the hash node locked if */
/* the resource is going to be freed.  A more complex solution would */
/* be to peek at the resource and see if it appears to have other locks */
/* or child resources to keep it alive; if so, we could try closing this */
/* lock without having the node locked.  If it turned out during the close */
/* that our lock was the only thing left, we would then have to back out */
/* and fall into the general case of first locking the hash node.  I will */
/* add that later if the potential performance gain seems worth the added */
/* complexity.  -rwells, 14-Sept-88. */

/* Remove the lock from the resource, dealing with implications. */
/* If the resource ends up getting closed, and it has a parent, dellock */
/* will return the parent pointer so we can deal with decrementing its */
/* child count (and perhaps closing it) below.  We have to wait until */
/* later to deal with the parent because otherwise we would end up */
/* having more than one node locked if the parent had to be closed, and */
/* that could get us into a deadlock since there is no ordering on the nodes. */
/* Note that dellock has to set parentp to something reasonable even */
/* when an error occurs. -rwells, 18-Sept-88 */ status = lmrp->dellock(lmnp, index, lock_respp, lock_resqp, &parentp);

/* ----- Unlock the node. ----- */

/* If we fail trying to unlock the node, it isn't worth */
/* trying to tear down the lock's resource connection, since the */
/* node is likely to just keep failing. */ if ((tmpstat = lmnp->i_sim.unlock()) != LM_STAT_DONE)
    status = tmpstat;

/* ----- Deal with parent resource if needed ------ */

/* If our resource got closed, we have to decrement the child count */
/* of its parent.  If the child count goes to zero and there are no */
/* open locks, the parent resource will get closed, and its parent */
/* resource if any will need the same treatment.  This can happen */
/* to any geneological height - one child could be holding a whole */
/* chain of ancestral resources open.  So we loop around until we */
/* are all done.  -rwells, 18-Sept-88 */

/* Note that delchild had better set the parent pointer */
/* to something reasonable even when errors occur. */ while (parentp != NULL)
{
    lmrp = parentp;
    if ((tmpstat = delchild(lmrp, &parentp)) != LM_STAT_DONE)
        status = tmpstat;
}

/* ----- Return error status if we got any ----- */
```

```
    return status;

}   /* end lmi_node::closelock */

/*****************************************************************************
lmi_node::delchild(): Decrement child count on given resource.
If resource gets closed and has a parent, we return the parent pointer through
the second argument for interative processing by delchild. We pass this
operation through the node object because closing a resource requires locking
its hash node and this is a clean way to get that done.
Assumes arguments are valid.  parent pointer must be set to a valid value
whatever happens.
*****************************************************************************/ lm_stat lmi_node::delchild(lmi_resp lmrp, /*OUT*/ lmi_resp *parentpp)
{
    register lm_stat   status;
    register lmi_nodep lmnp;
    int        nid, index;

*parentpp = NULL;           /* Make sure it gets set. */ if ((status = lmrp->check()) != LM_STAT_DONE)
        return status;

/* While the child count holds the resource open, it is safe to look at */
    /* its name and parent without locking it.  Figure out its hash node */
    /* and index. */ status = i_hash.hash(lmrp->parent(), lmrp->name(), lmrp->namelen(),
                         &nid, &index);
    if (status != LM_STAT_DONE)
        return status;

lmnp = i_nodepp[nid];      /* Get insider's node pointer */

/* ----- From here on we operate on 'lmnp' instead of 'this' ----- */

/* Lock the hash node for the resource, in case we want to free it. */
    if ((status = lmnp->i_sim.lock()) != LM_STAT_DONE)
        return status;

/* Let resource handle decrementing its child count, */
    /* and maybe removing the resource. */
    status = lmrp->delchild(lmnp, index, parentpp);

/* ----- Unlock the node. ----- */ return lmnp->i_sim.unlock();

}   /* end lmi_node::delchild */

/*****************************************************************************
lmi_node::newres(): allocate a new resource chunk from some node.
It first tries to allocate it on the specified node, then tries all the
nodes in succession, starting after the last node tried on a previous
resource allocation.
Assumes that arguments are valid.
*****************************************************************************/ lm_stat lmi_node::newres(int firstnid, /*OUT*/ lmi_resp *lmrpp)
{
    register lm_stat status;
    register lmi_nodep lmnp;
    register int nid;

/* First try to allocate it on the specified node */
    lmnp = i_nodepp[firstnid];
```

```
    if ((status = lmnp->i_respool.alloc((char **) lmrpp)) == LM_STAT_DONE)
        return status;

/* If there is no space on the specified node, try all the nodes. */
    /* Shift the starting point from call to call to distribute the load. */ nid = i_lastnid;            /* Start after last node used for this */ while (1)
    {
        nid++;                  /* Increment node number, */
        if (nid >= i_numnodes)  /*   and wrap around at the end. */
            nid = 0;

lmnp = i_nodepp[nid];
        if ((status = lmnp->i_respool.alloc((char **) lmrpp)) == LM_STAT_DONE)
            break;              /* Return below if allocation succeeds. */ if (nid == i_lastnid)   /* If we have cycled back thru lastnode, give up. */
            break;
    } i_lastnid = nid;            /* Remember last node used. */
    return status;

}   /* end lmi_node::newres */

/************************************************************************
lmi_node::freeres(): free resource chunk back into its pool.
Since resources can be allocated on any node, have to check the resource's
own node number to find the right pool.
************************************************************************/ lm_stat lmi_node::freeres(lmi_resp lmrp)
{
    register int nid;
    register lmi_nodep lmnp;

nid = lmrp->nid();
    lmnp = i_nodepp[nid];

return lmnp->i_respool.free((char *) lmrp);

}   /* end lmi_node::freeres */

/************************************************************************
lmi_node::post(): lookup proc by pid, remember its proc object, and post it.
Assumes neither nodes nor procs are locked by us when called.
Returns LM_STAT_DONE when found proc and sets *lmippp to point to it,
and returns LM_STAT_BADPID if proc pid couldn't be found.
************************************************************************/ lm_stat lmi_node::post(int pid, /*OUT*/ lmi_procp *lmippp)
{
    register lm_stat status;

if ((status = proc_lookup(pid, lmippp)) != LM_STAT_DONE)
        return status;

return (*lmippp)->post(pid);

}   /* end lmi_node::post */

/************************************************************************
lmi_node::proc_lookup(): lookup proc by pid, and return it if found.
Searches all the nodes starting with the current node.
Assumes neither nodes nor procs are locked by us when called.
Returns LM_STAT_DONE when found proc and sets *lmippp to point to it,
``` and returns LM_STAT_BADPID if proc pid couldn't be found.
**********************************************************************/

```cpp
lm_stat lmi_node::proc_lookup(int pid, /*OUT*/ lmi_procp *lmippp)
{
    register lm_stat status;
    register int itry;
    register int numnodes = i_numnodes;
    register lmi_nodep np;

/* Loop through all the nodes looking for pid */
    for (itry = 0; itry < numnodes; itry++)
    {
        /* Start with current node and wrap around */
        np = i_nodepp[(i_nid + itry) % numnodes];

if ((status = np->proc_lookup_one(pid, lmippp)) == LM_STAT_DONE)
            return status;
        else if (status != LM_STAT_BADPID)
            return status;         /* Something really bad happened */
        else
            continue;              /* Didn't find it on that node, try next */
    } return LM_STAT_BADPID;         /* Didn't find it on any node, give up */

} /* end lmi_node::proc_lookup */
```

/**********************************************************************
lmi_node::proc_lookup_one(): lookup proc by pid on self node only.
Return it through pointer argument if found. This is a helper called
only by proc_lookup. Assumes neither node nor procs are locked by us
when called. Returns LM_STAT_DONE if found, and LM_STAT_BADPID if not
found.
**********************************************************************/

```cpp
lm_stat lmi_node::proc_lookup_one(int pid, /*OUT*/ lmi_procp *lmippp)
{
    register lm_stat status, tmpstat;
    register lmi_queuep lmiqp, headqp;
    register lmi_procp lmipp;

if ((status = i_sim.lock()) != LM_STAT_DONE) /* Lock the node */
        return status;

/* ----- We have node lock; make sure we unlock it before return ---- */

/* Scan through list of process objects for this node; since we */
    /* have the node locked, no process objects can be added or removed. */
    headqp = &i_procs;
    for (lmiqp = headqp->next(); lmiqp != headqp; lmiqp = lmiqp->next())
    {
        lmipp = lmiqp->node_proc();

/* DEADLOCK AVOIDANCE: If you have process object simlocked, */
        /* don't even think about simlocking a node object. Its */
        /* not good for you. Right here we have a node object */
        /* simlocked and check_pid locks each of its process objects in */
        /* succession, so you can't go the other way. */
        /* -rwells, 10-Nov-88 */ if ((status = lmipp->check_pid(pid)) == LM_STAT_DONE)
        {
            *lmippp = lmipp;
            return i_sim.unlock(); /* Unlock the node and return success. */
        }
        else if (status != LM_STAT_BADPID)
        {
```

```
        tmpstat = i_sim.unlock();    /* Unlock the node. */
        return (tmpstat == LM_STAT_DONE) ? status : tmpstat;
    }

/* If status == LM_STAT_BADPID, try the next process object. */
    } status = i_sim.unlock();    /* Unlock the node. */ return (status == LM_STAT_DONE) ? LM_STAT_BADPID : status;

}   /* end lmi_node::proc_lookup_one */

/************************************************************************
lmi_node::touch_pools(): touch the lock, resource and hash table
segments on each of the nodes.  This is to get all the virtual memory
faults over with.  We'll touch things in reverse order of importance
since earlier touched things may get paged out if things get tight.
There are no error returns from this routine.
************************************************************************/ void lmi_node::touch_pools()
{
    register int node;
    register int numnodes = i_numnodes;

/* We'll touch all the pages in lock pool first. */
    for (node = 0; node < numnodes; node++)
        i_nodepp[node]->getlockpool()->touch();

/* Touch all the pages in the resource pool next. */
    for (node = 0; node < numnodes; node++)
        i_nodepp[node]->getrespool()->touch();

/* Touch all the pages in the hash table segment. */
    for (node = 0; node < numnodes; node++)
        i_nodepp[node]->gethash()->touch();
}
/************************************************************************
File:     lmi_queue.cxx
Contents: Operations for queue class (lmi_queue).
System:   BBNACI Programming Environments.
Created:  12-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
************************************************************************/

/* $Header: lmi_queue.cxx,v 1.7 90/02/11 12:53:16 rwells Exp $ */ include <lmi.hxx>
```

```
/************************************************************
lmi_queue::init(): Simple initialization of queue object.
Fixes it to point to itself.  Called by simple constructor.
*************************************************************/ void lmi_queue::init()
{
    i_prev = this;
    i_next = this;
}   /* end lmi_queue::init */

/************************************************************
lmi_queue::append(): append argument queue object to this queue head.
*************************************************************/ lm_stat lmi_queue::append(lmi_queue *lmqp)
{
    register lm_stat lstatus, status;

if (lmqp == NULL)
        return LM_STAT_NULLPTR;

lstatus = lmqp->check();
    status  = check();

if (lstatus != LM_STAT_QEMPTY || status == LM_STAT_QFAIL)
        return LM_STAT_QFAIL;

lmqp->i_next = this;
    i_prev->i_next = lmqp;
    lmqp->i_prev = i_prev;
    i_prev = lmqp;

return LM_STAT_DONE;
}   /* end lmi_queue::append */
/************************************************************
File:     lmi_hash.cxx
Contents: Methods of hash object (lmi_hash).
System:   BBNACI Programming Environments.
Created:  13-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*************************************************************/

/* $Header: lmi_hash.cxx,v 1.10 90/02/13 15:56:43 rwells Exp $ */ include <lmi.hxx> int lmi_hash_dummysum;  /* An anti-optimizer dummy variable.
                           This variable must have external scope
                           to work correctly. */
```

```
/******************************************************************************
lmi_hash::init(): Initialize hash object.
Validates the initialization values. Assumes that the storage pointed
to by addr is already zeroed, one way or another.
******************************************************************************/ lm_stat lmi_hash::init(int hashsize, int nodesize, int thissize, lm_voidp addr)
{
    if (hashsize < 1 || nodesize < 1 || thissize < 1 ||
        thissize > nodesize || nodesize > hashsize)
        return LM_STAT_BADARG;
    if (addr == NULL)
        return LM_STAT_NULLPTR;

i_hashsize = hashsize;
    i_nodesize = nodesize;
    i_thissize = thissize;
    i_hashp    = (lmi_queuep *) addr;

return LM_STAT_DONE;
}   /* end lmi_hash::init */

/******************************************************************************
lmi_hash::stat(): return statistics on hash table segment.
Its node should be locked around this call, it does not lock internally.
******************************************************************************/ lm_stat lmi_hash::stat(size_t structsize, /*OUT*/ lm_sthash *lshp)
{
    register lm_stat    status;
    register lmi_queuep *lmqpp, lmqp;
    register int        len;
    register int        *buckp;
    int cnt;

if (structsize != sizeof(lm_sthash))
        return LM_STAT_BADSIZE;
    if (lshp == NULL)
        return LM_STAT_NULLPTR;

lshp->hashsize = i_hashsize;
    lshp->nodesize = i_nodesize;
    lshp->buckcnt  = i_thissize;

buckp = lshp->buckp;
    if (buckp != NULL)
    {
        lmqpp = i_hashp;
        len   = (lshp->buckmaxcnt < i_thissize) ? lshp->buckmaxcnt : i_thissize;
        for ( ; len > 0; len--)
        {
            lmqp = *lmqpp++;
            if (lmqp == NULL)
                *buckp++ = 0;    /* Empty bucket */
            else
            {
                /* We add one to the count returned by the queue stat */
                /* method, because queue stat assumes it was handed a */
                /* pointer to a queue head object, and doesn't count  */
                /* the queue head. In this case, there is no queue head, */
                /* and every queue object counts as a queue entry. */ if ((status = lmqp->stat(0, NULL, &cnt)) != LM_STAT_DONE)
                    return status;
                *buckp++ = cnt + 1;
            }
        }
    }
    return LM_STAT_DONE;
}   /* end lmi_hash::stat */
```

```
/******************************************************************
lmi_hash::hash(): hash resource indentification into node id and index.
The hash function is a xor and rotate game.
If a non-NULL parent pointer is given, its node and pool index are thrown into
the hash calculation; the address itself isn't reproducible enough from run to
run to provide good regression testing.
******************************************************************/ lm_stat lmi_hash::hash(lmi_resp parent, char *name, int namelen,
                    /*OUT*/ int *nidp, /*OUT*/ int *indexp)
{
    register int    sum;

if (name == NULL || nidp == NULL || indexp == NULL)
        return LM_STAT_NULLPTR;

if (parent == NULL)
        sum = 0;
    else
        sum = ((parent->nid() + 1) << 1) + (parent->dex() + 1);

/* Hash this string */
    sum = xorblk(name, namelen, sum);

/* Mask down before taking modulus to avoid problems with negative values. */
    /* Calculate simple hash index. */
    sum = (sum & 0x7fffffff) % i_hashsize;

*nidp    = sum / i_nodesize;
    *indexp  = sum % i_nodesize;

return LM_STAT_DONE;
}   /* end lmi_hash::hash */

/******************************************************************
lmi_hash::lookup(): lookup resource object in given hash chain.
******************************************************************/ lm_stat lmi_hash::lookup(lmi_resp parent, char *name, int len, int index,
                    /*OUT*/ lmi_resp *lmrpp)
{
    register lmi_queuep firstqp, lmqp;
    register lmi_resp lmrp;

if (index < 0 || index >= i_thissize)
        return LM_STAT_BADARG;
    if (lmrpp == NULL)
        return LM_STAT_NULLPTR;

firstqp = i_hashp[index];
    if (firstqp == NULL)
        return LM_STAT_QEMPTY;

lmqp = firstqp;
    while (1)
    {
        lmrp = lmqp->hash_res();
        if (lmrp->lookup(parent, name, len))
        {
            *lmrpp = lmrp;
            return LM_STAT_DONE;
        } lmqp = lmqp->next();
        if (lmqp == firstqp)
            break;
    } return LM_STAT_QEMPTY;
}   /* end lmi_hash::lookup */
```

```
/*****************************************************************
lmi_hash::install(): install resource object into hash bucket.
Assumes that resource object isn't already in a hash bucket.
*****************************************************************/ lm_stat lmi_hash::install(lmi_queuep lmqp, int index)
{
    register lmi_queuep *lmqpp;

if (index < 0 || index >= i_thissize)
        return LM_STAT_BADARG;
    if (lmqp == NULL)
        return LM_STAT_NULLPTR;

lmqpp = i_hashp + index;

if (*lmqpp == NULL)
    {
        *lmqpp = lmqp;
        return LM_STAT_DONE;
    }
    else
        return (*lmqpp)->append(lmqp);

}   /* end lmi_hash::install */

/*****************************************************************
lmi_hash::remove(): remove resource object from hash arena.
Assumes that the resource object really is in the bucket with the given index.
*****************************************************************/ lm_stat lmi_hash::remove(lmi_queuep lmqp, int index)
{
    register lm_stat    status;
    register lmi_queuep *lmqpp, nextqp;
    register int        is_head;

if (index < 0 || index >= i_thissize)
        return LM_STAT_BADARG;
    if (lmqp == NULL)
        return LM_STAT_NULLPTR;

lmqpp = i_hashp + index;
    nextqp = lmqp->next();
    is_head = (*lmqpp == lmqp); /* Remember whether it is head of queue */

/* If the queue entry is empty (it points to itself), and if */
    /* the hash bucket points directly at it, all we need to do */
    /* is null out the hash bucket pointer because this was the */
    /* only entry in the bucket chain.  Otherwise we remove the */
    /* queue entry from its queue, and patch the bucket pointer */
    /* as required. */ if (is_head && nextqp == lmqp)
    {
        *lmqpp = NULL;
    }
    else
    {
        /* Remove the queue entry from the queue. */
        if ((status = lmqp->remove()) != LM_STAT_DONE)
            return status;

/* If bucket points to the removed queue entry, fix it */
        if (is_head)
        {
            *lmqpp = nextqp;
        }
    } return LM_STAT_DONE;
}   /* end lmi_hash::remove */
```

```
/****************************************************************
lmi_hash::touch(): touches all of the pages of the hash table segment.
This is useful for getting all of the page faults over with.  There
are no error returns from this routine.  A global
variable "lmi_hash_dummysum" is side affected to make sure that compilers
don't optimize this statement away.
****************************************************************/ void lmi_hash::touch()
{
    register char *ptr;
    register char *start, *end;

start = (char *) i_hashp;
    end = start + (i_thissize * sizeof(lmi_queuep*));

for (ptr = start; ptr < end; ptr += PAGESIZE)
        lmi_hash_dummysum += *ptr;
}

/****************************************************************
lmi_hash::xorblk(): compute a hash value for a string.

The algorithm:
        1)   Put the length of the string in a long.
        1.5) XOR the parent contribution into the long.
        2)   Four bytes of the string are XORed into the long.
             The long is then rotated to the left nine bits.
        3)   Step 2 is repeated until there are less then four bytes
             remaining in the string.
        4)   The remaining bytes are XORed into the long one byte
             at a time.  After each XOR the hash is rotated 13 bits
        5)   The long is multiplied by 0x71279461.

!!!! This algorithm assumes and requires that the charcter pointer
!!!! point to an 32 bit aligned string.  Anything else will
!!!! result in a misaligned exception on the 88k.
****************************************************************/ int lmi_hash::xorblk(register char* cp, register unsigned len, unsigned parent)
{
    register unsigned hashword;
    register unsigned *intptr;

intptr = (unsigned*) cp;         /* We'll use an int ptr for a while */ hashword = len ^ parent;

/* XOR and shift four bytes at a time */
    while (len > 3)
    {
        /* XOR in four bytes */
        hashword ^= *intptr;

/* Implement a rotate left by nine with two shifts */
        hashword = (hashword << 9) | (hashword >> 23);

intptr++;
        len -= 4;
    }

/* Do the leftovers one byte at a time */
    cp = (char *) intptr;       /* We'll switch back to a char pointer */
    while (len > 0)
    {
        /* XOR in a single byte */
        hashword ^= *cp;

/* Implement a rotate left by 13 with two shifts */
        hashword = (hashword << 13) | (hashword >> 19);
```

```
        cp++;
        len--;
    }

/* Multiply by a constant */
    hashword = hashword * 0x71279461;

return hashword;
}
/************************************************************************
File:     lmi_mapmem.cxx
Contents: Class methods for handling lock manager named shared memory.
System:   BBNACI Programming Environments.
Created:  19-Jan-1989
Author:   rwells Remarks:  This class assumes that a given process can only attach to a
single lock manager, named or unnamed, and that having attached to it, it
cannot subsequently attach using a different name.  This should be
quite adequate to the requirements.

Copyright 1989 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
************************************************************************/

/* $Header: lmi_mapmem.cxx,v 1.9 90/02/11 12:52:47 rwells Exp $ */ include <lmi.hxx>

/* ----- static functions ----- */ static lm_stat s_mapmem_error(lm_stat status, int fd, lmi_mapmemp lmmp,
                              size_t size, int locked);

static lm_stat s_mapmem_deallocate(lm_stat status, lmi_nodep *lmnpp,
                                   int numnodes, size_t nodesize);

/************************************************************************
lmi_mapmem_size(): return page aligned size of mapmem object.
************************************************************************/ size_t lmi_mapmem_size(int namelen, int numnodes)
{
    register int pagesize = lmi_md_getpagesize();

return (((sizeof(lmi_mapmem) + (sizeof(lmi_nodep) * numnodes) +
              namelen + 1) + (pagesize - 1)) &
            ~(pagesize - 1));
}   /* end lmi_mapmem_size */

/************************************************************************
lmi_mapmem::lmi_mapmem(): Constructor for lmi_mapmem - leaves it locked.
```

Added mapforstat flag that if set to STAT_ATTACHES indicates that the
caller will be performing an attach for status ONLY, hence disabling
some of the code in the constructor (e.g. don't allow create)

Assumes name is non-NULL.

This constructor can be used for either creating or attaching to a
given named shared memory lock manager context. If numnodes and
nodesize are both greater than zero, a create will be done, in which
case an error will be given if it has already been created; otherwise
an attach will be done, in which case an error will be given if it
hasn't already been created.

If the construction succeeds, LM_STAT_DONE is returned through the
statp argument pointer, a pointer to the object is returned through
this, and the internal simlock is locked and left locked; the caller
is responsible for unlocking it at the same level as the constructor
call. The simlock makes the create atomic with respect to other
creates and attaches.

nodesize should be a multiple of the pagesize, or 0.

The addr argument can be used to specify the starting virtual address
for the mapmem object. All the node objects will be allocated
contiguously after it in virtual space. If addr is NULL, the system
will chose the virtual addresses for each object. If addr is non-null
in an attach and doesn't match the virtual address used to create the
objects, an error will be returned.
*****************************************************************/

```
lmi_mapmem::lmi_mapmem(char *name, int numnodes, size_t nodesize,
                       lm_voidp addr, /*OUT*/ lm_stat *statp, int mapforstat)
{
    int fd, creating;
    lm_stat status;
    size_t size, mapsize;
    char *address, *mapaddress;
    int c_cid, c_numnodes, c_nid, c_pid, c_nid_real;

/* This should never happen, but make sure name is not null */
    /* (by the way, it did happen in early debugging of named shared */
    /* memory support... -rwells, 27-Jan-89 */ if (name == NULL)
    {
        *statp = s_mapmem_error(LM_STAT_NULLPTR, -1, NULL, 0, FALSE);
        return;
    }

/* Make sure that the lmi_nid_pid variable is correct for us, */
    /* since lmi_sim lock and unlock will check to make sure it */
    /* is consistent, and by the time we are done, it will be made */
    /* correct for us. We have to take care of it now so that unlock */
    /* will find the saved copy of it to be the same as its value */
    /* when we are done. -rwells, 27-Jan-89 */ c_pid = getpid();
    if ((status = lmi_md_cluster(&c_cid, &c_numnodes, &c_nid)) != LM_STAT_DONE)
    {
        *statp = s_mapmem_error(status, -1, NULL, 0, FALSE);
        return;
    } if (mapforstat == STAT_ATTACH)
    {
        /* Stuff 0 in for the nid (we'll work off of node 0's data structs */
        c_nid_real = c_nid;
        c_nid = 0;
    }
```

```
/* Freshen up the convolved node id and process id. */
lmi_nid_pid = (c_nid << 16) | c_pid;

/* If we can't open the file, return an error. */
/* If the file doesn't exist, we will try to create it such that */
/* only the current user can read and write it.  If a different */
/* mode is more appropriate, the file should be created before */
/* we get here. -rwells, 19-Jan-89 */ if ((status = lmi_md_open(name, &fd)) != LM_STAT_DONE)
{
    *statp = s_mapmem_error(status, -1, NULL, 0, FALSE);
    return;
} creating = (numnodes > 0) && (nodesize > 0);
if (nodesize < 0)           /* Make sure isn't negative, since */
    nodesize = 0;           /* it is used in initial allocation. */

/* Fix a bug (arguments were reversed) */
size = ((creating) ? lmi_mapmem_size(strlen(name), numnodes) :
        lmi_md_getpagesize());

/* Don't want to allow create for stat attach -- return BADCREATE. */ if ((mapforstat == STAT_ATTACH) && creating)
{
  *statp = LM_STAT_BADCREATE;
  return;
}

/* Map control region at 0L offset on node 0, */
/* and allocate space for node data as well, to work around */
/* vm_mapmem limitation that only one region of a given file */
/* can be mapped on a given node. -rwells, 4-Feb-89 */ status = lmi_md_mapmem(((char *) addr), size + nodesize,
                    fd, 0L, 0, &address);
if (status != LM_STAT_DONE)
{
    *statp = s_mapmem_error(status, fd, NULL, 0, FALSE);
    return;
} this = (lmi_mapmemp) address;

if ((status = i_sim.lock()) != LM_STAT_DONE)
{
    *statp = s_mapmem_error(status, fd, this, size + nodesize, FALSE);
    this = NULL;
    return;
}

/* ----- We now have it locked; be sure to unlock if we fail ----- */

/* Let private methods handle attaching or creating as needed */

/* STAT_ATTACH can never execute the if clause, since it has checked
 * for this situation and returned previous to this code.
 */ if (creating)              /* We are creating... */
{
    status = create(name, numnodes, nodesize, addr, size, fd);
    if (status != LM_STAT_DONE)
    {
        *statp = s_mapmem_error(status, fd, this, size + nodesize, TRUE);
        this = NULL;
        return;
    }
```

```
}
else                       /* else we are attaching... */
{
    /* Check first and last fields set by the creator; if either is not */
/* set, creation either never happened or was interrupted. */ if (i_this == NULL || ! i_created)
    {
        *statp = s_mapmem_error(LM_STAT_NOCREATE, fd, this, size + nodesize, TRUE);
        this = NULL;
        return;
    }

/* Make sure we have mapped control region at same place and size */
/* as creator; if not, try to reallocate it now that we know where */
/* it should be.  If caller specified addr and it doesn't match, we */
/* have to give up. */ if (i_this != this || (i_mapsize + i_nodesize) != (size + nodesize))
    {
        mapaddress = (char *) i_this;
        mapsize = i_mapsize;
        nodesize = i_nodesize;

if (i_this != this && addr != NULL)
        {
            *statp = s_mapmem_error(LM_STAT_BADARG, fd, this, size + nodesize, TRUE);
            this = NULL;
            return;
        } if ((status = i_sim.unlock()) != LM_STAT_DONE)
        {
            *statp = s_mapmem_error(status, fd, this, size + nodesize, FALSE);
            this = NULL;
            return;
        } this = NULL;        /* About to deallocate and reallocate... */

/* Careful here!  For attachforstat, we will have mapped only
         * size bytes at this point (nodesize will have been 0 at
         * the time of allocation).
         * Yet since we've attached to node 0's structure,
         * i_nodesize will have its proper non-zero value.  We don't
         * want to try and deallocate stuff we haven't mapped!
         */ if (mapforstat == STAT_ATTACH)
        {
          if ((status = lmi_md_deallocate(address, size)) != LM_STAT_DONE)
          {
            *statp = s_mapmem_error(status, fd, NULL, 0, FALSE);
            return;
          }
        }
        else
        {
          if ((status = lmi_md_deallocate(address, size + nodesize)) !=
              LM_STAT_DONE)
          {
            *statp = s_mapmem_error(status, fd, NULL, 0, FALSE);
            return;
          }
        }

/* Now map the node 0 region where it belongs... */ status = lmi_md_mapmem(mapaddress, mapsize + nodesize,
                            fd, 0L, 0, &address);
        if (status != LM_STAT_DONE)
        {
```

```
            *statp = s_mapmem_error(status, fd, NULL, 0, FALSE);
            return;
        } this = (lmi_mapmemp) address;

if ((status = i_sim.lock()) != LM_STAT_DONE)
        {
            *statp = s_mapmem_error(status, fd, this, mapsize + nodesize,
                                    FALSE);
            this = NULL;
            return;
        }

/* It may not be necessary to check again, but doesn't hurt */
        if (i_this == NULL || ! i_created)
        {
            *statp = s_mapmem_error(LM_STAT_NOCREATE, fd, this,
                                    mapsize + nodesize, TRUE);
            this = NULL;
            return;
        }

}                       /* end if was in wrong place */

/* Let helper handle the rest. */ if ((status = attach(name, size, fd, mapforstat)) != LM_STAT_DONE)
    {
        *statp = s_mapmem_error(status, fd, this, size + nodesize, TRUE);
        this = NULL;
        return;
    }
}                           /* end if it is an attach... */

/* After a successful create or attach, we need to close the */
/* file descriptor so we don't lose it.  If the close fails, we have */
/* to tear down everything we succeeded in constructing, including */
/* all the node regions.  -rwells, 22-Jan-89 */ if ((status = lmi_md_close(fd)) != LM_STAT_DONE)
{
    status = s_mapmem_deallocate(status, i_npp, i_numnodes, i_nodesize);
    *statp = s_mapmem_error(status, -1, this, size, TRUE);
    this = NULL;
    return;
}

*statp = LM_STAT_DONE;      /* Ah, sweet success. */
}   /* end lmi_mapmem::lmi_mapmem */

/************************************************************************
lmi_mapmem::create(): Private method to handle creation of mapmem regions.
It picks up the job part way through, after some setup by the constructor.
The simlock has already been locked; we have some validation to do to make
sure another creator didn't beat us to the punch.  If an error occurs, we
deal with a partially allocated node list, but leave the rest of recovery
for the caller to deal with at the level above.
************************************************************************/ lm_stat lmi_mapmem::create(char *name, int numnodes, size_t nodesize,
                           lm_vcidp addr, size_t size, int fd)
{
    lm_stat status;
    register int nid;
    char *address, *basep;
    off_t offset;
```

```
    /* i_this is the first field we set, and i_created is the last one set. */
    /* If either is already set, a creator has already been here. */ if (i_this != NULL || i_created)
        return LM_STAT_BADCREATE;

i_npp = (lmi_nodep *) (((char *) this) + sizeof(lmi_mapmem));
    i_name = (((char *) i_npp) + numnodes * sizeof(lmi_nodep));

address = (addr == NULL) ? NULL : ((char *) this) + size;
    offset = size;

/* Special case for node 0; its memory is piggybacked on control region */ i_npp[0] = (lmi_nodep) (((char *) this) + size);
    if (address != NULL)
        address += nodesize;
    offset += nodesize;

/* Do an allocation for each additional node. */ for (nid = 1; nid < numnodes; nid++)
    {
        status = lmi_md_mapmem(address, nodesize, fd, offset, nid, &basep);
        if (status != LM_STAT_DONE)
            return s_mapmem_deallocate(status, i_npp, nid, nodesize);

i_npp[nid] = (lmi_nodep) basep;

if (address != NULL)    /* If we have a live address, */
            address += nodesize; /* bump past what we just allocated. */
        offset += nodesize;     /* Always bump the offset past the node */
    }

/* ----- The allocations succeeded - fill in the rest. ----- */ i_this = this;
    i_mapsize = size;
    i_numnodes = numnodes;
    i_nodesize = nodesize;

/* Copy the name into the structure, for consistency checks. */
    bcopy(name, i_name, strlen(name) + 1);

/* If everything succeeds, we leave the lmi_mapmem object locked, */
    /* and the i_created flag still clear.  Once the entire lm_create */
    /* is done, it should call the mark_created_and_unlock method */
    /* to finish the creation and open it up for attachment business. */
    /* The file descriptor will also need to be closed in the caller. */ return LM_STAT_DONE;
}   /* end lmi_mapmem::create */

/*******************************************************************************
lmi_mapmem::attach(): Private method to handle attaching mapmem regions.
It picks up the job part way through, after some setup by the constructor.
Creation had better have been completed successfully.
*******************************************************************************/ lm_stat lmi_mapmem::attach(char *name, off_t offset, int fd, int mapforstat)
{
    lm_stat status;
    register int nid;
    char *address, *basep;
    int c_cid, c_numnodes, c_nid;

/* If the name doesn't match, we have somehow been misled.  There could */
    /* be a variation in paths to the same file, but I am insisting that */
```

```
/* exactly the same path be used by all callers. -rwells, 21-Jan-89 */ if (! match(name))
    return LM_STAT_BADNAME;

/* If STAT_ATTACH, find the real nid we're running on.  We'll use this
 * in mapping the LM data area below. */ if (mapforstat == STAT_ATTACH)
{
  if ((status = lmi_md_cluster(&c_cid, &c_numnodes, &c_nid)) !=
      LM_STAT_DONE)
  {
    /* Let the caller deal with this -- shouldn't happen since it
     * must have been successfully called by lmi_mapmem constructor
     * prior to getting here
     */
    return status;
  }
}

/* Special case for node 0; its memory is piggybacked on control region */
/* all we have to do is move the offset past the control region. */
offset += i_nodesize;

for (nid = 1; nid < i_numnodes; nid++)
{
    address = (char *) (i_npp[nid]);
    if (address == NULL)
        return s_mapmem_deallocate(LM_STAT_NULLPTR,i_npp,nid,i_nodesize);

/* If this is a STAT_ATTACH, we need to map all of the node areas
     * onto the node calling attach.  Remember that statattach is
     * performed (perhaps) from outside the cluster, and most likely
     * from a dedicated cluster or the public cluster.  Thus it is
     * likely to have a different number of nodes in its cluster than
     * the LM has in its cluster.  We can't provide nonexistent nid's
     * to vm_mapmem, so we'll map each of the node areas to "this"
     * node.  Hence, we'll guarantee that the LM area is all
     * readable, and we also won't intrude on any other nodes
     * that share this cluster (especially the public one).
     */

/* Even worse -- if we're in the cluster where the LM data area
     * was created, we have to use nid = 0 .. n-1, and if we're in
     * our own cluster, we need to use the nid we're running on
     */ if (mapforstat == STAT_ATTACH)
    {
       /* nid -1 is "BEST_PNN" -- sys/cluster.h not included in
        * this file since machine dependent.  Rather than including
        * it, I can just pass through the -1.
        */ status = lmi_md_mapmem(address, i_nodesize, fd,
                           offset, (int) -1, &basep);
       if (status != LM_STAT_DONE)
          return s_mapmem_deallocate(status, i_npp, (int) 0, i_nodesize);
    }
    else
    {
       status = lmi_md_mapmem(address, i_nodesize, fd, offset, nid, &basep);
       if (status != LM_STAT_DONE)
          return s_mapmem_deallocate(status, i_npp, nid, i_nodesize);
    } offset += i_nodesize;   /* Always bump the offset past the node */
```

```
        }

/* If everything succeeds, we leave the lmi_mapmem object locked. */
        /* The caller should call the unlock method to unlock the object */
        /* when the successful attach is done. The caller should close */
        /* the file descrptor as well. */ return LM_STAT_DONE;
    }   /* end lmi_mapmem::attach */

/***********************************************************************
lmi_mapmem::nodep(): return ptr to node object for given node number.
***********************************************************************/ lm_stat lmi_mapmem::nodep(int nid, /*OUT*/ lmi_nodep *lmnpp)
{
    if (nid < 0 || nid >= i_numnodes)
        return LM_STAT_BADNID;

*lmnpp = i_npp[nid];
    return (*lmnpp == NULL) ? LM_STAT_NULLPTR : LM_STAT_DONE;
}   /* end lmi_mapmem::nodep */

/***********************************************************************
lmi_mapmem::unlock(): unlock the latch on the mapmem object.
***********************************************************************/ lm_stat lmi_mapmem::unlock()
{
    return i_sim.unlock();
}   /* end lmi_mapmem::unlock */

/***********************************************************************
lmi_mapmem::mark_created_and_unlock(): mark created, and unlock mapmem latch.
This is called at the end of a successful lm_create action.
***********************************************************************/ lm_stat lmi_mapmem::mark_created_and_unlock()
{
    i_created = TRUE;

return i_sim.unlock();
}   /* end lmi_mapmem::mark_created_and_unlock */

/***********************************************************************
s_mapmem_error(): cleanup after error in mapmem construction.
If locked is TRUE, unlock the lmi_mapmem simlock for a non-NULL address.
If address is non-NULL, it will be deallocated.
If fd is non-negative, it will be closed.
If lmnpp is non-NULL, the address it points to is set to NULL.
If lmmpp is non-NULL, the address it points to is set to NULL.
The argument status will be returned, unless one of the system calls
fails, in which case its error status will be returned.
***********************************************************************/ static lm_stat s_mapmem_error(lm_stat status, int fd, lmi_mapmemp lmmp,
                              size_t size, int locked)
{
    register lm_stat tmpstat;

if (lmmp != NULL)
    {
        if (locked)
        {
            if ((tmpstat = lmmp->unlock()) != LM_STAT_DONE)
                status = tmpstat;
        }
```

```
        if ((tmpstat = lmi_md_deallocate((char *) lmmp, size)) != LM_STAT_DONE)
            status = tmpstat;
    } if (fd >= 0)
    {
        if ((tmpstat = lmi_md_close(fd)) != LM_STAT_DONE)
            status = tmpstat;
    } return status;
}   /* end s_mapmem_error */

/****************************************************************************
s_mapmem_deallocate(): deallocate list of node ranges for error cleanup.
****************************************************************************/ static lm_stat s_mapmem_deallocate(lm_stat status, lmi_nodep *lmnpp,
                                   int numnodes, size_t nodesize)
{
    register lm_stat tmpstat;
    register int nid;

for (nid = 0; nid < numnodes; nid++)
    {
        tmpstat = lmi_md_deallocate((char *) (lmnpp[nid]), nodesize);
        if (tmpstat != LM_STAT_DONE)
            status = tmpstat;
        lmnpp[nid] = NULL;
    } return status;
}   /* end s_mapmem_deallocate */

/****************************************************************************
lmi_queue::prepend(): prepend argument queue object to this queue head.
****************************************************************************/ lm_stat lmi_queue::prepend(lmi_queue *lmqp)
{
    register lm_stat lstatus, status;

if (lmqp == NULL)
        return LM_STAT_NULLPTR;

lstatus = lmqp->check();
    status  = check();

if (lstatus != LM_STAT_QEMPTY || status == LM_STAT_QFAIL)
        return LM_STAT_QFAIL;

lmqp->i_prev = this;
    i_next->i_prev = lmqp;
    lmqp->i_next = i_next;
    i_next = lmqp;

return LM_STAT_DONE;
}   /* end lmi_queue::prepend */

/****************************************************************************
lmi_queue::getnext(): remove and return next element from queue head.
****************************************************************************/ lm_stat lmi_queue::getnext(/*OUT*/ lmi_queue **lmqpp)
{
    register lmi_queuep lmqp;
    register lm_stat status, lstatus;

if (lmqpp == NULL)
        return LM_STAT_NULLPTR;
```

```c
    status = check();

if (status != LM_STAT_DONE)
    {
        *lmqpp = NULL;
        return status;
    } lmqp = i_next;
    lstatus = lmqp->check();

if (lstatus != LM_STAT_DONE)
        return LM_STAT_QFAIL;

lmqp->i_next->i_prev = this;
    i_next = lmqp->i_next;
    lmqp->i_prev = lmqp;
    lmqp->i_next = lmqp;

*lmqpp = lmqp;
    return LM_STAT_DONE;
}   /* end lmi_queue::getnext */

/******************************************************************
lmi_queue::remove(): remove this queue element from middle of its queue chain.
******************************************************************/ lm_stat lmi_queue::remove()
{
    if (this == NULL)
        return LM_STAT_NULLPTR;

if (check() != LM_STAT_DONE)
        return LM_STAT_QFAIL;

i_prev->i_next = i_next;
    i_next->i_prev = i_prev;
    i_prev = this;
    i_next = this;

return LM_STAT_DONE;
}   /* end lmi_queue::remove */

/******************************************************************
lmi_queue::check(): check status of queue element.
Returns LM_STAT_QEMPTY, LM_STAT_QFAIL, or LM_STAT_DONE.
******************************************************************/ lm_stat lmi_queue::check()
{
    if (i_prev == this && i_next == this)
        return LM_STAT_QEMPTY;
    else if (i_prev == NULL || i_next == NULL ||
             i_prev->i_next == NULL || i_prev->i_next != this ||
             i_next->i_prev == NULL || i_next->i_prev != this)
        return LM_STAT_QFAIL;
    else
        return LM_STAT_DONE;
}   /* end lmi_queue::check */

/******************************************************************
lmi_queue::stat(): Return queue length, and elements in arg array.
******************************************************************/ lm_stat lmi_queue::stat(int maxcnt, /*OUT*/ lmi_queuep *lmqpp, /*OUT*/ int *cntp)
{
    register int cnt;
    register lmi_queuep lmqp;

if ((lmqpp == NULL && maxcnt > 0) || cntp == NULL)
        return LM_STAT_NULLPTR;
```

```
    cnt = 0;
    for (lmqp = i_next; lmqp != this; lmqp = lmqp->i_next)
    {
        if (lmqp->check() != LM_STAT_DONE)
            return LM_STAT_QFAIL;

if (cnt < maxcnt)
            *lmqpp++ = lmqp;
        cnt++;
    }

*cntp = cnt;
    return LM_STAT_DONE;
}   /* end lmi_queue::stat */

/*****************************************************************************
lmi_queue::stat_res_locks(): return array of lock pointers for resource queue.
*****************************************************************************/ lm_stat lmi_queue::stat_res_locks(int maxcnt, /*OUT*/ lmi_lockp *lmlpp,
                                  /*OUT*/int *cntp)
{
    register lm_stat status;
    register int i, len;
    register lmi_queuep *lmqpp;
    register lmi_queuep lmqp;
    register lmi_lockp  lmlp;

lmqpp = (lmi_queuep *) lmlpp;

if ((status = stat(maxcnt, lmqpp, cntp)) != LM_STAT_DONE)
        return status;

len = (maxcnt < *cntp) ? maxcnt : *cntp;

for (i = 0; i < len; i++)
    {
        lmqp = *lmqpp++;
        lmlp = lmqp->res_lock();
        if ((status = lmlp->check()) != LM_STAT_DONE)
            return status;
        *lmlpp++ = lmlp;
    } return LM_STAT_DONE;
}   /* end lmi_queue::stat_res_locks */

/*****************************************************************************
lmi_queue::stat_res_notifies(): return array of lock pointers for notify queue.
*****************************************************************************/ lm_stat lmi_queue::stat_res_notifies(int maxcnt, /*OUT*/ lmi_lockp *lmlpp,
                                     /*OUT*/int *cntp)
{
    register lm_stat status;
    register int i, len;
    register lmi_queuep *lmqpp;
    register lmi_queuep lmqp;
    register lmi_lockp  lmlp;

lmqpp = (lmi_queuep *) lmlpp;

if ((status = stat(maxcnt, lmqpp, cntp)) != LM_STAT_DONE)
        return status;

len = (maxcnt < *cntp) ? maxcnt : *cntp;

for (i = 0; i < len; i++)
    {
        lmqp = *lmqpp++;
```

```
        lmlp = lmqp->res_notify();
        if ((status = lmlp->check()) != LM_STAT_DONE)
            return status;
        *lmlpp++ = lmlp;
    } return LM_STAT_DONE;
}   /* end lmi_queue::stat_res_notifies */

/**************************************************************************
lmi_queue::stat_node_procs(): return array of proc pointers for node queue.
**************************************************************************/ lm_stat lmi_queue::stat_node_procs(int maxcnt, /*OUT*/ lmi_procp *lmppp,
                                   /*OUT*/int *cntp)
{
    register lm_stat status;
    register int i, len;
    register lmi_queuep *lmqpp;
    register lmi_queuep lmqp;
    register lmi_procp lmpp;

lmqpp = (lmi_queuep *) lmppp;

if ((status = stat(maxcnt, lmqpp, cntp)) != LM_STAT_DONE)
        return status;

len = (maxcnt < *cntp) ? maxcnt : *cntp;

for (i = 0; i < len; i++)
    {
        lmqp = *lmqpp++;
        lmpp = lmqp->node_proc();
        if ((status = lmpp->check()) != LM_STAT_DONE)
            return status;
        *lmppp++ = lmpp;
    } return LM_STAT_DONE;
}   /* end lmi_queue::stat_node_procs */

/**************************************************************************
lmi_queue::stat_proc_locks(): return array of lock pointers for proc queue.
**************************************************************************/ lm_stat lmi_queue::stat_proc_locks(int maxcnt, /*OUT*/ lmi_lockp *lmlpp,
                                   /*OUT*/ int *cntp)
{
    register lm_stat status;
    register int i, len;
    register lmi_queuep *lmqpp;
    register lmi_queuep lmqp;
    register lmi_lockp lmlp;

lmqpp = (lmi_queuep *) lmlpp;

if ((status = stat(maxcnt, lmqpp, cntp)) != LM_STAT_DONE)
        return status;

len = (maxcnt < *cntp) ? maxcnt : *cntp;

for (i = 0; i < len; i++)
    {
        lmqp = *lmqpp++;
        lmlp = lmqp->proc_lock();
        if ((status = lmlp->check()) != LM_STAT_DONE)
            return status;
        *lmlpp++ = lmlp;
    } return LM_STAT_DONE;
}   /* end lmi_queue::stat_proc_locks */
```

```
/******************************************************************
lmi_queue::res_lock(): return lock address given addr of its res queue entry.
You better know you have a queue object in a lock object i_resq field.
******************************************************************/ lmi_lockp lmi_queue::res_lock()
{
    register lmi_lockp lmilp;
    register char *cp;

cp = (char *) this;
    lmilp = (lmi_lockp) cp;
    cp -= lmilp->res_offset();
    lmilp = (lmi_lockp) cp;

return lmilp;
}   /* end lmi_queue::res_lock */

/******************************************************************
lmi_queue::res_notify(): return lock address given addr of res notify queue entry.
You better know you have a queue object in a lock object i_notifyq field.
******************************************************************/ lmi_lockp lmi_queue::res_notify()
{
    register lmi_lockp lmilp;
    register char *cp;

cp = (char *) this;
    lmilp = (lmi_lockp) cp;
    cp -= lmilp->notify_offset();
    lmilp = (lmi_lockp) cp;

return lmilp;
}   /* end lmi_queue::res_notify */

/******************************************************************
lmi_queue::proc_lock(): return lock address given addr of its proc queue entry.
You better know you have a queue object in a lock object i_procq field.
******************************************************************/ lmi_lockp lmi_queue::proc_lock()
{
    register lmi_lockp lmilp;
    register char *cp;

cp = (char *) this;
    lmilp = (lmi_lockp) cp;
    cp -= lmilp->proc_offset();
    lmilp = (lmi_lockp) cp;

return lmilp;
}   /* end lmi_queue::proc_lock */

/******************************************************************
lmi_queue::proc_calls(): return lock addr given its proc call queue entry addr.
You better know you have a queue object in a lock object i_callq field.
******************************************************************/ lmi_lockp lmi_queue::proc_call()
{
    register lmi_lockp lmilp;
    register char *cp;

cp = (char *) this;
    lmilp = (lmi_lockp) cp;
    cp -= lmilp->call_offset();
    lmilp = (lmi_lockp) cp;

return lmilp;
}   /* end lmi_queue::proc_lock */
```

```
/****************************************************************
lmi_queue::node_proc(): return proc address given addr of its node queue entry.
You better know you have a queue object in a proc object i_nodeq field.
****************************************************************/ lmi_procp lmi_queue::node_proc()
{
    register lmi_procp lmipp;
    register char *cp;

cp = (char *) this;
    lmipp = (lmi_procp) cp;
    cp -= lmipp->node_offset();
    lmipp = (lmi_procp) cp;

return lmipp;
}   /* end lmi_queue::node_proc */

/****************************************************************
lmi_queue::hash_res(): return res address given addr of its hash queue entry.
You better know you have a queue object in a res object i_hashq field.
****************************************************************/ lmi_resp lmi_queue::hash_res()
{
    register lmi_resp lmirp;
    register char *cp;

cp = (char *) this;
    lmirp = (lmi_resp) cp;
    cp -= lmirp->hash_offset();
    lmirp = (lmi_resp) cp;

return lmirp;
}   /* end lmi_queue::hash_res */

/****************************************************************
File:     lmi_sim.cxx
Contents: Operations for simple lock class (lmi_sim).
System:   BBNACI Programming Environments.
Created:  11-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
****************************************************************/

/* $Header: lmi_sim.cxx,v 1.17 90/02/11 12:53:26 rwells Exp $ */ include <stdio.h>
include <lmi.hxx>

/* ----- system function prototypes ----- */
```

```
extern int user_yield(int);
extern void fprintf(FILE*, char* ...);

/* ----- simple lock nid_pid defines ------ */ define UNLOCKED_ULOCK   -1      /* Currently unlocked, unlock used */
define UNLOCKED_USU     -2      /* Currently unlocked, usu used */
#define UNLOCKED_INIT    -3      /* Currently unlocked, initialized */

/****************************************************************************
lmi_sim::lock(): lock operation on simple lock.
****************************************************************************/ lm_stat lmi_sim::lock()
{
    register int oldval;

#ifdef EVENT_POINTS
    if (lmi_elog_sim)
    {
        KLOG_LOG(LM_KLOG_SIM_LEVEL, LMbeginSimLock, (int) &i_interlock);
        ELOG_LOG(LMbeginSimLock, (int) &i_interlock);
    }
endif EVENT_POINTS /* Turn off preemption for a spell ... */
    if (lmi_pflag == 0)
        lmi_ptime = LMI_SIM_NPTIMEOUT;
    lmi_pflag++;

/* See if we can lock it in one try */
    if ((oldval = atomxmem(&i_interlock, 1)) == 0)

{
        /* We got it in one try! */
        i_nid_pid = lmi_nid_pid;

#if defined(LMI_SIM_DEBUG) && LMI_SIM_DEBUG > 0
        i_caller1 = caller();
        i_caller2 = caller_caller();
        i_caller3 = caller_caller_caller();
endif                           /* end LMI_SIM_DEBUG defined and set */ ifdef EVENT_POINTS
        if (lmi_elog_sim)
        {
            KLOG_LOG(LM_KLOG_SIM_LEVEL, LMsimLockOneTry, (int) &i_interlock);
            KLOG_LOG(LM_KLOG_SIM_LEVEL, LMendSimLock, (int) &i_interlock);
            KLOG_LOG(LM_KLOG_SIM_LEVEL, LMbeginSimLocked, (int) &i_interlock);
            ELOG_LOG(LMsimLockOneTry, (int) &i_interlock);
            ELOG_LOG(LMendSimLock, (int) &i_interlock);
            ELOG_LOG(LMbeginSimLocked, (int) &i_interlock);
        }
endif EVENT_POINTS return LM_STAT_DONE;
    }
    else
    {
        int prev_nid_pid = i_nid_pid;
        int prev_nid = (prev_nid_pid >> 16);
        int my_nid = (lmi_nid_pid >> 16);
        int my_pid = (lmi_nid_pid & 0xffff);
        int backoff_count = LMI_SIM_MINWAIT;
        realtime firstrtc = getrealtime();
        realtime delta = 0;

/* Until we get the lock or timeout we're in this loop. */
        while (TRUE)
        {
```

```
            /* Step 0: Make sure we haven't stepped on our tail... */
            if (prev_nid_pid == lmi_nid_pid)
            {
                extern void sleep(int);
                fprintf(stderr, "[USU: ME AGAIN? pid %d (%d) spinning ...]\n",
                        my_pid, getpid());
                for(;;) sleep(10);
            }

/* Step 1: Find the correct way to spend some time. */
            if (prev_nid_pid < 0) /* All unlocked codes are negative */
            {
                /* Someone is just about to release the lock so
                   we won't wait at all. */
#ifdef EVENT_POINTS
                if (lmi_elog_sim)
                {
                    KLOG_LOG(LM_KLOG_SIM_LEVEL, LMsimLockNoidle, (int) &i_interlock);
                    ELOG_LOG(LMsimLockNoidle, (int) &i_interlock);
                }
endif EVENT_POINTS
            }
            else if (prev_nid_pid == 0)
            {
                /* This is a broken case.  We don't use a zero for an
                   unused lock anymore. */
                extern void sleep(int);
                fprintf(stderr, "[ZERO! pid %d spinning ...]\n",
                        getpid());
                for(;;) sleep(10);
            }
            else if (my_nid == prev_nid)
            {
                /* This means that a fellow process on the same
                   node has got the lock.  The correct thing is to
                   go to the end of the run queue and wait for him to
                   unlock it. */
#ifdef EVENT_POINTS
                if (lmi_elog_sim)
                {
                    KLOG_LOG(LM_KLOG_SIM_LEVEL, LMsimLockSame, (int) &i_interlock);
                    ELOG_LOG(LMsimLockSame, (int) &i_interlock);
                }
endif EVENT_POINTS
                int pid = (prev_nid_pid & 0xffff);
                int retval = user_yield(pid);
                if (retval == -1) {
                    lmi_pflag--;
                    return lmi_md_errno_stat();
                }
            }
            else
            {
                /* This means that the other guy is on another node.
                   We'll spin wait for the lock because he shouldn't
                   have it for long. */
                /* Use exponential backoff on the attempts to give better */
                /* behavior under contention.  The current strategy is */
                /* borrowed from the uniform system locking. */
                /*   -rwells, 10-Dec-88 */
#ifdef EVENT_POINTS
                if (lmi_elog_sim)
                {
                    KLOG_LOG(LM_KLOG_SIM_LEVEL, LMsimLockDiff, (int) &i_interlock);
                    ELOG_LOG(LMsimLockDiff, (int) &i_interlock);
                }
endif EVENT_POINTS
                lmi_sim_wait(backoff_count);
                if (backoff_count < LMI_SIM_MAXWAIT)
                    backoff_count <<= 1; /* Double the wait period - backoff */
```

```c
            }

/* Step 2: Has this been going on too long? */
            delta = getrealtime() - firstrtc;
            if (delta > lmi_sim_timeout_ticks)
            {
                /* $$$ We're going to hang up the timeout cases for a
                   while so we can figure out why they're hanging. */
                extern void sleep(int);
                fprintf(stderr,"[TIMEOUT! pnp was %d; pid %d spinning ...]\n",
                        prev_nid_pid, getpid());
                for(;;) sleep(10);

#ifdef EVENT_POINTS
                if (lmi_elog_sim)
                {
                    KLOG_LOG(LM_KLOG_SIM_LEVEL, LMsimLockTimeout, (int) &i_interlock);
                    KLOG_LOG(LM_KLOG_SIM_LEVEL, LMendSimLock, (int) &i_interlock);
                    ELOG_LOG(LMsimLockTimeout, (int) &i_interlock);
                    ELOG_LOG(LMendSimLock, (int) &i_interlock);
                }
endif EVENT_POINTS
                lmi_pflag--;
                return LM_STAT_SIMLOCK;
            }

/* Step 3: Try again ... */
#ifdef EVENT_POINTS
            if (lmi_elog_sim)
            {
                KLOG_LOG(LM_KLOG_SIM_LEVEL, LMsimLockRetry, (int) &i_interlock);
                ELOG_LOG(LMsimLockRetry, (int) &i_interlock);
            }
endif EVENT_POINTS
            if ((oldval = atomxmem(&i_interlock, 1)) == 0)
                break;          /* We got it, finally! */

/* Oh well, who has it now? */
            prev_nid_pid = i_nid_pid;
            prev_nid = (prev_nid_pid >> 16);

/* Log the conflicting owner's signature... */
#ifdef EVENT_POINTS
            if (lmi_elog_sim)
            {
                KLOG_LOG(LM_KLOG_SIM_LEVEL, LMsimLockNidPid, prev_nid_pid);
                ELOG_LOG(LMsimLockNidPid, prev_nid_pid);
            }
endif EVENT_POINTS
        }

/* We finally got it! */
        i_nid_pid = lmi_nid_pid;

#if defined(LMI_SIM_DEBUG) && LMI_SIM_DEBUG > 0
        i_caller1 = caller();
        i_caller2 = caller_caller();
        i_caller3 = caller_caller_caller();
endif                          /* end LMI_SIM_DEBUG defined and set */ ifdef EVENT_POINTS
        if (lmi_elog_sim)
        {
            KLOG_LOG(LM_KLOG_SIM_LEVEL, LMsimLockFinally, (int) &i_interlock);
            KLOG_LOG(LM_KLOG_SIM_LEVEL, LMendSimLock, (int) &i_interlock);
            KLOG_LOG(LM_KLOG_SIM_LEVEL, LMbeginSimLocked, (int) &i_interlock);
            ELOG_LOG(LMsimLockFinally, (int) &i_interlock);
            ELOG_LOG(LMendSimLock, (int) &i_interlock);
            ELOG_LOG(LMbeginSimLocked, (int) &i_interlock);
        }
endif EVENT_POINTS
        return LM_STAT_DONE;
```

```
}
}   /* end lmi_sim::lock */

/******************************************************************************
lmi_sim::lock_nowait(): lock operation that gives up right away.
******************************************************************************/ lm_stat lmi_sim::lock_nowait()
{
    /* Turn off preemption for a spell ... */
    if (lmi_pflag == 0)
        lmi_ptime = LMI_SIM_NPTIMEOUT;
    lmi_pflag++;

/* See if we can lock it in one try */
    if (atomxmem(&i_interlock, 1) == 0)
    {
        /* We got it in one try! */
        i_nid_pid = lmi_nid_pid;

#if defined(LMI_SIM_DEBUG) && LMI_SIM_DEBUG > 0
        i_caller1 = caller();
        i_caller2 = caller_caller();
        i_caller3 = caller_caller_caller();
endif                          /* end LMI_SIM_DEBUG defined and set */ ifdef EVENT_POINTS
        if (lmi_elog_sim)
        {
            KLOG_LOG(LM_KLOG_SIM_LEVEL, LMsimLockNowait, (int) &i_interlock);
            KLOG_LOG(LM_KLOG_SIM_LEVEL, LMbeginSimLocked, (int) &i_interlock);

ELOG_LOG(LMsimLockNowait, (int) &i_interlock);
            ELOG_LOG(LMbeginSimLocked, (int) &i_interlock);
        }
endif EVENT_POINTS return LM_STAT_DONE;
    }
    else if (i_nid_pid == lmi_nid_pid)
    {
        /* Turn preemption back on */
        lmi_pflag--;

return LM_STAT_BUSY;
    }
    else
    {
        /* Turn preemption back on */
        lmi_pflag--;

return LM_STAT_NOTOWNER;
    }
}   /* end lmi_sim::lock_nowait */

/******************************************************************************
lmi_sim::unlock(): unlock simple lock, give error if not ours.
******************************************************************************/ lm_stat lmi_sim::unlock()
{
    register lm_stat status;

if (ismine())
        status = LM_STAT_DONE;
    else
        status = LM_STAT_SIMUNLOCK;

/* Leave our mark in top half of signature, but preserve last locker pid */
    i_nid_pid = (UNLOCKED_ULOCK << 16) | (i_nid_pid & 0xffff);
    i_interlock = 0;            /* Clear the interlock */
```

```
#ifdef EVENT_POINTS
    if (lmi_elog_sim)
    {
        KLOG_LOG(LM_KLOG_SIM_LEVEL, LMendSimLocked, (int) &i_interlock);
        ELOG_LOG(LMendSimLocked, (int) &i_interlock);
    }
endif EVENT_POINTS /* Turn preemption back on */
    lmi_pflag--;

return status;
}   /* end lmi_sim::unlock */

/**********************************************************************
lmi_sim::sleep_and_unlock(): do user_sleep_and_unlock on given simlock.
Expects that simlock is already locked, but checks.
Assumes that timeout is not negative.
Makes sure in all cases that simlock gets unlocked.
**********************************************************************/ lm_stat lmi_sim::sleep_and_unlock(unsigned pid, int timeout)
{
    register int retval;
    int nid_pid;

if (! ismine())              /* Oops, we don't have it locked... */
    {
        lmi_pflag--;
        return LM_STAT_SIMUNLOCK;
    } ifdef LM_SYSDEF_USER_SLEEP
ifdef EVENT_POINTS
    if (lmi_elog_sim)
    {
        KLOG_LOG(LM_KLOG_SIM_LEVEL, LMsimLockSleepU, (int) &i_interlock);
        KLOG_LOG(LM_KLOG_SIM_LEVEL, LMendSimLocked, (int) &i_interlock);
        ELOG_LOG(LMsimLockSleepU, (int) &i_interlock);
        ELOG_LOG(LMendSimLocked, (int) &i_interlock);
    }
endif EVENT_POINTS /* Leave our mark in top half of signature, but preserve last locker pid */
    nid_pid = (UNLOCKED_USU << 16) | (i_nid_pid & 0xffff);
    i_nid_pid = nid_pid;

/* Go to sleep and unlock the interlock atomically. */
    retval = user_sleep_and_unlock(pid, &i_interlock, timeout);

/* Turn preemption back on */
    /* We're turning preemption back on when we wake up. We've
       preempted ourselves with the user_sleep_and_unlock. */
    lmi_pflag--;

if (retval < 0)
        return lmi_md_errno_stat();

switch (retval)
    {
    case 1:                    /* Process awakened by something... */
        return LM_STAT_DONE;   /* This is the most prefered case. */ case 2:                    /* Timeout expired. */
        return LM_STAT_TIMEOUT;

case 3:                    /* Signal pending, but not handled yet. */
        sigblock(0);           /* Benign sys call will handle signal */
        return LM_STAT_SIGNAL;

default:                   /* This is a crude indication, but */
        return LM_STAT_SIMUNLOCK; /* internal unlock failure is close. */
    }                          /* end switch */
```

```
#else
    /* If we don't have user_sleep_and_unlock, we are stuck for now; */
    /* the substitutes available on Suns are too hard to deal with; */
    /* time to go native and just stick with butterfly based development. */
    return LM_STAT_NIY;
endif
}   /* end lmi_sim::sleep_and_unlock */

/****************************************************************************
lmi_sim::ismine(): returns TRUE if simple lock is locked by this process.
****************************************************************************/ int lmi_sim::ismine()
{
    return i_interlock && (i_nid_pid == lmi_nid_pid);

}   /* end lmi_sim::ismine */

/****************************************************************************
lmi_sim::init(): Simple initialization of simple lock object.
Used by simple constructor.
****************************************************************************/ void lmi_sim::init()
{
    i_interlock = 0;
    i_nid_pid = UNLOCKED_INIT;

#if defined(LMI_SIM_DEBUG) && LMI_SIM_DEBUG > 0
    i_caller1 = 0;
    i_caller2 = 0;
    i_caller3 = 0;
#endif                              /* end LMI_SIM_DEBUG defined and set */
}   /* end lmi_sim::init */

/****************************************************************************
File:     lmi_sim_wait.cxx
Contents: Wait before simple lock/latch retries, a specified period.
System:   BBNACI Programming Environments.
Created:  10-Dec-1988
Author:   rwells Remarks:  This is a separate file so it can be replaced as needed;
for example a testing version could have hooks into the testing environment
to get a lock unlocked after we had waited a specified number of times.

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
****************************************************************************/

/* $Header: lmi_simwait.cxx,v 1.4 90/02/11 12:53:31 rwells Exp $ */ include <lmi.hxx> double lmi_sim_wait_factor = 13.0; /* GLOBAL: 13.0 is rough GP-1000 value */
```

```
/****************************************************************
lmi_sim_wait(): wait a specified interval.
This function is adapted from the code used in the Uniform system.
The units should be roughly 10 microseconds each.
****************************************************************/ void lmi_sim_wait(register int count)
{
    count = (int) (((double) count) * lmi_sim_wait_factor);

while (count > 0)
        count--;
}   /* end lmi_sim_wait */

/****************************************************************
lmi_sim_wait_tune(): tune up spin factor by measuring and correcting.
This function is adapted from the code used in the Uniform system.
The units should be roughly 10 microseconds each.
Its a good idea to call this during initialization and run for 1/10 sec or so;
try to run it in a context where it is very unlikely to get preempted.
****************************************************************/ void lmi_sim_wait_tune(register int count)
{
    realtime firstrtc, actual;
    double requested;           /* requested time in rtc units */
    double correction;          /* correction factor */ firstrtc = getrealtime();
    lmi_sim_wait(count);        /* Wait by spinning */
    actual = getrealtime() - firstrtc; /* Get actual elapsed time in
                                          rtc units */

/* requested rtc */
    requested = (((double) count) * 0.000010) / SECONDS_PER_TICK;
    correction = (requested / (double) actual); /* Correction factor */ lmi_sim_wait_factor *= correction; /* Correct our saved factor */

}   /* end lmi_sim_wait_tune */

/****************************************************************
File:     unsigned64.c
Contents: Routines for a 64 bit unsigned int class
System:   BBNACI Programming Environments.
Created:  17-May-1989
Author:   ksedgwic Remarks:

Copyright 1989 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
****************************************************************/

/* $Header: lmi_unsigned64.c,v 1.3 90/02/13 15:56:57 rwells Exp $ */
```

/****************************************************************
Structure Definition This structure is intended to be completely compatible w/ the
unsigned64 class. Note that unsigned64.hxx is *not* included.
****************************************************************/

```
typedef struct
{
    unsigned    hi;
    unsigned    lo;
} unsigned64;
```

/****************************************************************
C64add(): performs a 64 bit add. The inline cxx overload of the
          "+" operator calls this routine with pointers to the
          operands and the result.
****************************************************************/

```
unsigned64 C64add(ptr1, ptr2)
unsigned64      *ptr1, *ptr2;
{
#ifdef BFLY2
    /* This routine assumes:
        r3 = ptr1
        r4 = ptr2
        r2 = points to place to put the answer
        -ksedgwic 17-may-89
    */ asm("       ld        r9,r4,4");      /* r9 = ptr2->lo */
    asm("       ld        r8,r3,4");      /* r8 = ptr1->lo */
    asm("       addu.co   r9,r9,r8");     /* r9 = r8 + r9 */
    asm("       st        r9,r2,4");      /* r2->lo = r9 */
    asm("       ld        r7,r4,0");      /* r7 = ptr2->hi */
    asm("       ld        r6,r3,0");      /* r6 = ptr1->hi */
    asm("       addu.ci   r7,r7,r6");     /* r7 = r6 + r7 */
    asm("       st        r7,r2,0");      /* r2->hi = r7 */
#endif BFLY2
}
```

/****************************************************************
C64sub(): performs a 64 bit subtract. The inline cxx overload of
          the "-" operator calls this routine with pointers to the
          operands and the result.
****************************************************************/

```
unsigned64 C64sub(ptr1, ptr2)
unsigned64      *ptr1, *ptr2;
{
#ifdef BFLY2
    /* This routine assumes:
        r3 = ptr1
        r4 = ptr2
        r2 = points to place to put the answer
        -ksedgwic 17-may-89
    */ asm("       ld        r9,r4,4");      /* r9 = ptr2->lo */
    asm("       ld        r8,r3,4");      /* r8 = ptr1->lo */
    asm("       subu.co   r8,r8,r9");     /* r8 = r8 - r9 */
    asm("       st        r8,r2,4");      /* r2->lo = r8 */
    asm("       ld        r7,r4,0");      /* r7 = ptr2->hi */
    asm("       ld        r6,r3,0");      /* r6 = ptr1->hi */
    asm("       subu.ci   r6,r6,r7");     /* r6 = r6 - r7 */
    asm("       st        r6,r2,0");      /* r2->hi = r6 */
#endif BFLY2
}
```

```
/****************************************************************
C64mul(): performs a 64x64 multiply.  The least significant 64
          bits of the result are returned.
****************************************************************/ typedef struct
{
    short   s3;  /* a or e */
    short   s2;  /* b or f */
    short   s1;  /* c or g */
    short   s0;  /* d or h */
} shortframe;

unsigned64 C64mul(arg1, arg2)
register shortframe    *arg1, *arg2;
{
    /* We implement the 64x64 bit multiply with 10 16x16 multiplies.
       If each argument is described as a sum of 16 bit components
       then the result can be written as follows:

Argument 1 => (a<<48) + (b<<32) + (c<<16) + (d)
       Argument 2 => (e<<48) + (f<<32) + (g<<16) + (h)

product = ((a*h + d*e + b*g + c*f) << 48) +
                 ((b*h + d*f + c*g) << 32) +
                 ((c*h + d*g) << 16) +
                 ((d*h) << 0)

Six of the possible 16 terms always yield a portion of the
       answer which is outside the range of the 64 bit answer.
    */ unsigned64 product;
    unsigned64 partial;
    register short a, b, c, d;
    register short e, f, g, h;

/* Load the registers */
    a = arg1->s3;
    b = arg1->s2;
    c = arg1->s1;
    d = arg1->s0;
    e = arg2->s3;
    f = arg2->s2;
    g = arg2->s1;
    h = arg2->s0;

/* The first set of products */
    partial.hi = 0;      /* Clear it for starters */
    partial.lo = a*h;
    product = partial;
    partial.lo = d*e;
    product = C64add(&partial, &product);
    partial.lo = b*g;
    product = C64add(&partial, &product);
    partial.lo = c*f;
    product = C64add(&partial, &product);

/* Shift everything over 16 bits.  Anything above the bottom
       16 bits of the product so far will be lost eventually so
       ignore the fact that it just fell off the end. */
    product.lo = product.lo << 16;

/* The second set of products */
    partial.lo = b*h;
    product = C64add(&partial, &product);
    partial.lo = d*f;
    product = C64add(&partial, &product);
    partial.lo = c*g;
    product = C64add(&partial, &product);
```

```
    /* Shift everything over 16 bits. Nothing should be in the
       high unsigned word yet. */
    product.hi = product.lo >> 16;
    product.lo = product.lo << 16;

/* The third set of products */
    partial.lo = c*h;
    product = C64add(&partial, &product);
    partial.lo = d*g;
    product = C64add(&partial, &product);

/* Shift everything over 16 bits. Use the full shift stuff here. */
    product.hi = (product.hi << 16) | (product.lo >> 16);
    product.lo = product.lo << 16;

/* The final partial product */
    partial.lo = d*h;
    product = C64add(&partial, &product);

return product;
}

/****************************************************************
C64div(): performs a 64 by 64 divide.
****************************************************************/ unsigned64 C64div(ptr1, ptr2)
unsigned64      *ptr1, *ptr2;
{

}

/********************************************************************
File:     lmi_pool.cxx
Contents: Implementation of lmi_pool class for storage pool management.
System:   BBNACI Programming Environments.
Created:  12-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
********************************************************************/

/* $Header: lmi_pool.cxx,v 1.9 90/02/13 15:56:53 rwells Exp $ */ include <lmi.hxx> int lmi_pool_dummysum;   /* An anti-optimizer dummy variable.
                            This variable must have external scope
                            to work correctly. */
```

```
/************************************************************************
lmi_pool::init(): initializes an lmi_pool object, given arguments.
The starting address must be word aligned, and len must be an even
multiple of size.  size must be >= 8.
This function did not seem comfortable as a constructor; wants to return
status, and constructors don't return any type.
************************************************************************/ lm_stat lmi_pool::init(char *addr, size_t len, size_t size, lmi_type tid, int nid)
{
    if (addr == NULL)
        return LM_STAT_NULLPTR; /* Address must be non-NULL. */ if (((int) addr) & 0x3)
        return LM_STAT_BADARG;  /* Address must be word aligned. */ if (size < sizeof(lmi_object))
        return LM_STAT_BADSIZE; /*.Make this one easy to spot. */ if ((size % sizeof(int) != 0) || (len <= 0) || (len < size) ||
        ((len % size) != 0))
        return LM_STAT_BADARG;  /* len and size must be good. */ i_sim.init();              /* Initialize the sim field */ i_listp    = NULL;
    i_basep    = addr;
    i_nextrawp = addr;
    i_endp     = addr + len;
    i_size     = size;
    i_tid      = tid;
    i_nid      = nid;

return LM_STAT_DONE;       /* Everything was okay. */

}   /* end lmi_pool::init */

/************************************************************************
lmi_pool::alloc(): allocate and return chunk from pool.

************************************************************************/ lm_stat lmi_pool::alloc(/*OUT*/ char **outpp)
{
    register lm_stat stat;
    register lmi_object *np;

if (outpp == NULL)
         return LM_STAT_NULLPTR; /* Return argument ptr cannot be NULL */ stat = i_sim.lock();       /* Lock pool against other callers */
    if (stat != LM_STAT_DONE)  /* Give up if lock fails. */
        return stat;

/* ----- We have the lock; make sure we unlock it before returning ---- */ if (i_listp != NULL)       /* If we have one on free list, pop it off. */
    {
        np = i_listp;
        /* i_nid and i_dex were set when chunk was first allocated, */
        /*   and should stay set; i_tid has to be reset. */
        np->i_tid = i_tid;     /*.Stamp it with type for pool */
        i_listp = np->i_nextfreep;
        *outpp = (char *) np;  /* Set object ptr into caller variable. */
        return i_sim.unlock(); /* Unlock the pool, and return status. */
    } else if (i_nextrawp < i_endp) /* Return a raw one if one is available */
    {
        np = (lmi_object *) i_nextrawp;
```

```
        np->i_nid = i_nid;       /* Stamp it with node number for pool */
        np->i_dex = ((i_nextrawp - i_basep) / i_size); /* Stamp with index */
        np->i_tid = i_tid;       /* Stamp it with type for pool */

*outpp = i_nextrawp;     /* Set raw object ptr into caller variable. */
        i_nextrawp += i_size;    /* Bump the next pointer past it. */
        return i_sim.unlock();   /* Unlock the pool, and return status. */
    }
    else                         /* No space left. */
    {
        /* Unlock the pool and return LM_STAT_NOSPACE failure, */
        /*   but return unlock status if unlock fails. */
        stat = i_sim.unlock();
        return (stat == LM_STAT_DONE) ? LM_STAT_NOSPACE : stat;
    }

}   /* end lmi_pool::alloc */

/************************************************************************
lmi_pool::free(): put a pool chunk back on the free list.
************************************************************************/ lm_stat lmi_pool::free(char *inp)
{
    register lm_stat stat;
    register lmi_object *np;

if (inp == NULL)
        return LM_STAT_NULLPTR; /* Argument ptr cannot be NULL */ stat = i_sim.lock();        /* Lock pool against other callers */
    if (stat != LM_STAT_DONE)   /* Give up if lock fails. */
        return stat;

/* ----- We have the lock; make sure we unlock it before returning ---- */ np = (lmi_object *) inp;    /* Push chunk onto free list */
    np->i_tid = IMI_FREE;       /* Mark chunk as free. */
    np->i_nextfreep = i_listp;
    i_listp = np;
    return i_sim.unlock();      /* Unlock the pool, and return status. */

}   /* end lmi_pool::free */

/************************************************************************
lmi_pool::stat(): return statistics about pool object.
************************************************************************/ lm_stat lmi_pool::stat(/*OUT*/ lm_stpoolp lspp)
{
    register lm_stat    status;
    register lmi_object *np;
    register int        freecnt;

if (lspp == NULL)
        return LM_STAT_NULLPTR; /* Argument ptr cannot be NULL */ status = i_sim.lock();       /* Lock pool against other callers */
    if (status != LM_STAT_DONE)  /* Give up if lock fails. */
        return status;

/* ----- We have the lock; make sure we unlock it before returning ---- */ lspp->totcnt = (i_endp - i_basep) / i_size;
    lspp->rawcnt = (i_endp - i_nextrawp) / i_size;

freecnt = 0;
    for (np = i_listp; np != NULL; np = np->i_nextfreep)
        freecnt++;

lspp->freecnt = freecnt;
    lspp->usecnt = (lspp->totcnt - lspp->freecnt) - lspp->rawcnt;
```

```
    lspp->size = i_size;
    lspp->basep = i_basep;

return i_sim.unlock();    /* Unlock the pool, and return status. */

}   /* end lmi_pool::stat */

/*****************************************************************************
lmi_pool::touch(): touch all of the pages associated with a pool.
This method is used to get virtual memory faults over with.. There are
no error returns from this method.  A global variable "lmi_pool_dummysum"
is side affected by the touched word to make sure that the compilers
don't optimize this statement away.
*****************************************************************************/ void lmi_pool::touch()
{
    register char *ptr;

/* For each page in the pool, read a char into the dummy variable. */
    for (ptr = i_basep; ptr < i_endp; ptr += PAGESIZE)
        lmi_pool_dummysum += *ptr;

}

/*****************************************************************************
File:     lmi_md.c
Contents: Machine dependent helper functions for lock manager library.
System:   BBNACI Programming Environments.
Created:  15-Aug-1988
Author:   rwells Remarks:  Written in C to avoid problems with old-fashioned header files.

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*****************************************************************************/

/* $Header: lmi_md.c,v 1.8 90/02/13 15:56:48 rwells Exp $ */ include <stdio.h>
include <sys/file.h>
include <lockman.h> ifndef LM_SYSDEF_GETRTC
include <sys/time.h>
endif ifdef LM_SYSDEF_CLUSTER
include <sys/cluster.h>
#include <sys/kern_return.h>
#include <mach.h>
#include <sys/vm_mapmem.h>
endif /*****************************************************************************
lmi_md_errno_stat(): return lm_stat code for current errno value.
*****************************************************************************/
```

```
lm_stat lmi_md_errno_stat()
{
    extern int errno;            /* Unix/POSIX error code global. */ return (lm_stat) (((int) LM_STAT_ERRNO_FIRST) + errno);
}   /* end lmi_md_errno_stat */

/************************************************************************
lmi_md_cluster(): returns info about current cluster.
On machines that don't support BBNACI cluster system calls, make it look
like a cluster of size 1.
************************************************************************/ lm_stat lmi_md_cluster(cidp, numnodesp, nidp)
int *cidp;                     /* OUT: our cluster id */
int *numnodesp;                /* OUT: number of nodes in cluster */
int *nidp;                     /* OUT: our node id in cluster */
{ ifdef LM_SYSDEF_CLUSTER
    kern_return_t kr_status;
    int retcnt, cid, homenid, node_count;
    struct home_node_data homenode;
    struct cluster_status1 clustat;

kr_status = cluster_stat(0, GET_HOME_NODE, &homenode, &retcnt);
    if (kr_status != KERN_SUCCESS)
        return (lm_stat) (LM_STAT_KERNEL_FIRST + kr_status);

cid = homenode.home_cluster_id;
    homenid = homenode.home_pnn;

kr_status = cluster_stat(cid, GET_CLUSTER_STATUS, &clustat, &retcnt);
    if (kr_status != KERN_SUCCESS)
        return (lm_stat) (LM_STAT_KERNEL_FIRST + kr_status);

node_count = clustat.node_count;

*cidp = cid;
    *numnodesp = node_count;
    *nidp = homenid;
    return LM_STAT_DONE;
else
    *cidp = 0;
    *numnodesp = 1;
    *nidp = 0;
    return LM_STAT_DONE;
#endif
}   /* end lmi_md_cluster */

/************************************************************************
lmi_md_alloc(): allocate storage on specific node.
************************************************************************/ lm_stat lmi_md_alloc(address, size, nid, basepp)
char *address;
size_t size;
int nid;
/*OUT*/ char **basepp;
{
ifdef LM_SYSDEF_CLUSTER
    kern_return_t kr_status;
    int anywhere = (address == NULL); /* TRUE if okay to allocate anywhere. */
    vm_address_t vmaddr = (vm_address_t) address;
    vm_task_t task;

task = task_self();

kr_status = vm_allocate_and_bind(task, &vmaddr, size, anywhere, nid);
    if (kr_status != KERN_SUCCESS)
        return (lm_stat) (((int) LM_STAT_KERNEL_FIRST) + (int) kr_status);
```

```
        kr_status = vm_inherit(task, vmaddr, size, VM_INHERIT_SHARE);
        if (kr_status != KERN_SUCCESS)
            return (lm_stat) (((int) LM_STAT_KERNEL_FIRST) + (int) kr_status);

*basepp = (char *) vmaddr;
        return LM_STAT_DONE;
else
        extern char *malloc();
        register char *cp;

cp = malloc((unsigned) size);
        if (cp == NULL)
            return lmi_md_errno_stat();

*basepp = cp;

return LM_STAT_DONE;
#endif
}       /* end lmi_md_alloc */

/****************************************************************************
lmi_md_mapmem(): map file memory on specific node.
****************************************************************************/ lm_stat lmi_md_mapmem(address, size, fd, offset, nid, basepp)
char *address;
size_t size;
int fd;
off_t offset;
int nid;
/*OUT*/ char **basepp;
{
ifdef LM_SYSDEF_CLUSTER
        kern_return_t kret;
        vm_address_t vmaddr = (vm_address_t) address;
        int flags = VM_MAPMEM_TRUNCATE;

if (address == NULL)
            flags |= VM_MAPMEM_ANYWHERE;

kret = vm_mapmem(task_self(), &vmaddr, size, flags, fd, offset, nid);
        if (kret != KERN_SUCCESS)
            return (lm_stat) (((int) LM_STAT_KERNEL_FIRST) + (int) kret);

kret = vm_inherit(task_self(), vmaddr, size, VM_INHERIT_SHARE);
        if (kret != KERN_SUCCESS)
            return (lm_stat) (((int) LM_STAT_KERNEL_FIRST) + (int) kret);

kret = vm_cache_setup(task_self(), vmaddr, size, VM_CACHE_INHIBIT);
        if (kret != KERN_SUCCESS)
            return (lm_stat) (((int) LM_STAT_KERNEL_FIRST) + (int) kret);

*basepp = (char *) vmaddr;
        return LM_STAT_DONE;
else
        /* It is no longer really useful to try emulating this stuff on */
        /* non butterfly systems. -rwells, 21-Jan-89 */
        return LM_STAT_NIY;
endif
}       /* end lmi_md_mapmem */

/****************************************************************************
lmi_md_deallocate(): Deallocate range of memory.
****************************************************************************/ lm_stat lmi_md_deallocate(address, size)
char *address;
size_t size;
{
ifdef LM_SYSDEF_CLUSTER
        kern_return_t kret;
        vm_address_t vmaddr = (vm_address_t) address;
        int flags = VM_MAPMEM_TRUNCATE;
```

```
        if (address == NULL)
            flags |= VM_MAPMEM_ANYWHERE;

kret = vm_deallocate(task_self(), (vm_address_t)address, (vm_size_t)size);
    if (kret != KERN_SUCCESS)
        return (lm_stat) (((int) LM_STAT_KERNEL_FIRST) + (int) kret);
    else
        return LM_STAT_DONE;
else
    /* It is no longer really useful to try emulating this stuff on */

/* non butterfly systems. -rwells, 21-Jan-89 */
    return LM_STAT_NIY;
endif
}   /* end lmi_md_deallocate */

/************************************************************************
atomxmem(): debugging substitute for atomxmem function.
This substitute allows some debugging on a sun workstation, but isn't really
atomic at all.
************************************************************************/ ifdef LM_SYSDEF_ATOMDUMMY
int atomxmem(ip, v)
int *ip;
int v;
{
    register int tmp;

/* This isn't really atomic, but best I can easily do on the sun. */
    /* I don't really intend to get them into process races in testing */
    /* on the sun... */ tmp = *ip;
    *ip = v;
    return tmp;
}
#endif

/************************************************************************
lmi_md_open(): do Unix open on file to be mapped into lock manager mem.
************************************************************************/ lm_stat lmi_md_open(name, fdp)
char *name;
int *fdp;
{
    if ((*fdp = open(name, O_RDWR | O_CREAT, 0600)) < 0)
        return lmi_md_errno_stat();
    else
        return LM_STAT_DONE;
}   /* end lmi_md_open */

/************************************************************************
lmi_md_close(): do Unix close on mapmemed file.
************************************************************************/ lm_stat lmi_md_close(fd)
int fd;
{
    if (close(fd) == -1)
        return lmi_md_errno_stat();
    else
        return LM_STAT_DONE;
}   /* end lmi_md_close */

/************************************************************************
File:     lm_msg.cxx
Contents: handle status code messages and lookups.
System:   BBNACI Programming Environments.
Created:  10-Aug-1988
Author:   rwells
```

Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
**********************************************************************/

```
/* $Header: lm_msg.cxx,v 1.9 90/02/13 15:56:29 rwells Exp $ */ include <lmi.hxx> ifdef LM_SYSDEF_KERN_RETURN
include <sys/kern_return.h>
#endif

/* ----- Local structure definition ----- */ typedef struct
{
    lm_stat    code;         /* Status code, for self-check */
    char       *msg;         /* Message for code */
} lm_msg;

/* ----- Initialized static structure with message data. ----- */ static lm_msg s_data[] =
{
{LM_STAT_FIRST,          0},
{LM_STAT_BADARG,         "Bad argument value"},
{LM_STAT_BADCLUSTER,     "Must be in creation cluster"},
{LM_STAT_BADCREATE,      "Can't call lm_create again"},
{LM_STAT_BADLEVEL,       "Bad lock level"},
{LM_STAT_BADNAME,        "Bad name or name length"},
{LM_STAT_BADNID,         "Node number out of range"},
{LM_STAT_BADOBJECT,      "Bad object type"},
{LM_STAT_BADOPTION,      "Bad option mask"},
{LM_STAT_BADPID,         "No such process"},
{LM_STAT_BADSIZE,        "Bad struct size"},
{LM_STAT_BADVERSION,     "Library version incompatibility"},
{LM_STAT_BUSY,           "Busy with previous request"},
{LM_STAT_CANCELLED,      "Conversion was cancelled"},
{LM_STAT_DEADLOCK,       "Deadlock victim"},
{LM_STAT_DETACHED,       "Process is detached"},
{LM_STAT_DONE,           "Done"},
{LM_STAT_DUBVALUE,       "Done, got dubious value"},
{LM_STAT_FREE,           "Object not in use"},
{LM_STAT_GOTVALUE,       "Done, got value"},
{LM_STAT_IDLE,           "No request pending"},
{LM_STAT_MAXBYTES,       "Needs more than maxbytes storage"},
{LM_STAT_MAXLOCKS,       "Too many locks"},
{LM_STAT_MAXOLOCKS,      "Too many open locks on resource"},
{LM_STAT_MAXPROC,        "Too many attaches"},
{LM_STAT_MAXRES,         "Too many resources"},
{LM_STAT_NIY,            "Not implemented yet"},
{LM_STAT_NOCREATE,       "lm_create not called yet"},
{LM_STAT_NOSPACE,        "No space left in pool"},
```

```
{LM_STAT_NOTOWNER,      "Not the current lock owner"},
{LM_STAT_NOTQUEUED,     "Not done, would have blocked"},
{LM_STAT_NOVALUE,       "Done, got no value"},
{LM_STAT_NULLPTR,       "Null pointer argument"},
{LM_STAT_POSTED,        "Wakeup by lm_post"},
{LM_STAT_QEMPTY,        "Internal queue empty"},
{LM_STAT_QFAIL,         "Internal queue failed"},
{LM_STAT_QUEUED,        "Request is now pending"},
{LM_STAT_SIGNAL,        "Signal ended wait"},
{LM_STAT_SIMLOCK,       "Internal lock timeout"},
{LM_STAT_SIMUNLOCK,     "Internal unlock when not owner"},
{LM_STAT_TIMEOUT,       "Got timeout"},
{LM_STAT_U64VALUE,      "Done, got u64 counter value"},
{LM_STAT_U64MAX,        "Maximum value for u64 counter"},
{LM_STAT_LAST,          0},
};

/**********************************************************************
s_unknown(): return customized unknown error code message.
**********************************************************************/ static char *s_unknown(lm_stat status)
{
    static char s_buffer[40];

(void) sprintf(s_buffer, "Unknown status code %d", (int) status);

return s_buffer;
}   /* end s_unknown */

/**********************************************************************
lm_stat_msg(): return pointer to static status message for code.
**********************************************************************/ char *lm_stat_msg(lm_stat status)
{
    register char *msgp;

if (LM_STAT_FIRST <= status && status <= LM_STAT_LAST)
    {
        msgp = s_data[status].msg;

if (s_data[status].code != status)
            return "Bad status message table";

if (msgp != NULL)
            return msgp;
    } else if (LM_STAT_ERRNO_FIRST <= status && status <= LM_STAT_ERRNO_LAST)
    {
        extern int   sys_nerr;
        extern char *sys_errlist[];
        int errno = ((int) status) - LM_STAT_ERRNO_FIRST;

if (errno < sys_nerr)
        {
            msgp = sys_errlist[errno];
            if (msgp != NULL)
                return msgp;
        }
    } else if (LM_STAT_KERNEL_FIRST <= status && status <= LM_STAT_KERNEL_LAST)
    {
#ifdef LM_SYSDEF_KERN_RETURN
        register kern_return_t code = ((int) status) - LM_STAT_KERNEL_FIRST;

switch (code)
        {
        case KERN_SUCCESS:
            return "Kernel success";
```

```
            case KERN_INVALID_ADDRESS:
                return "Kernel invalid address";
            case KERN_PROTECTION_FAILURE:
                return "Kernel protection failure";
            case KERN_NO_SPACE:
                return "Kernel no space";
            case KERN_INVALID_ARGUMENT:
                return "Kernel invalid argument";
            case KERN_FAILURE:
                return "Kernel failure";
            case KERN_RESOURCE_SHORTAGE:
                return "Kernel resource shortage";
            case KERN_NOT_RECEIVER:
                return "Kernel not receiver";
            case KERN_NO_ACCESS:
                return "Kernel no access";
        } /* end switch */
#endif
    } return s_unknown(status);   /* Many failed cases fall into here. */

}   /* end lm_stat_msg */

/************************************************************************
File:     lm_prcookie.cxx
Contents: Default print routine for lock manager cookies.
System:   BBNACI Programming Environments.
Created:  13-Oct-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
************************************************************************/

/* $Header: lm_prcookie.cxx,v 1.4 90/02/11 12:52:07 rwells Exp $ */ include <lmi.hxx>

/************************************************************************
lm_user_print_cookie():
lm_print_cookie(): print application cookie, minimally.
Prints 'NULL' or 'non-NULL'.
This function can be replaced by the client with an application specific
function, to print cookies the application passes to the lock manager for
later parameter usage with completion and notify function calls.
************************************************************************/

/* BELMONT: Added lm_user_print_cookie to allow the user to supply
   his/her own "printf" style function. -ksedgwic 21-Feb-89 */ void lm_user_print_cookie(lm_user_printfunp pfun, lm_voidp cookiep)
{
```

```
    if (cookiep == NULL)
        (*pfun)("NULL");
    else
        (*pfun)("non-NULL");
}   /* end lm_user_print_cookie */ void lm_print_cookie(lm_voidp cookiep)
{
    lm_user_print_cookie((lm_user_printfunp) printf, cookiep);

}   /* end lm_print_cookie */

/*********************************************************************
File:     lm_prendfun.cxx
Contents: Default print routine for lock manager completion function pointer.
System:   BBNACI Programming Environments.
Created:  13-Oct-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*********************************************************************/

/* $Header: lm_prendfun.cxx,v 1.4 90/02/11 12:52:10 rwells Exp $ */ include <lmi.hxx>

/*********************************************************************
lm_user_print_endfun():
lm_print_endfun(): print completion function pointer, minimally.
Prints 'NULL' or 'non-NULL'.
This function can be replaced by the client with an application specific
function, to identify application specific completion functions.
*********************************************************************/

/* BELMONT: Added lm_user_print_endfun to allow the user to supply
   his/her own "printf" style function. -ksedgwic 21-Feb-89 */ void lm_user_print_endfun(lm_user_printfunp pfun, lm_endfunp endfunp)
{
    if (endfunp == NULL)
        (*pfun)("NULL");
    else
        (*pfun)("non-NULL");
}   /* end lm_user_print_endfun */ void lm_print_endfun(lm_endfunp endfunp)
{
    lm_user_print_endfun((lm_user_printfunp) printf, endfunp);

}   /* end lm_print_endfun */
```

```
/************************************************************************
File:     lm_print.cxx
Contents: Debugging print functions for lock manager stat structures.
System:   BBNACI Programming Environments.
Created:  16-Aug-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
************************************************************************/

/* $Header: lm_print.cxx,v 1.10 90/02/11 12:52:13 rwells Exp $ */ include <lmi.hxx> static char *s_id_proc(lm_procp lmpp);
static char *s_id_lock(lm_lockp lmlp);
static char *s_id_res(lm_resp lmrp);

/************************************************************************
lm_user_print_pool():
lm_print_pool(): print lm_stpool structure on stdout for testing.
Only prints base address if label is null; it is useful for debugging, but
in test scripts the label should be provided and the base address suppressed,
as the address will vary from load to load.
************************************************************************/ void lm_user_print_pool(lm_user_printfunp pfun, char *label, lm_stpoolp lspp)
{
    if (label != NULL)
        (*pfun)("%s", label);

if (lspp == NULL)
        (*pfun)("[NULL]\n");
    else
    {
        (*pfun)("use %d free %d raw %d tot %d size %d",
                lspp->usecnt, lspp->freecnt, lspp->rawcnt,
                lspp->totcnt, lspp->size);

if (label == NULL)
            (*pfun)(" base %x)\n", (int) lspp->basep);
        else
            (*pfun)(")\n");
    }

}   /* end lm_user_print_pool */ void lm_print_pool(char *label, lm_stpoolp lspp)
{
```

```c
        lm_user_print_pool((lm_user_printfunp) printf, label, lspp);

}   /* end lm_print_pool */

/******************************************************************
lm_user_print_node():
lm_print_node(): print lm_stnode structure on stdout for testing.
******************************************************************/ void lm_user_print_node(lm_user_printfunp pfun, char *label, lm_stnodep lsnp)
{
    register int i, len;

if (label != NULL)
        (*pfun)("%s", label);

if (lsnp == NULL)
        (*pfun)("[NULL]\n");
    else
    {
        (*pfun)("(cid %d nid %d nodes %d vallen %d bytes %d)\n",
                lsnp->cid, lsnp->nid, lsnp->numnodes, lsnp->valuelen,
                lsnp->nodebytes);

if (label != NULL)
            (*pfun)("%s", label);
        lm_user_print_pool(pfun, "lockpool ", &(lsnp->lockpool));

if (label != NULL)
            (*pfun)("%s", label);
        lm_user_print_pool(pfun, "procpool ", &(lsnp->procpool));

if (label != NULL)
            (*pfun)("%s", label);
        lm_user_print_pool(pfun, "respool ", &(lsnp->respool));

if (label != NULL)
            (*pfun)("%s", label);
        (*pfun)("(nodes %d:", lsnp->nodecnt);
        if (lsnp->nodepp != NULL)
        {
            len = ((lsnp->nodecnt < lsnp->nodemaxcnt) ?
                    lsnp->nodecnt : lsnp->nodemaxcnt);
            for (i = 0; i < len; i++)
            {
                register lmi_nodep lminp = (lmi_nodep) (lsnp->nodepp[i]);
                (*pfun)(" %d.%d", lminp->cid(), lminp->nid());
            }
            (*pfun)(")\n");
        }   /* end for node list */ if (label != NULL)
            (*pfun)("%s", label);
        (*pfun)("(procs %d:", lsnp->proccnt);
        if (lsnp->procpp != NULL)
        {
            len = ((lsnp->proccnt < lsnp->procmaxcnt) ?
                    lsnp->proccnt : lsnp->procmaxcnt);
            for (i = 0; i < len; i++)
            {
                (*pfun)(" %s", s_id_proc(lsnp->procpp[i]));
            }
            (*pfun)(")\n");
        }   /* end for proc list */

}
}   /* end lm_user_print_node */ void lm_print_node(char *label, lm_stnodep lsnp)
{
    lm_user_print_node((lm_user_printfunp) printf, label, lsnp);

}   /* end lm_print_node */
```

```c
/****************************************************************************
lm_user_print_proc():
lm_print_proc(): print lm_stproc structure on stdout for testing.
****************************************************************************/ void lm_user_print_proc(lm_user_printfunp pfun, char *label, lm_stprocp lspp)
{
    register int i, len;

if (label != NULL)
        (*pfun)("%s", label);

if (lspp == NULL)
        (*pfun)("[NULL]\n");
    else
    {
        (*pfun)("(nid.dex P%d.%d)\n", lspp->nid, lspp->dex);

if (label != NULL)
            (*pfun)("%s", label);
        if (lspp->pid == lmi_md_getpid())
            (*pfun)("(pid <ok> ");
        else
            (*pfun)("(pid %d ", lspp->pid);

(*pfun)("waiting %d posted %d check %d)\n",
                lspp->waiting, lspp->posted, lspp->check);

if (label != NULL)
            (*pfun)("%s", label);
        (*pfun)("(locks %d:", lspp->lockcnt);
        if (lspp->lockpp != NULL)
        {
            len = ((lspp->lockcnt < lspp->lockmaxcnt) ?
                    lspp->lockcnt : lspp->lockmaxcnt);
            for (i = 0; i < len; i++)
            {
                (*pfun)(" %s", s_id_lock(lspp->lockpp[i]));
            }
        }                       /* end for lock list */
        (*pfun)(")\n");
    }   /* end if not null */
}   /* end lm_user_print_proc */ void lm_print_proc(char *label, lm_stprocp lspp)
{
    lm_user_print_proc((lm_user_printfunp) printf, label, lspp);

}   /* end lm_print_proc */

/****************************************************************************
lm_user_print_hash():
lm_print_hash(): print lm_sthash structure on stdout for testing.
****************************************************************************/ void lm_user_print_hash(lm_user_printfunp pfun, char *label, lm_sthashp lshp)
{
    register int i, len;

if (label != NULL)
        (*pfun)("%s", label);

if (lshp == NULL)
        (*pfun)("[NULL]\n");
    else
    {
        (*pfun)("(hashsize %d nodesize %d)\n", lshp->hashsize, lshp->nodesize);

if (label != NULL)
            (*pfun)("%s", label);
        (*pfun)("(buckets %d:", lshp->buckcnt);
        if (lshp->buckp != NULL)
```

```
        {
            len = ((lshp->buckcnt < lshp->buckmaxcnt) ?
                    lshp->buckcnt : lshp->buckmaxcnt);
            for (i = 0; i < len; i++)
            {
                (*pfun)(" %d", lshp->buckp[i]);
            }
        }                       /* end for bucket count list */
        (*pfun)(")\n");

}                           /* end if non-null */
}       /* end lm_user_print_hash */ void lm_print_hash(char *label, lm_sthashp lshp)
{
    lm_user_print_hash((lm_user_printfunp) printf, label, lshp);

}       /* end lm_print_hash */

/***********************************************************************
lm_user_print_lock():
lm_print_lock(): print lm_stlock structure on stdout for testing.
***********************************************************************/ void lm_user_print_lock(lm_user_printfunp pfun, char *label, lm_stlockp lslp)
{
    register size_t len;

if (label != NULL)
        (*pfun)("%s", label);

if (lslp == NULL)
        (*pfun)("[NULL]\n");
    else
    {
        (*pfun)("(nid.dex L%d.%d)\n", lslp->nid, lslp->dex);

if (label != NULL)
            (*pfun)("%s", label);
        (*pfun)("(level %d)\n", lslp->level);

if (label != NULL)
            (*pfun)("%s", label);
        (*pfun)("(req_stat \"%s\"", lm_stat_msg(lslp->req_stat));
        if (lslp->req_stat != LM_STAT_IDLE)
        {
            (*pfun)(" req_level %d req_opts 0x%x)\n", lslp->req_level,
                    lslp->req_opts);
            if (label != NULL)
                (*pfun)("%s", label);
            (*pfun)("(req_endp ");
            lm_user_print_endfun(pfun, lslp->req_endp);
            (*pfun)(" req_notp ");
            lm_user_print_notfun(pfun, lslp->req_notp);
            (*pfun)(" req_cook ");
            lm_user_print_cookie(pfun, lslp->req_cook);
            (*pfun)(")\n");

if (label != NULL)
                (*pfun)("%s", label);
            (*pfun)("(end_stat \"%s\" end_valp ",
                    lm_stat_msg(lslp->end_stat));
            lm_user_print_valp(pfun, lslp->end_valp);
        }
        (*pfun)(")\n");

if (label != NULL)
            (*pfun)("%s", label);
        (*pfun)("(cur_notp ");
        lm_user_print_notfun(pfun, lslp->cur_notp);
        (*pfun)(" cur_cook ");
        lm_user_print_cookie(pfun, lslp->cur_cook);
        (*pfun)(")\n");
```

```c
        if (label != NULL)
            (*pfun)("%s", label);
        (*pfun)("(resp %s procp %s)\n",s_id_res(lslp->resp),
               s_id_proc(lslp->procp));

if (label != NULL)
            (*pfun)("%s", label);
        (*pfun)("(notify %d)\n", lslp->notify);

if (label != NULL)
            (*pfun)("%s", label);
        (*pfun)("(value %d:", lslp->vallen);
        if (lslp->valp != NULL)
        {
            len = ((lslp->vallen < lslp->valmaxlen) ?
                   lslp->vallen : lslp->valmaxlen);

(*pfun)(" ");
            lm_user_print_value(pfun, lslp->valp, len);
        } /* end for value buffer */
        (*pfun)(")\n");

} /* end if non-null */
} /* end lm_user_print_lock */ void lm_print_lock(char *label, lm_stlockp lslp)
{
    lm_user_print_lock((lm_user_printfunp) printf, label, lslp);

} /* end lm_print_lock */

/************************************************************************
lm_user_print_res():
lm_print_res(): print lm_stres structure on stdout for testing.
************************************************************************/ void lm_user_print_res(lm_user_printfunp pfun, char *label, lm_stresp lsrp)
{
    register size_t i, len;

if (label != NULL)
        (*pfun)("%s", label);

if (lsrp == NULL)
        (*pfun)("[NULL]\n");
    else
    {
        (*pfun)("(nid.dex R%d.%d)\n", lsrp->nid, lsrp->dex);

if (label != NULL)
            (*pfun)("%s", label);
        (*pfun)("(name %d:", lsrp->namelen);

if (lsrp->name != NULL)
    {
        len = ((lsrp->namelen < lsrp->namemaxlen) ?
               lsrp->namelen : lsrp->namemaxlen);

(*pfun)(" \"");
        for (i = 0; i < len; i++)
        {
            int val = (lsrp->name[i] & 0377);
            if (val >= ' ' && val < 0177)
                (*pfun)("%c", val);
            else
                (*pfun)("\\%03o", val);
        }
        (*pfun)("\"");
    }                      /* end for name */
    (*pfun)(")\n");
```

```
if (label != NULL)
    (*pfun)("%s", label);
(*pfun)("(lockcnt %d parentp %s childcnt %d)\n",
    lsrp->lockcnt, s_id_res(lsrp->parentp), lsrp->childcnt);

if (label != NULL)
    (*pfun)("%s", label);
(*pfun)("(levmask 0x%x)\n", lsrp->levmask);

if (label != NULL)
    (*pfun)("%s", label);
(*pfun)("(reqmask 0x%x)\n", lsrp->reqmask);

if (label != NULL)
    (*pfun)("%s", label);
(*pfun)("(gotcnts:");
for (i = 0; i < LM_NUM_LEVELS; i++)
    (*pfun)(" %d", lsrp->gotcnts[i]);
(*pfun)(")\n");

if (label != NULL)
    (*pfun)("%s", label);
(*pfun)("(reqcnts:");
for (i = 0; i < LM_NUM_LEVELS; i++)
    (*pfun)(" %d", lsrp->reqcnts[i]);
(*pfun)(")\n");

if (label != NULL)
    (*pfun)("%s", label);
(*pfun)("(got %d:", lsrp->gotcnt);
if (lsrp->gotlpp != NULL)
{
    len = ((lsrp->gotcnt < lsrp->gotmaxcnt) ?
        lsrp->gotcnt : lsrp->gotmaxcnt);
    for (i = 0; i < len; i++)
    {
        (*pfun)(" %s", s_id_lock(lsrp->gotlpp[i]));
    }
} /* end for lock list */
(*pfun)(")\n");

if (label != NULL)
    (*pfun)("%s", label);
(*pfun)("(req %d:", lsrp->reqcnt);
if (lsrp->reqlpp != NULL)
{
    len = ((lsrp->reqcnt < lsrp->reqmaxcnt) ?
        lsrp->reqcnt : lsrp->reqmaxcnt);
    for (i = 0; i < len; i++)
    {
        (*pfun)(" %s", s_id_lock(lsrp->reqlpp[i]));
    }
} /* end for lock list */
(*pfun)(")\n");

if (label != NULL)
    (*pfun)("%s", label);
(*pfun)("(notify %d:", lsrp->notcnt);
if (lsrp->notlpp != NULL)
{
    len = ((lsrp->notcnt < lsrp->notmaxcnt) ?
        lsrp->notcnt : lsrp->notmaxcnt);
    for (i = 0; i < len; i++)
    {
        (*pfun)(" %s", s_id_lock(lsrp->notlpp[i]));
    }
} /* end for lock list */
(*pfun)(")\n");

if (label != NULL)
    (*pfun)("%s", label);
(*pfun)("(valstat \"%s\")\n", lm_stat_msg(lsrp->valstat));
```

```c
        if (label != NULL)
            (*pfun)("%s", label);
        (*pfun)("(value %d:", lsrp->vallen);
        if (lsrp->valp != NULL)
        {
            len = ((lsrp->vallen < lsrp->valmaxlen) ?
                lsrp->vallen : lsrp->valmaxlen);

(*pfun)(" ");
            lm_user_print_value(pfun, lsrp->valp, len);
        }                       /* end for value buffer */
        (*pfun)(")\n");

}                           /* end if non-NULL */
}                               /* end lm_print_res */ void lm_print_res(char *label, lm_stresp lsrp)
{
    lm_user_print_res((lm_user_printfunp) printf, label, lsrp);

}   /* end lm_print_res */

/**********************************************************************
s_id_proc(): return printable static string identifying proc object.
Returned string should be copied or printed before the next call since
the same static buffers are used for each call.
**********************************************************************/ static char *s_id_proc(lm_procp lmpp)
{
    static char buf[32];
    lm_stat status;
    lm_stproc stpblk;

stpblk.lockmaxcnt = 0;
    status = lm_stat_proc(lmpp, sizeof(lm_stproc), &stpblk);

switch (status)
    {
    case LM_STAT_DONE:
        sprintf(buf, "P%d.%d", stpblk.nid, stpblk.dex);
        return buf;

case LM_STAT_FREE:
        sprintf(buf, "F%d.%d", stpblk.nid, stpblk.dex);

return buf;

case LM_STAT_NULLPTR:
        return "NULL";

default:
        return "BAD";
    }
}   /* end s_id_proc */

/**********************************************************************
s_id_lock(): return printable static string identifying lock object.
Returned string should be copied or printed before the next call since
the same static buffers are used for each call.
**********************************************************************/ static char *s_id_lock(lm_lockp lmlp)
{
    static char buf[32];
    lm_stat status;
    lm_stlock stlblk;

stlblk.valmaxlen = 0;

status = lm_stat_lock(lmlp, sizeof(lm_stlock), &stlblk);
```

```
    switch (status)
    {
    case LM_STAT_DONE:
        sprintf(buf, "L%d.%d", stlblk.nid, stlblk.dex);
        return buf;

case LM_STAT_FREE:
        sprintf(buf, "F%d.%d", stlblk.nid, stlblk.dex);
        return buf;

case LM_STAT_NULLPTR:
        return "NULL";

default:
        return "BAD";
    }
}   /* end s_id_lock */

/***********************************************************************
s_id_res(): return printable static string identifying res object.
Returned string should be copied or printed before the next call since
the same static buffers are used for each call.
***********************************************************************/ static char *s_id_res(lm_resp lmrp)
{
    static char buf[32];
    lm_stat status;
    lm_stres strblk;

strblk.namemaxlen = 0;
    strblk.gotmaxcnt = 0;
    strblk.reqmaxcnt = 0;
    strblk.notmaxcnt = 0;
    strblk.valmaxlen = 0;
    status = lm_stat_res(lmrp, sizeof(lm_stres), &strblk);

switch (status)
    {
    case LM_STAT_DONE:
        sprintf(buf, "R%d.%d", strblk.nid, strblk.dex);
        return buf;

case LM_STAT_FREE:
        sprintf(buf, "F%d.%d", strblk.nid, strblk.dex);
        return buf;

case LM_STAT_NULLPTR:
        return "NULL";

default:
        return "BAD";
    }
}   /* end s_id_res */

/***********************************************************************
File:     lm_prnotfun.cxx
Contents: Default print routine for lock manager notify function pointer.
System:   BBNACI Programming Environments.
Created:  13-Oct-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.
```

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*****************************************************************/

/* $Header: lm_prnotfun.cxx,v 1.4 90/02/11 12:52:17 rwells Exp $ */ include <lmi.hxx>

/*****************************************************************
lm_user_print_notfun():
lm_print_notfun(): print notify function pointer, minimally.
Prints 'NULL' or 'non-NULL'.
This function can be replaced by the client with an application specific
function, to identify application specific notify functions.
*****************************************************************/

/* BELMONT: Added lm_user_print_notfun to allow user to supply
   his/her own "printf" style function. -ksedgwic 21-Feb-89 */ void lm_user_print_notfun(lm_user_printfunp pfun, lm_notfunp notfunp)
{
    if (notfunp == NULL)
        (*pfun)("NULL");
    else
        (*pfun)("non-NULL");
}   /* end lm_user_print_notfun */ void lm_print_notfun(lm_notfunp notfunp)
{
    lm_user_print_notfun((lm_user_printfunp) printf, notfunp);

}   /* end lm_print_notfun */

/*****************************************************************
File:     lm_prvalp.cxx
Contents: Default print routine for lock manager user value buffer pointer.
System:   BBNACI Programming Environments.
Created:  13-Oct-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
*****************************************************************/

/* $Header: lm_prvalp.cxx,v 1.4 90/02/11 12:52:21 rwells Exp $ */ include <lmi.hxx>

```
/****************************************************************************
lm_user_print_valp():
lm_print_valp(): print user value buffer pointer, minimally.
The idea is not to print the value itself, but to identify the
user buffer being addressed to some appropriate degree; this is used to
print the saved user buffer address (end_valp) for nowait requests.
Prints 'NULL' or 'non-NULL'.
This function can be replaced by the client with an application specific
function.
****************************************************************************/

/* BELMONT: Added lm_user_print_valp to allow the user to supply
   his/her own "printf" style function. -ksedgwic 21-Feb-89 */ void lm_user_print_valp(lm_user_printfunp pfun, lm_voidp valuep)
{
    if (valuep == NULL)
        (*pfun)("NULL");
    else
        (*pfun)("non-NULL");
}   /* end lm_user_print_valp */ void lm_print_valp(lm_voidp valuep)
{
    lm_user_print_valp((lm_user_printfunp) printf, valuep);

}   /* end lm_print_valp */
/****************************************************************************
File:     lm_prvalue.cxx
Contents: Default print routine for lock manager values.
System:   BBNACI Programming Environments.
Created:  13-Oct-1988
Author:   rwells Remarks:

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
****************************************************************************/

/* $Header: lm_prvalue.cxx,v 1.4 90/02/11 12:52:24 rwells Exp $ */ include <lmi.hxx>

/****************************************************************************
lm_user_print_value():
lm_print_value(): print out value string nicely in double quotes.
Clients can provide their own version of this function, to print on stdout.
1. If length is not positive, print nothing.
2. If pointer is null, print 'NULL'.
3. Otherwise delimit printout with double quotes; for each character:
    a. Backslash it if it is double quote or backslash.
    b. Print it plain if it is otherwise printable.
    c. Print it as a 3 digit backslashed octal character if there is
       a following digit character.
    d. Print it as a minimal digit backslashed octal character otherwise.
****************************************************************************/
```

```
/* BELMONT: Added lm_user_print_value to allow the user to supply
   his/her own "printf" style function. -ksedgwic 21-Feb-89 */ void lm_user_print_value(lm_user_printfunp pfun, lm_voidp valuep, size_t len)
{
    register int c;
    register char *cp = (char *) valuep;

if (len <= 0)
        return;

if (cp == NULL)
    {
        (*pfun)("NULL");
        return;
    }

(*pfun)("\"");
    for ( ; len > 0; len--)
    {
        c = (*cp++ & 0377);
        if (c == '\\' || c == '"')
            (*pfun)("\\%c", c);
        else if (c >= ' ' && c <= 0176)
            (*pfun)("%c", c);
        else if (len > 1 && cp[1] >= '0' && cp[1] <= '9')
            (*pfun)("\\%03o", c);
        else
            (*pfun)("\\%o", c);
    }
    (*pfun)("\"");
}   /* end lm_user_print_value */ void lm_print_value(lm_voidp valuep, size_t len)
{
    lm_user_print_value((lm_user_printfunp) printf, valuep, len);

}   /* end lm_print_value */

/************************************************************************
File:     lm_checkp.cxx
Contents: Contains initialized global declaration for lm_checkp.
System:   BBNACI Programming Environments.
Created:  10-Aug-1988
Author:   rwells Remarks:  It is intended that all the library source files except this one
be compiled in such a way that their initialized data is in the text
segment, for greater sharing and locality.  This one has to be initialized
at load time, and needs to be changed later.

Copyright 1988 by BBN Advanced Computers Inc.
ALL RIGHTS RESERVED

No part of this material may be reproduced, stored in a retrieval
system, transmitted or used in any form or by any means, electronic,
mechanical, photocopying, recording, or otherwise, without the prior
written permission of, or express license from BBN Advanced Computers Inc.

RESTRICTED RIGHTS LEGEND

Use, duplication, or disclosure by the Government is subject to
restrictions as set forth in subparagraph (c)(1)(ii) of the Rights to
Technical Data and Computer Software clause at DFARS 52.227-7013.

BBN Advanced Computers Inc.
10 Fawcett Street
Cambridge, Ma. 02238
617-873-6000
************************************************************************/
```

```
/* $Header: lm_checkp.cxx,v 1.2 88/08/14 15:18:58 rwells Exp $ */ static int s_dummy = 1;        /* Dummy value to trigger lm_check call. */ int *lm_checkp = &s_dummy;     /* GLOBAL: Used by lm_check macro. */
Makefile for the lock manager library.

$Header: Makefile,v 1.26 90/03/05 10:30:22 rwells Exp $

----- Configuration defines -----------------------------------------

# Make a liblm with nothing.
LIB            = liblm.a
DEBUG_SWITCH   =
ELOG_SWITCH    =
TRACE_SWITCH   =
PROF_SWITCH    =

# Make a liblm with profiling.
# LIB            = liblm_p.a
# DEBUG_SWITCH   =
ELOG_SWITCH    =
TRACE_SWITCH   =
# PROF_SWITCH    = -p

# Make a liblm with debugging and tracing.
# LIB            = liblmg.a
# DEBUG_SWITCH   = -g
# ELOG_SWITCH    =
# TRACE_SWITCH   = -DTRACE
# PROF_SWITCH    =

# Make a liblm with debugging, tracing, and profiling.
# LIB            = liblmg_p.a
# DEBUG_SWITCH   = -g
# ELOG_SWITCH    =
# TRACE_SWITCH   = -DTRACE
# PROF_SWITCH    = -p

# Make a liblm with debugging, event logging and tracing.
# LIB            = liblme.a
# DEBUG_SWITCH   = -g
# ELOG_SWITCH    = -DEVENT_POINTS -DKLOG
# TRACE_SWITCH   = -DTRACE
# PROF_SWITCH    =

# Make a liblm with debugging, event logging, tracing, and profiling.
# LIB            = liblme_p.a
# DEBUG_SWITCH   = -g
# ELOG_SWITCH    = -DEVENT_POINTS -DKLOG
# TRACE_SWITCH   = -DTRACE
# PROF_SWITCH    = -p

----- Guts of the definitions -----------------------------------------

VPATH    = ..
TESTPROG = testlm
# Currently we have to add -lus here to build on GP-1000. -rwells, 5-sept-88.
# We also have to have EXTRAOBJ defined only on GP-1000. -rwells, 13-Nov-88.
TESTLIBS = /usr/ksedgwic/src/libtest2/libtest2.a -lus

EXTRAOBJ =

SOURCE= lm_checkp.cxx    lm_face.cxx     lm_msg.cxx       lm_prcookie.cxx \
        lm_prendfun.cxx  lm_print.cxx    lm_prnotfun.cxx  lm_prvalp.cxx   \
        lm_prvalue.cxx   lmi_hash.cxx    lmi_lock.cxx     lmi_md.c        \
        lmi_node.cxx     lmi_pool.cxx    lmi_proc.cxx     lmi_queue.cxx   \
        lmi_res.cxx      lmi_sim.cxx     lmi_simwait.cxx  lmi_mapmem.cxx  \
        lmi_unsigned64.c new.cxx         snh.cxx          caller.c
LIBOBJ= lm_checkp.o      lm_face.o       lm_msg.o         lm_prcookie.o   \
        lm_prendfun.o    lm_print.o      lm_prnotfun.o    lm_prvalp.o     \
        lm_prvalue.o     lmi_hash.o      lmi_lock.o       lmi_md.o        \
        lmi_node.o       lmi_pool.o      lmi_proc.o       lmi_queue.o     \
```

```
        lmi_res.o       lmi_sim.o       lmi_simwait.o   lmi_mapmem.o    \
        lmi_unsigned64.o new.o          snh.o           caller.o TESTSRC=testc.c         testcxx.cxx     testface.cxx    testlm.cxx      \
        testrace.cxx    teststat.cxx    testus.c        testforkand.cxx
TESTOBJ=testc.o         testcxx.o       testface.o      testlm.o        \
        testrace.o      teststat.o      testus.o        testforkand.o TEST=   t_attach.t      t_callback.t    t_cancel.t      t_check.t       \
        t_conarg.t      t_contran0.t    t_contran1.t    t_contran2.t    \
        t_contran3.t    t_contran4.t    t_contran5.t    t_contran6.t    \
        t_convalue.t    t_create.t      t_detach.t      t_detachpid.t   \
        t_msg.t         t_name.t        t_node.t        t_notify.t      \
        t_open.t        t_openbig.t     t_opencon.t     t_openhash.t    \
        t_opennext.t    t_openpar.t     t_pool.t        t_qexpress.t    \
        t_qtran0.t      t_qtran1.t      t_queue.t       t_qvalue.t      \
        t_statargs.t    t_u64.t         t_usage.t       t_waitpost.t
TESTED= t_attach.T      t_callback.T    t_cancel.T      t_check.T       \
        t_conarg.T      t_contran0.T    t_contran1.T    t_contran2.T    \
        t_contran3.T    t_contran4.T    t_contran5.T    t_contran6.T    \
        t_convalue.T    t_create.T      t_detach.T      t_detachpid.T   \
        t_msg.T         t_name.T        t_node.T        t_notify.T      \
        t_open.T        t_openbig.T     t_opencon.T     t_openhash.T    \
        t_opennext.T    t_openpar.T     t_pool.T        t_qexpress.T    \
        t_qtran0.T      t_qtran1.T      t_queue.T       t_qvalue.T      \
        t_statargs.T    t_u64.T         t_usage.T       t_waitpost.T

----- Prelude definitions -------------------------------------------

CCXX    = ccxx
CC_LD   = ccxx

CPPFLAGS = -Dbutterfly $(ELOG_SWITCH) $(TRACE_SWITCH)
CFLAGS   = $(PROF_SWITCH) $(DEBUG_SWITCH) $(TRACE_SWITCH)
CXXFLAGS = -Dc_plusplus !n $(PROF_SWITCH) $(DEBUG_SWITCH) $(TRACE_SWITCH)
IFLAGS   = -I../libtest -I. -I$(VPATH)
LDFLAGS  = $(PROF_SWITCH) $(DEBUG_SWITCH)

----- Dot rules -----------------------------------------------------

.SUFFIXES:
.SUFFIXES: .cxx .c .o .t .T

.cxx.o:;    ${CCXX} -c $*.cxx $(IFLAGS) $(CXXFLAGS) $(CPPFLAGS);rm -f $*.[cs]
.c.o:;      ${CC}   -c $*.c   $(IFLAGS) $(CFLAGS)   $(CPPFLAGS)
.t.T:;      testit $*.t

----- Library definitions (default) ---------------------------------

# We recreate lm_version.o every time we reload the library via lm_version.sh;
# it provides point of origin information for the library,
# similar to that provided for Mach kernels.  -rwells, 8-Feb-89.

$(LIB): $(PARALLEL) $(LIBOBJ) $(EXTRAOBJ) lm_version.sh
        rm -f $(LIB) lm_version.o; lm_version.sh $(VPATH) $(LIB) && \
        ar cr $(LIB) $(LIBOBJ) $(EXTRAOBJ) lm_version.o &&\
        ranlib $(LIB)

----- Definitions for testing ---------------------------------------

$(TESTPROG): $(PARALLEL) $(LIB) $(TESTOBJ)
        rm -f $(TESTPROG); \
        $(CC_LD) -o $(TESTPROG)+ $(LDFLAGS) $(TESTOBJ) \
                        $(SYSOBJ) $(LIB) $(TESTLIBS) \
        && mv -f $(TESTPROG)+ $(TESTPROG)

$(TESTED): $(PARALLEL) $(TESTPROG)
```

```
Tested: $(PARALLEL) $(TESTED)
        touch Tested

----- Other helpful definitions ------------------------------------

Checkin:
        makeci $(TOTAL_TEMP_LIST)

Clean:
        rm -f *.[DTao] *~ *.dif *- Tested core $(TESTPROG)

Depend:
        makedepend $(SOURCE) $(TESTSRC)

Stripped:
        echo WARNING: Stripping `pwd` source code in 10 seconds...;sleep 10; \
        for f in *.[ch]xx *.h;do echo Stripping $$f...; rm -f $$f+; \
        cp $$f $$f+; chmod +w $$f+; stripper <$$f >$$f+ && \
        rm -f $$f && mv $$f+ $$f && chmod -w $$f;done

--- AUTOMATICALLY GENERATED RULES --- lm_face.o: lmi.hxx realtime.hxx unsigned64.hxx lockman.h $S $S lm_msg.o: lmi.hxx realtime.hxx unsigned64.hxx lockman.h $S $S lm_prcookie.o: lmi.hxx realtime.hxx unsigned64.hxx lockman.h $S $S lm_prendfun.o: lmi.hxx realtime.hxx unsigned64.hxx lockman.h $S $S lm_print.o: lmi.hxx realtime.hxx unsigned64.hxx lockman.h $S $S lm_prnotfun.o: lmi.hxx realtime.hxx unsigned64.hxx lockman.h $S $S lm_prvalp.o: lmi.hxx realtime.hxx unsigned64.hxx lockman.h $S $S lm_prvalue.o: lmi.hxx realtime.hxx unsigned64.hxx lockman.h $S $S lmi_hash.o: lmi.hxx realtime.hxx unsigned64.hxx lockman.h $S $S lmi_lock.o: lmi.hxx realtime.hxx unsigned64.hxx lockman.h $S $S lmi_md.o: $S $S lockman.h $S $S $S\
        $S $S lmi_node.o: lmi.hxx realtime.hxx unsigned64.hxx lockman.h $S $S lmi_pool.o: lmi.hxx realtime.hxx unsigned64.hxx lockman.h $S $S lmi_proc.o: lmi.hxx realtime.hxx unsigned64.hxx lockman.h $S $S lmi_queue.o: lmi.hxx realtime.hxx unsigned64.hxx lockman.h $S $S lmi_res.o: lmi.hxx realtime.hxx unsigned64.hxx lockman.h $S $S lmi_sim.o: lmi.hxx realtime.hxx unsigned64.hxx lockman.h $S $S lmi_simwait.o: lmi.hxx realtime.hxx unsigned64.hxx lockman.h $S $S lmi_mapmem.o: lmi.hxx realtime.hxx unsigned64.hxx lockman.h $S $S lmi_unsigned64.o: unsigned64.hxx testc.o: lockman.h $S $S $S testcxx.o: $S $S testlm.hxx lmi.hxx realtime.hxx unsigned64.hxx lockman.h $S\
```

```
testface.o: testlm.hxx lockman.h $S $S testlm.o: lockman.h $S $S $S testrace.o: testlm.hxx lmi.hxx realtime.hxx unsigned64.hxx lockman.h $S $S teststat.o: testlm.hxx lockman.h $S $S testus.o: lockman.h $S $S $S testforkand.o: testlm.hxx lockman.h $S $S
```

What is claimed is:

1. A computer implemented method for cooperatively managing resources which may be needed by a variety of processes running simultaneously on a group of processors each of which is provided with a respective section of memory which is also accessible by other processors in the group, a resource manager program which is replicated for each said processor in its respective section of memory and which is responsive to calls from processes seeking access to resources or release of resources, and a hash table which is divided into portions, each said portion comprised of a series of entries, which are distributed over respective sections of said memory, said method comprising the computer implemented steps of:

implementing a hashing algorithm by said resource manager program which directs calls form processes seeking access to a designated resource to a unique memory address location for a unique one of said memory sections associated with the designated resource irrespective of which processors originated the calls, said memory address location storing a hash table entry corresponding to the designated resource, associating, in the unique one of said memory sections, with a corresponding portion of the hash table a plurality of resource data objects, assigning to the designated resource one of the plurality of resource data objects which records information regarding the processes which have access or are seeking access to the designated resource, placing said one of the plurality of resource data objects in a list of resource data objects which are assigned to resources which hash to said entry corresponding to the designated resource, providing said entry corresponding to the designated resource with a pointer which points to said list of resource data objects, and, accessing, through said one of the plurality of resource data objects, said designated resource by said processes seeking access.

2. A method as set forth in claim 1 further comprising a multiplicity of lock data objects which can be acquired by a process for requesting access to resource data object and which can record information regarding the state of access to the respective resource by that process.

3. A method as set forth in claim 2 wherein said manager program operates to adjust the lock data objects of other processes requesting a given resource when releasing access to said given resource thereby to reflect the change in availability of the given resource.

4. A method as set forth in claim 2 wherein said processors provide a read-modify-write instruction and wherein each of said lock data objects includes a latch data element which can be tested by said read-modify-write instruction.

5. A method as set forth in claim 4 wherein each of said resource data objects includes a latch data element which can be tested by said read-modify-write instruction.

* * * * *